US010861072B2

(12) United States Patent
Desai et al.

(10) Patent No.: US 10,861,072 B2
(45) Date of Patent: Dec. 8, 2020

(54) HANDLING LIVE OCCURRENCE EVENTS WITH A RULES ENGINE

(71) Applicant: MasterCard Mobile Transactions Solutions, Inc., Purchase, NY (US)

(72) Inventors: Mehul Desai, Oak Brook, IL (US); Nehal Maniar, Oak Brook, IL (US)

(73) Assignee: MASTERCARD MOBILE TRANSACTIONS SOLUTIONS, INC., Purchase, NY (US)

( * ) Notice: Subject to any disclaimer, the term of this patent is extended or adjusted under 35 U.S.C. 154(b) by 1224 days.

(21) Appl. No.: 14/804,999

(22) Filed: Jul. 21, 2015

(65) Prior Publication Data

US 2015/0324700 A1   Nov. 12, 2015

Related U.S. Application Data

(63) Continuation of application No. 14/317,896, filed on Jun. 27, 2014.
(Continued)

(51) Int. Cl.
*G06Q 30/06* (2012.01)
*G06Q 20/32* (2012.01)
(Continued)

(52) U.S. Cl.
CPC ....... *G06Q 30/0613* (2013.01); *G06N 3/0436* (2013.01); *G06N 5/046* (2013.01);
(Continued)

(58) Field of Classification Search
CPC .................................................. G06Q 30/0613
(Continued)

(56) References Cited

U.S. PATENT DOCUMENTS 3,999,050 A   12/1976   Pitroda
6,463,463 B1  10/2002   Godfrey et al.
(Continued)

FOREIGN PATENT DOCUMENTS

EP     3014555 A2    5/2016
JP     2013004043 A  1/2013
(Continued)

OTHER PUBLICATIONS

"Intelligent Oven in Smart Home Environment," by Bojun Li, Piyanuch Hathaipontaluk and Suhuai Luo. 2009 Conference on Research Challenges in Computer Science. (Year: 2009).*
(Continued)

*Primary Examiner* — Sara C Hamilton
(74) *Attorney, Agent, or Firm* — GTC Law Group PC & Affiliates

(57) ABSTRACT

A method is disclosed herein in accordance with an embodiment of the present invention. The method may include deriving at a mobile transaction platform a multi-dimensional context from one or more user transactions and determining at least one life occurrence based, at least in part, on the multi-dimensional context. The one or more user transactions may be conducted through the mobile transaction platform. The one or more user transactions may be stored on a third-party source. In an aspect, the at least one life occurrence has yet to occur. In another aspect of the invention, the life occurrence has already occurred. The multi-dimensional context may include at least one of user location information and life occurrence location information. The multi-dimensional context may include at least one of a time of life occurrence and a current time.

19 Claims, 49 Drawing Sheets

Related U.S. Application Data

(60) Provisional application No. 61/841,019, filed on Jun. 28, 2013.

(51) Int. Cl.

| | | |
|---|---|---|
| *G06Q 20/36* | (2012.01) | |
| *G06Q 20/38* | (2012.01) | |
| *G06N 5/04* | (2006.01) | |
| *G06N 7/02* | (2006.01) | |
| *G06N 3/04* | (2006.01) | |
| *G06N 20/00* | (2019.01) | |
| *G06Q 30/02* | (2012.01) | |

(52) U.S. Cl.
CPC ............... *G06N 7/02* (2013.01); *G06N 20/00* (2019.01); *G06Q 20/322* (2013.01); *G06Q 20/36* (2013.01); *G06Q 20/382* (2013.01); *G06Q 30/0207* (2013.01); *G06Q 30/0255* (2013.01); *G06Q 30/0261* (2013.01); *G06Q 30/0631* (2013.01)

(58) Field of Classification Search
USPC .......................................................... 705/35
See application file for complete search history.

(56) References Cited

U.S. PATENT DOCUMENTS

| | | | |
|---|---|---|---|
| 6,779,019 | B1 | 8/2004 | Mousseau et al. |
| 9,514,474 | B2 | 12/2016 | Nagarajan et al. |
| 2001/0005864 | A1 | 6/2001 | Mousseau et al. |
| 2001/0054115 | A1 | 12/2001 | Ferguson et al. |
| 2002/0049818 | A1 | 4/2002 | Gilhuly et al. |
| 2003/0079613 | A1* | 5/2003 | Williamson ............ A47J 31/52 99/282 |
| 2003/0080113 | A1* | 5/2003 | Williamson ............ H05B 6/688 219/506 |
| 2003/0080116 | A1* | 5/2003 | Williamson ............ H05B 6/688 219/719 |
| 2003/0081621 | A1 | 5/2003 | Godfrey et al. |
| 2003/0083770 | A1* | 5/2003 | Williamson ......... G05B 19/042 700/117 |
| 2003/0084047 | A1* | 5/2003 | Williamson ........... G06Q 10/10 |
| 2003/0115126 | A1 | 6/2003 | Pitroda |
| 2004/0024824 | A1 | 2/2004 | Ferguson et al. |
| 2004/0032421 | A1* | 2/2004 | Williamson ............ H05B 6/688 715/704 |
| 2004/0058706 | A1* | 3/2004 | Williamson ....... H04N 21/4755 455/557 |
| 2004/0185877 | A1 | 9/2004 | Asthana et al. |
| 2005/0148356 | A1 | 7/2005 | Ferguson et al. |
| 2006/0122525 | A1 | 6/2006 | Shusterman |
| 2007/0198432 | A1 | 8/2007 | Pitroda et al. |
| 2008/0033769 | A1 | 2/2008 | Koorapati et al. |
| 2008/0077707 | A1 | 3/2008 | Ferguson et al. |
| 2009/0113346 | A1 | 4/2009 | Wickramasuriya et al. |
| 2009/0156190 | A1 | 6/2009 | Fisher |
| 2009/0298514 | A1 | 12/2009 | Ullah |
| 2010/0030624 | A1 | 2/2010 | Vänskä et al. |
| 2010/0161379 | A1* | 6/2010 | Bene ..................... G06Q 30/02 705/7.31 |
| 2010/0174759 | A1 | 7/2010 | Piccinini et al. |
| 2011/0208418 | A1 | 8/2011 | Looney et al. |
| 2011/0264663 | A1 | 10/2011 | Verkasalo et al. |
| 2012/0284080 | A1 | 11/2012 | De Oliveira et al. |
| 2012/0290950 | A1 | 11/2012 | Rapaport et al. |
| 2013/0054479 | A1 | 2/2013 | Ross et al. |
| 2013/0054480 | A1 | 2/2013 | Ross et al. |
| 2013/0204785 | A1 | 8/2013 | Monk et al. |
| 2013/0205323 | A1 | 8/2013 | Sinha et al. |
| 2013/0268437 | A1 | 10/2013 | Desai et al. |
| 2013/0307681 | A1 | 11/2013 | Borg et al. |
| 2013/0311167 | A1 | 11/2013 | Borg et al. |
| 2013/0325681 | A1 | 12/2013 | Somashekar et al. |
| 2013/0325787 | A1 | 12/2013 | Gerken et al. |
| 2014/0006129 | A1 | 1/2014 | Heath |
| 2014/0020068 | A1 | 1/2014 | Desai et al. |
| 2014/0025491 | A1* | 1/2014 | Nagarajan .......... G06Q 30/0207 705/14.53 |
| 2014/0081726 | A1 | 3/2014 | Cooke et al. |
| 2014/0081750 | A1 | 3/2014 | Hosp et al. |
| 2014/0081844 | A1 | 3/2014 | Hosp et al. |
| 2014/0156448 | A1 | 6/2014 | Grigg et al. |
| 2014/0156527 | A1 | 6/2014 | Grigg et al. |
| 2014/0180975 | A1 | 6/2014 | Martinez et al. |
| 2014/0324508 | A1 | 10/2014 | Becker et al. |
| 2015/0088739 | A1 | 3/2015 | Desai |
| 2015/0324783 | A1 | 11/2015 | Desai et al. |
| 2015/0324786 | A1 | 11/2015 | Desai et al. |
| 2015/0339581 | A1 | 11/2015 | Desai et al. |
| 2015/0339746 | A1 | 11/2015 | Desai et al. |

FOREIGN PATENT DOCUMENTS

| | | |
|---|---|---|
| JP | 2013004048 A | 1/2013 |
| KR | 10-1209692 B1 | 12/2012 |
| KR | 101209692 B1 | 12/2012 |
| KR | 20120135396 A | 12/2012 |
| KR | 1020120135396 A | 12/2012 |
| KR | 101243682 B1 | 3/2013 |
| WO | 2014/210497 A2 | 12/2014 |
| WO | 2014/210497 A3 | 3/2015 |
| WO | 2014/210497 A4 | 4/2015 |

OTHER PUBLICATIONS 14817935.1, "European Application Serial No. 14817935.1, Supplementary European Search Report dated Dec. 23, 2016", MasterCard Mobile Transactions Solutions, Inc., 6 Pages.

PCT/US2014/044633, "International Application Serial No. PCT/US2014/044633 International Preliminary Report on Patentability dated Jan. 7, 2016", MasterCard Mobile Transactions Solutions, Inc., 44 pages.

PCT/US2014/044633, International Application Serial Appl. No. PCT/US2014/044633, International Search Report and Written Opinion dated Jan. 9, 2015.

Anreasen, "Life Status Changes and Changes in Consumer Preferences and Satisfaction", Journal of Consumer Research, vol. 11, No. 3, 2006, pp. 784-794.

Mathur, et al., "Life-changing events and marketing opportunities", Journal of Targeting, Measurement and Analysis for Marketing, 2006, pp. 115-128.

* cited by examiner

| CategoryId | Category | Status | Image | Timestamp | Remarks |
|---|---|---|---|---|---|
| 10000 | Electronics | Active | image_data | Long | Electronic Items |
| 20000 | Home Appliances | Active | image_data | | Home Appliances |
| 30000 | Apparels | Active | image_data | | Men and Women's Dress Wear |

TABLE 1: CATEGORY TABLE

| SubCategoryId | SubCategoryName | Primary Id | Image | Status | Timestamp | Remarks |
|---|---|---|---|---|---|---|
| 10001 | Phones | 10000 | image_data | Active | Long Value | Fixed and Mobile Phones |
| 10002 | Laptops | 10000 | image_data | Active | | Portable Computers |
| 20001 | Microwave | 20000 | image_data | Active | | Cooking Appliances |
| 20002 | Washing Machine | 20000 | image_data | Active | | Washing Appliances |

TABLE 2: SUB–CATEGORY TABLE

FIG. 10

| MerchantID | MerchantName | Store Type | Model | Image | Accredited Merchant | Reward | TimeStamp |
|---|---|---|---|---|---|---|---|
| 1001 | Walmart | 01 | www.walmart.com | image_data | 0 | nothing | - |
| 1002 | Home Depot | 01 | www.homedepot.com | image_data | 0 | nothing | |
| 1003 | Target | 01 | www.target.com | image_data | 0 | nothing | |

TABLE 3: MERCHANT TABLE

| ProductID | ProductName | StoreID | Model Number | Bid Ask Min Quantity | Bid Ask Min Specified Cost | Discount Amt | Price | Manufacturing Date | Manufacturer | Image | Status | Reason | TimeStamp |
|---|---|---|---|---|---|---|---|---|---|---|---|---|---|
| 1000101 | Panasonic Fixed Line | 10001 | PN 502 | 1 | 50 | 0 | 1500 | 10-06-2013 12:00 | Panasonic | image_data | 25 | Active | New Launch | - |
| 1000102 | Galaxy Note 2 | 10001 | GT-N7100 | 1 | 25 | 0 | 1200 | 10-06-2013 12:00 | Samsung | image_data | 600 | Active | New Launch | |
| 1000103 | Iphone 5s | 10001 | OS-534 | 1 | 100 | 0 | 1500 | 10-06-2013 12:00 | Apple | image_data | 600 | Active | New Launch | |

TABLE 4: PRODUCT TABLE

| Valid Till | Image Data | Available Quantity | Status | Permits | Description |
|---|---|---|---|---|---|
| 31-10-2013 23:59 | image_data | 50 | Active | Milk | Valid only for purchase of 2Lt and above |
| 31-10-2013 23:59 | image_data | 50 | Active | Bread | Valid only for weekdays |
| 31-10-2013 23:59 | image_data | 50 | Active | Eggs | Valid only on Sundays |

TABLE 5: INVENTORY TABLE

FIG. 11

| Units | Type |
|---|---|
| Number | Debit |
| Ounces | Credit |
| Pound | Gift |
| Kilogram | Stored Value |
| Dozen | |
| Litre | |
| Gallon | |
| Gram | |
| Set | |
| Box | |

TABLE 6: UNIT TABLE

| Events |
|---|
| Wedding |
| Wedding Anniversary |
| Birthday |
| Graduation |
| Home Coming |
| Valentine's Day |
| Father's Day |
| Mother's Day |

TABLE 7: EVENT TABLE

| ID | OfferID | Picture ID | Trigger | Specific | Remarks |
|---|---|---|---|---|---|
| A | X001 | A123 | | | |
| B | X001 | B123 | | | |
| C | X001 | C123 | | | |

TABLE 8: PRODUCT OFFER TABLE

| LoyaltyID | Program ID | Program Level | Account Holder Name | Account Identifier | Valid From | Valid Till | Badge Requirements (Type) | Badge Requirements (Points) | Badge Requirements (Url) | Badge Requirements (Specific) | Issuer Name | Issuer Record |
|---|---|---|---|---|---|---|---|---|---|---|---|---|
| 1111111110 | 123 | Gold | John Deo | 84545110 | 10-06-2012 12:00 | 31-12-2028 23:59 | 1 | 100 | 1.png | 1 | 1 | ShopStar |
| 1111111112 | 123 | Platinum | Ashok Naik | 84545120 | 10-06-2012 12:00 | 31-08-2040 23:59 | 1 | 100 | 2.png | 1 | 1 | Object Store |
| 1111111113 | 123 | Gold | Hemant Naik | 84545130 | 10-06-2012 12:00 | 30-06-2019 23:59 | 1 | 100 | 3.png | 1 | 1 | Home Appliances |

TABLE 9: LOYALTY TABLE

FIG. 12

| ID | ProductID | Product | Suggestion |
|---|---|---|---|
| 1 | 1000132 | Milk | Bread, Eggs and Cheese |
| 2 | 1000133 | Milk | Bread, Eggs and Cheese |
| 3 | 1000144 | Detergent | Softener |

TABLE 11: PRODUCT SUGGESTION TABLE

| MerchantID | Date | Sentence | Tags |
|---|---|---|---|
| 1001 | June 23 | Store will be closed on 10th | |
| 1001 | June 01 | New Kids play area opened on 2nd Floor | Diapers, Baby |
| 1001 | June 22 | Try our new Soup And Sandwich Special | Soup, Sandwich |

TABLE 10: STORE MESSAGES TABLE

| ID | UserID/Mobile | MerchantID | EmployeeID | PaymentCardID | MembershipID | Status | Remark |
|---|---|---|---|---|---|---|---|
| 1 | 9876543210 | 1001 | 1111111110 | a0000000004101001 | - | Active | Walmart |
| 2 | 1123456789 | 1001 | 1111111110 | a0000000004101002 | - | Active | General |
| 3 | 1234567890 | 1003 | 1111111112 | a0000000004101003 | - | Active | Target |

TABLE 12: MERCHANT_USER TABLE

FIG. 13

TABLE 13: USER BEHAVIOR TABLE

| ID | Mobile | Annual Threshold | Quarterly Threshold | Monthly Threshold | Calculation Source |
|---|---|---|---|---|---|
| 1 | 9876543210 | 15 | 2 | 7 | Taken from initial behavior |

TABLE 14: USER INITIAL BEHAVIOR -1

| UserID | Purchase | Frequency | Frequency Count | Merchant |
|---|---|---|---|---|
| 9876543210 | Annual Membership | Annual | 12 | Walmart |
| 9876543210 | Rice | Monthly | 15 | Walmart |
| 9876543210 | Garbage Bags | Monthly | 4 | Walmart |

TABLE 15: USER INITIAL BEHAVIOR -2

| UserID | Purchase | Frequency | Frequency Count | Merchant |
|---|---|---|---|---|
| 1123456789 | Carpet Cleaning | Monthly | 10 | Home Depot |
| 1123456789 | Bread | Weekly | 2 | Better buy |
| 1123456789 | Car Tune up | Annual | 7 | Home Depot |

TABLE 16: USER ALERT TABLE

| Alert ID | Date | Alert | Valid Till |
|---|---|---|---|
| 1 | date 1 | Your connecting Flight from NewYork to London is indefinitely delated due to heavy snowfall. | date 3 |
| 2 | date 2 | Your today's Flight from Chicago to NewYork at 11pm has been cancelled. | date 4 |

TABLE 21: TRANSACTION OBJECT TABLE

TABLE 22: INVENTORY TABLE

TABLE 23: USER PROFILE TABLE

TABLE 24: WIDGET INFO TABLE

FIG. 16

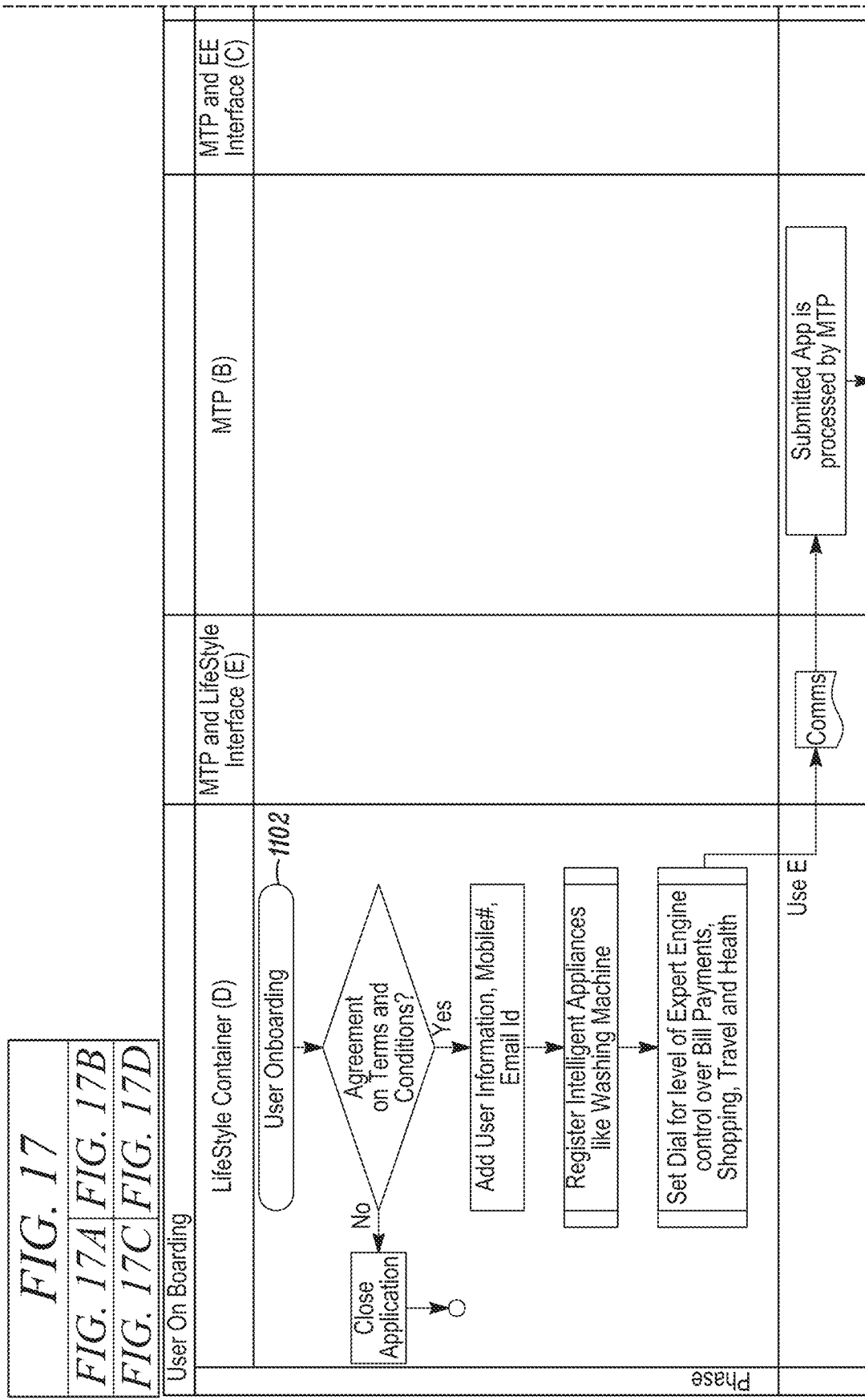

| MTP Expert Engine (A) | Enabled Ecosystem (104) | ESB (112) | Networks/ Infrastructure/ Other Hosts (110) |
|---|---|---|---|
| | | | |

*FIG. 17B*

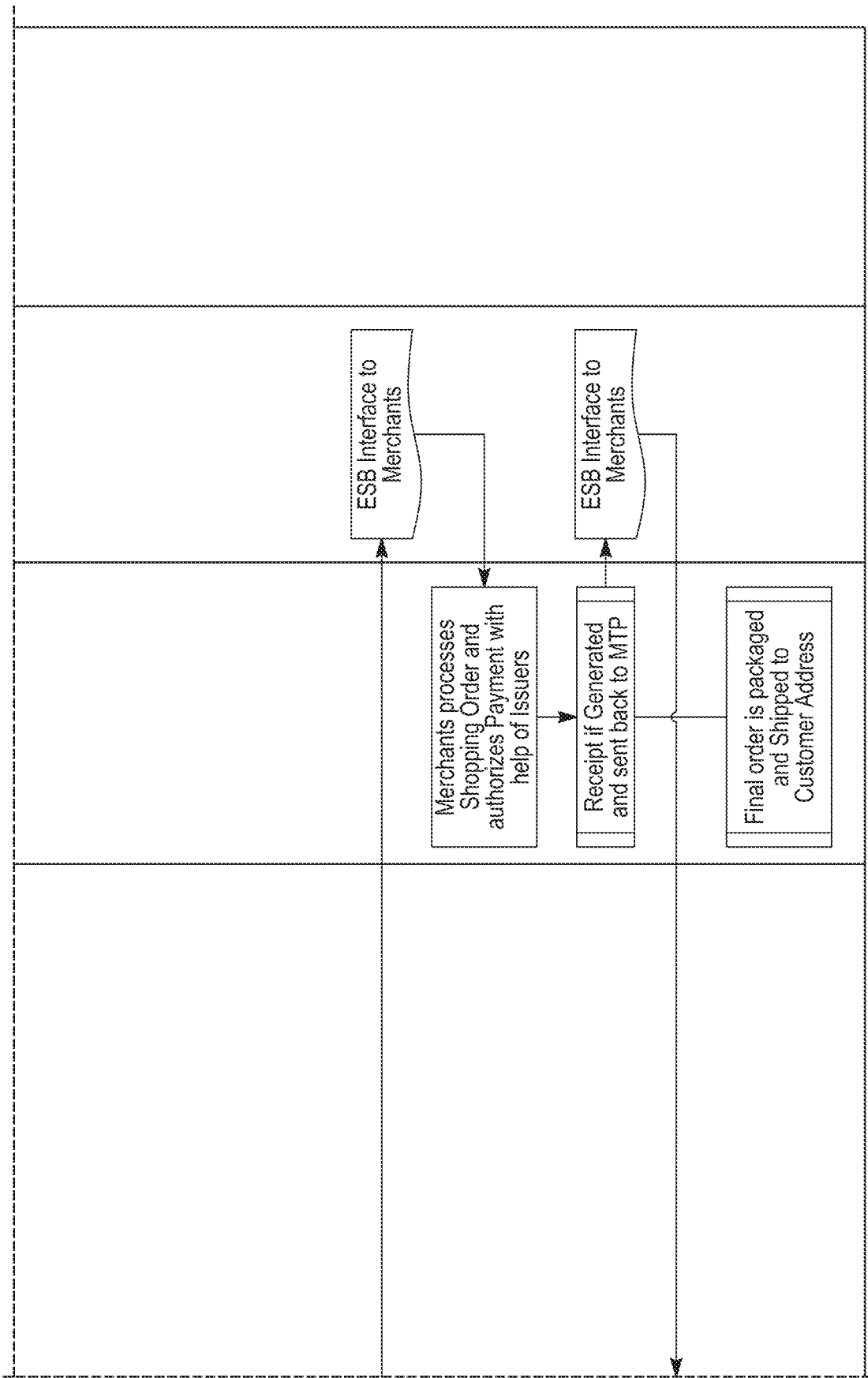

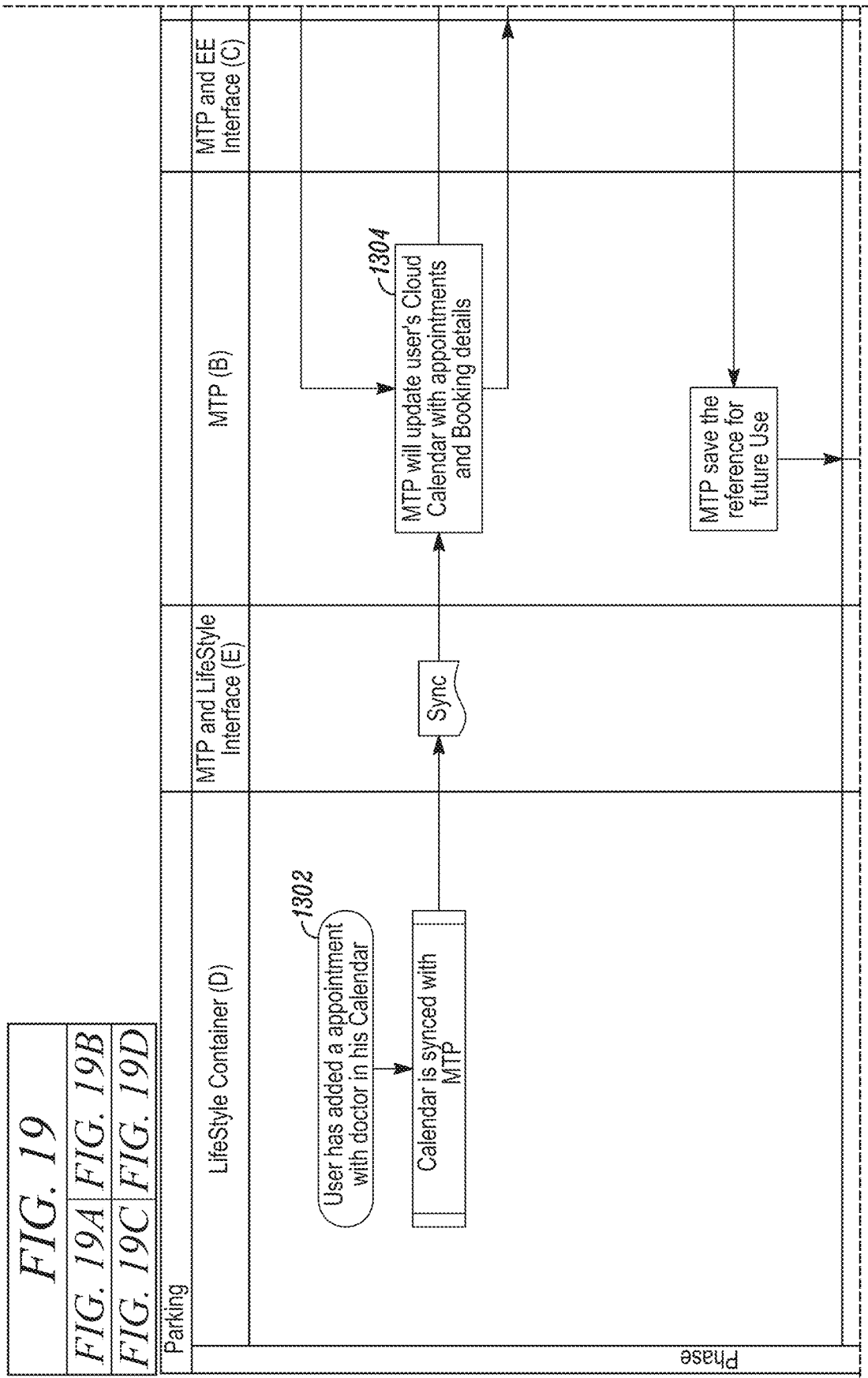

...Guiding Principles

Minimal intrusions on the user, with Maximum Usability from the Ecosystem the experience should revolve around Me

...give me a "seamless experience"...

...I would still like to look at all my cards, coupons, receipts, in one place, without carrying around 50 different pieces of plastic and paper...

1. Intuitive Interface
2. Applications driving Transactions
3. All Verticals
4. All Payment Channels
5. Proactive Intelligence ...finance, retail, health & gov...

...NFC, bar/QR codes, cloud, online, offline

...user inputs, host rules, and behavioral analytics...

- Time/Distance
- Location
- Push Notifications/Alerts ← ...specific instructions and expectations...
- suggestions/Recommendations
- Augmented Reality ...context is driven by time and location...

...everything is not black and white... and yet it is...

2504 — Alerts
2502 — Tokens
2506 — Notifications

Balanced Experience

...its about what I want to do, and not what I have to do...

...keep me on track- escalate, escalate and escalate...

Performance & Risk driven Escalation

*FIG. 25*

HANDLING LIVE OCCURRENCE EVENTS WITH A RULES ENGINE

CROSS-REFERENCE TO RELATED APPLICATIONS

This application claims priority to and is a continuation of U.S. patent application Ser. No. 14/317,896 filed Jun. 27, 2014, the entirety of which is incorporated herein by reference. U.S. Ser. No. 14/317,896 claims the benefit of U.S. provisional application serial number U.S. 61/841,019 filed Jun. 28, 2013, the entirety of which is incorporated herein by reference.

This application is related to the following co-owned U.S. patent applications, the entirety of each is incorporated herein by reference: Ser. No. 13/909,262 filed on Jun. 4, 2013; Ser. No. 11/539,024 filed on Oct. 5, 2006; and U.S. Ser. No. 10/284,676 filed on Oct. 31, 2002 now patented as U.S. Pat. No. 8,527,380.

This application is also related to the following co-owned U.S. patent applications, the entirety of each is incorporated herein by reference: U.S. Ser. No. 13/622,433 filed on Sep. 19, 2012; U.S. Ser. No. 13/622,462 filed on Sep. 19, 2012; and U.S. Ser. No. 13/622,815 filed on Sep. 19, 2012.

Each patent, patent application and other document referenced herein is hereby incorporated by reference in its entirety.

BACKGROUND

Field

This application relates to methods and systems of electronic transactions and particularly relates to mobile secure electronic transactions.

Description of the Related Art

As the use of mobile devices for performing a wide range of user-specific transactions, including healthcare, shopping, financial, personal, business, and the like continues to rise, the burden of managing most aspects of such transactions falls on the mobile user, thereby increasing complexity of a mobile experience for most users. However, the plethora of information available through these transactions and other sources of user-related data makes it possible to substantially ease the mobile experience. Yet no integrated solution has been established that facilitates a truly user-centric experience with the aim of fully integrating a user's mobile experience with his/her lifestyle.

SUMMARY

A method is disclosed that may include deriving at a mobile transaction platform a multi-dimensional context from one or more user transactions and determining at least one life occurrence based, at least in part, on the multi-dimensional context. The one or more user transactions may be conducted through the mobile transaction platform. The one or more user transactions are stored on a third-party source. In an aspect, the at least one life occurrence has yet to occur. In another aspect of the invention, the life occurrence has already occurred. The multi-dimensional context comprises at least one of user location information and life occurrence location information. The multi-dimensional context may include at least one of a time of life occurrence and a current time.

A computer readable storage medium having data stored therein representing software executable by a computer is disclosed herein. The software may include instructions to derive at a mobile transaction platform a multi-dimensional context from one or more user transactions. The software may further include instructions to determine at least one life occurrence based, at least in part, on the multi-dimensional context. The one or more user transactions may be conducted through the mobile transaction platform. The one or more user transactions may be stored on a third-party source. The at least one life occurrence has yet to occur, in an example. The life occurrence has already occurred, in another aspect. The multi-dimensional context may include at least one of user location information and life occurrence location information. The multi-dimensional context may include at least one of a time of life occurrence and a current time.

A method is disclosed herein that may include receiving at a mobile transaction platform a multi-dimensional context derived from one or more user transactions. The method may further include determining at least one life occurrence based, at least in part, on the multi-dimensional context and generating at least one trigger-event responsive to the at least one life occurrence. The at least one trigger-event facilitates at least one user directed mobile action. The one or more user transactions are conducted through the mobile transaction platform. The one or more user transactions may be stored on a third-party source. The at least one life occurrence has yet to occur, in an aspect of the invention. The life occurrence has already occurred, in another aspect of the invention. The multi-dimensional context may include at least one of user location information and life occurrence location information. The multi-dimensional context may include at least one of a time of life occurrence and a current time.

A computer readable storage medium having data stored therein representing software executable by a computer is disclosed herein. The software may include instructions to receive at a mobile transaction platform a multi-dimensional context derived from one or more user transactions. The software may further include instructions to determine at least one life occurrence based, at least in part, on the multi-dimensional context and instructions to generate at least one trigger-event responsive to the at least one life occurrence. The at least one trigger-event facilitates at least one user directed mobile action. The one or more user transactions may be conducted through the mobile transaction platform. The one or more user transactions may be stored on a third-party source. The at least one life occurrence has yet to occur in an aspect of the invention. The life occurrence has already occurred in another aspect. The multi-dimensional context may include at least one of user location information and life occurrence location information. The multi-dimensional context may include at least one of a time of life occurrence and a current time.

A method is disclosed herein that includes determining a type classification for a life occurrence of an individual from amongst a plurality of life occurrences based at least in part on a multi-dimensional data set constructed by an expert engine that receives analysis of transactions of the individual conducted through a mobile transaction platform. The method may further include generating a resolution path that resolves a life occurrence aspect that is common to life occurrences of the determined life occurrence type classification. The at least one of determining and generating utilizes fuzzy logic in an aspect. The resolution path may be adapted to be executed on a mobile device. The steps of determining and generating may be performed on the mobile device. The step of determining may include associating life occurrences with resolution paths utilizing fuzzy logic. The step of generating may include associating life occurrences with resolution paths utilizing fuzzy logic.

A computer readable storage medium having data stored therein representing software executable by a computer is disclosed herein. The software may include instructions to determine a type classification for a life occurrence of an individual from amongst a plurality of life occurrences based at least in part on a multi-dimensional data set constructed by an expert engine that receives analysis of transactions of the individual conducted through a mobile transaction platform. The software may further include instructions to generate a resolution path that resolves a life occurrence aspect that is common to life occurrences of the determined life occurrence type classification. The at least one of determining and generating may utilize fuzzy logic. The resolution path may be adapted to be executed on a mobile device. The steps of determining and generating may be performed on the mobile device. The step of determining may include associating life occurrences with resolution paths utilizing fuzzy logic. The step of generating may include associating life occurrences with resolution paths utilizing fuzzy logic.

A method is disclosed herein that may include determining a type of life occurrence of an individual based, at least in part, on a multidimensional data set and generating a resolution path adapted to address the life occurrence via a life occurrence node. In an aspect, at least one of the determining and generating may be performed according to a rule administered by a rules engine that relates life occurrence types with available resolution paths and that applies rules to data for the individual in the multidimensional data set. The multidimensional data set may be formed via a mobile transaction platform through which the life occurrence node addresses the life occurrence. The life occurrence node may include a mobile phone. The determining and generating may be performed on the mobile phone. The rule may relate one of a type of life occurrence to one of a plurality of resolution paths. The method may further include applying the rule to the multidimensional data set.

A computer readable storage medium having data stored therein representing software executable by a computer is disclosed herein. The software may include instructions to determine a type of life occurrence of an individual based, at least in part, on a multidimensional data set constructed in connection with a mobile transaction platform (MTP) through which the individual conducts transactions instructions to generate a resolution path adapted to address the life occurrence via a life occurrence node. In an aspect, at least one of the determining and generating is performed according to a rule administered by a rules engine that relates life occurrence types with available resolution paths and that applies rules to data for the individual in the multidimensional data set. The multidimensional data set is formed via a mobile transaction platform through which the life occurrence node addresses the life occurrence. The life occurrence node may include a mobile phone. The determining and generating may be performed on the mobile phone. The rule may relate one of a type of life occurrence to one of a plurality of resolution paths. The software may further include instructions to apply the rule to the multidimensional data set.

A method is disclosed herein that may include determining a type of life occurrence of an individual based, at least in part, on a multidimensional data set and generating a resolution action that, when activated by the individual triggers invocation of a resolution path adapted to address the life occurrence via a life occurrence node. In an aspect, at least one of the determining and generating is performed according to a rule administered by a rules engine that relates life occurrence types with available resolution paths and that applies rules to data for the individual in the multidimensional data set.

A method is disclosed herein that includes determining a type of life occurrence of an individual based, at least in part, on a multidimensional data set constructed in connection with a mobile transaction platform (MTP) through which the individual conducts transactions and generating a resolution path adapted to address the life occurrence via a life occurrence node. The determining the type of life occurrence may be based, at least in part, on the application of a neural network. The at least one input to the neural network may include data of the multidimensional data set. The at least one feedback to the neural network may include a plurality of known life occurrences. The neural network may operate to infer a life occurrence from the multidimensional data set. The multidimensional data set may be formed via a mobile transaction platform. The life occurrence node may include a mobile phone.

A computer readable storage medium having data stored therein representing software executable by a computer is disclosed herein. The software may include instructions to determine a type of life occurrence of an individual based, at least in part, on a multidimensional data set and instructions to generate a resolution path adapted to address the life occurrence via a life occurrence node. The determining the type of life occurrence is based, at least in part, on the application of a neural network. The at least one input to the neural network comprises data of the multidimensional data set. The at least one feedback to the neural network may include a plurality of known life occurrences. The neural network may operate to infer a life occurrence from the multidimensional data set. The multidimensional data set may be formed via a mobile transaction platform. The life occurrence node may include a mobile phone.

A method is disclosed herein that includes determining a type of life occurrence of an individual based, at least in part, on a multidimensional data set constructed in connection with a mobile transaction platform (MTP) through which the individual conducts transactions. The method may further include generating a resolution action that, when activated by the individual triggers invocation of a resolution path adapted to address the life occurrence via a life occurrence node. The determining the type of life occurrence is based, at least in part, on the application of a neural network.

A method is disclosed herein that includes determining a type of life occurrence of an individual based, at least in part, on a multidimensional data set constructed in connection with a mobile transaction platform (MTP) through which the individual conducts transactions and generating a resolution path adapted to address the life occurrence via a life occurrence node. The step of generating the resolution path may be based, at least in part, on the application of a neural network and wherein at least one feedback to the neural network may include at least one outcome for at least one individual having undertaken a resolution path for a the determined type of life occurrence. The at least one input to the neural network comprises data of the multidimensional data set. The at least one feedback to the neural network may include a plurality of known life occurrences. The neural network may operate to infer a life occurrence from the multidimensional data set. The multidimensional data set may be formed via a mobile transaction platform. The life occurrence node may include a mobile phone.

A computer readable storage medium having data stored therein representing software executable by a computer is disclosed herein. The software may include instructions to determine a type of life occurrence of an individual based, at least in part, on a multidimensional data set constructed in connection with a mobile transaction platform (MTP) through which the individual conducts transactions and instructions to generate a resolution path adapted to address the life occurrence via a life occurrence node. The step of generating the resolution path is based, at least in part, on the application of a neural network and wherein at least one feedback to the neural network may include at least one outcome for at least one individual having undertaken a resolution path for a the determined type of life occurrence. The at least one input to the neural network may include data of the multidimensional data set. The at least one feedback to the neural network may include a plurality of known life occurrences. The neural network may operate to infer a life occurrence from the multidimensional data set. The multidimensional data set may be formed via a mobile transaction platform. The life occurrence node may include a mobile phone.

A method is disclosed herein that includes determining a type of life occurrence of an individual based, at least in part, on a multidimensional data set constructed in connection with a mobile transaction platform (MTP) through which the individual conducts transactions and generating a resolution action that, when activated by the individual triggers invocation of a resolution path adapted to address the life occurrence via a life occurrence node. The step of generating the resolution action is based, at least in part, on the application of a neural network and wherein at least one feedback to the neural network may include at least one outcome for at least one individual having undertaken a resolution path for a the determined type of life occurrence.

A method is disclosed herein that includes determining a type of life occurrence of an individual based, at least in part, on a multidimensional data set and generating a resolution path adapted to address the life occurrence via a life occurrence node. In an aspect, at least one of the determining and generating is based, at least in part, on the application of an algorithm and wherein at least one feedback to the algorithm may include at least one of an appropriateness of a prior generated resolution path and a correctness of a previously determined life occurrence. The life occurrence node may include a mobile phone. The multidimensional data set may be formed, at least in part, via operation of a mobile transaction platform. The mobile transaction platform may be resident on the life occurrence node. The life occurrence node may include a mobile phone. The at least one feedback to the algorithm is among fuzzy logic and neural network elements performing the algorithm.

A computer readable storage medium having data stored therein representing software executable by a computer is disclosed herein. The software may include instructions to determine a type of life occurrence of an individual based, at least in part, on a multidimensional data set and instructions to generate a resolution path adapted to address the life occurrence via a life occurrence node. In an aspect, at least one of the determining and generating is based, at least in part, on the application of an algorithm and wherein at least one feedback to the algorithm comprises at least one of an appropriateness of a prior generated resolution path and a correctness of a previously determined life occurrence. The life occurrence node may include a mobile phone. The multidimensional data set may be formed, at least in part, via operation of a mobile transaction platform. The mobile transaction platform may be resident on the life occurrence node. The life occurrence node may include a mobile phone. The at least one feedback to the algorithm is among fuzzy logic and neural network elements performing the algorithm.

A method is disclosed herein that includes determining a type of life occurrence of an individual based, at least in part, on a multidimensional data set constructed in connection with a mobile transaction platform (MTP) through which the individual conducts transactions and generating a resolution action that, when activated by the individual triggers invocation of a resolution path adapted to address the life occurrence via a life occurrence node. In an aspect, at least one of the determining and generating is based, at least in part, on the application of an algorithm and wherein at least one feedback to the algorithm comprises at least one of an appropriateness of a prior generated resolution path and a correctness of a previously determined life occurrence.

A method is disclosed herein that includes determining a type of life occurrence of an individual based, at least in part, on a multidimensional data set and generating a resolution path adapted to address the life occurrence via a life occurrence node. The multidimensional data set is formed, in part, utilizing data generated from a mobile transaction platform via which an individual conducts mobile transactions. The method may further includes utilizing data from a third party analytics source. The mobile transaction platform may be resident at least in part on the life occurrence node. The life occurrence node may include a mobile phone.

A computer readable storage medium having data stored therein representing software executable by a computer is disclosed herein. The software may include instructions to determine a type of life occurrence of an individual based, at least in part, on a multidimensional data set and generate a resolution path adapted to address the life occurrence via a life occurrence node. The multidimensional data set may be formed, in part, utilizing data generated from a mobile transaction platform via which an individual conducts mobile transactions. The method further includes utilizing data from a third party analytics source. The mobile transaction platform may be resident at least in part on the life occurrence node. The life occurrence node may include a mobile phone.

A method is disclosed herein that may include determining a type of life occurrence of an individual based, at least in part, on a multidimensional data set and generating a resolution action that, when activated by the individual triggers invocation of a resolution path adapted to address the life occurrence via a life occurrence node. The multidimensional data set may be formed, in part, utilizing data generated from a mobile transaction platform via which an individual conducts mobile transactions.

A method is disclosed herein that includes determining a type of life occurrence of an individual based, at least in part, on a multidimensional data set and generating a resolution path adapted to address the life occurrence via a life occurrence node. The step of generating the resolution path is based, at least in part, on a context of an individual that comprises data from a mobile transaction platform via which the individual conducts mobile transactions, data from a third party source relating to the individual, and location data of the individual at a point in time. The mobile transaction platform may be resident on the life occurrence node. The life occurrence node may include a mobile phone.

The resolution path may be generated utilizing a pre-learned preference from a past transaction of the individual, a change in a pattern of the individual, and at least one of a level of loyalty to a customer loyalty program, an account status, and a credit card status. The resolution path may be generated utilizing data indicative of a purchase by the individual. The resolution path may include at least one trigger related to a level of loyalty points.

A computer readable storage medium having data stored therein representing software executable by a computer is disclosed herein. The software may include instructions to determine a type of life occurrence of an individual based, at least in part, on a multidimensional data set and instructions to generate a resolution path adapted to address the life occurrence via a life occurrence node. The step of generating the resolution path is based, at least in part, on a context of an individual that comprises data from a mobile transaction platform via which the individual conducts mobile transactions, data from a third party source relating to the individual, and location data of the individual at a point in time. The mobile transaction platform may be resident on the life occurrence node. The life occurrence node may include a mobile phone. The resolution path may be generated utilizing a pre-learned preference from a past transaction of the individual, a change in a pattern of the individual, and at least one of a level of loyalty to a customer loyalty program, an account status, and a credit card status. The resolution path may be generated utilizing data indicative of a purchase by the individual. The resolution path may include at least one trigger related to a level of loyalty points.

A method is disclosed herein that includes determining a type of life occurrence of an individual based, at least in part, on a multidimensional data set and generating a resolution action that, when activated by the individual triggers invocation of a resolution path adapted to address the life occurrence via a life occurrence node. The step of generating the resolution action is based, at least in part, on a context of an individual that comprises data from a mobile transaction platform via which the individual conducts mobile transactions, data from a third party source relating to the individual, and location data of the individual at a point in time.

A method is disclosed herein that includes determining a type of life occurrence of an individual based, at least in part, on a multidimensional data set constructed, at least in part, via interaction with a mobile transaction platform by which an individual conducts at least one transaction. The method further includes generating a resolution path adapted to address the life occurrence via a life occurrence node. The resolution path may be based, at least in part, on a combination of an outcome predicted for the individual and an assessment of a risk imposed by the resolution path on a third party service provider that supports, at least in part, the resolution path. The assessment of risk may include an assessment of a cumulative risk of the service provider with respect to the individual. In an aspect, the assessment of risk may include an assessment of a risk of the individual across a plurality of service providers. The mobile transaction platform may be resident on the life occurrence node. The life occurrence node may include a mobile phone. The at least one user transaction may be stored on a third-party source.

A computer readable storage medium having data stored therein representing software executable by a computer is disclosed herein. The software may include instructions to determine a type of life occurrence of an individual based, at least in part, on a multidimensional data set constructed, at least in part, via interaction with a mobile transaction platform by which an individual conducts at least one transaction and generate a resolution path adapted to address the life occurrence via a life occurrence node. The resolution path may be based, at least in part, on a combination of an outcome predicted for the individual and an assessment of a risk imposed by the resolution path on a third party service provider that supports, at least in part, the resolution path. The assessment of risk may include an assessment of a cumulative risk of the service provider with respect to the individual. The assessment of risk may include an assessment of a risk of the individual across a plurality of service providers. The mobile transaction platform may be resident on the life occurrence node. The life occurrence node may include a mobile phone. The at least one user transaction may be stored on a third-party source.

A method is disclosed herein that may include determining a type of life occurrence of an individual based, at least in part, on a multidimensional data set constructed, at least in part, via interaction with a mobile transaction platform by which an individual conducts at least one transaction and generating a resolution action that, when activated by the individual triggers invocation of a resolution path adapted to address the life occurrence via a life occurrence node. The resolution path may be based, at least in part, on a combination of an outcome predicted for the individual and an assessment of a risk imposed by the resolution path on a third party service provider that supports, at least in part, the resolution path.

A method is disclosed herein that may include analyzing one or more mobile transactions processed by a mobile transaction platform, life occurrence metadata and user related data derived, at least in part, from third party data sources in order to determine a plurality of resolution actions in response to a life occurrence and presenting the plurality of resolution actions to a user. The method may further include pre-configuring at least one mobile transaction to facilitate an execution of the plurality of resolution actions in response to a user selection of the at least one of the plurality of resolution actions. The method may further include pre-configuring at least one mobile transaction to facilitate an execution of the plurality of resolution actions; and performing the at least one mobile transaction. The method may further include performing the at least one mobile transaction does not require user selection of a transaction. The step of performing the at least one mobile transaction may not require user selection of a resolution action. The resolution action when activated by the individual triggers invocation of a resolution path adapted to address the life occurrence via a life occurrence node.

A computer readable storage medium having data stored therein representing software executable by a computer is disclosed herein. The software may include instructions to analyze one or more mobile transactions processed by a mobile transaction platform, life occurrence metadata and user related data derived, at least in part, from third party data sources in order to determine a plurality of resolution actions in response to a life occurrence and instructions to present the plurality of resolution actions to a user. The computer readable storage medium may further include instructions to pre-configure at least one mobile transaction to facilitate an execution of the plurality of resolution actions in response to a user selection of the at least one of the plurality of resolution actions. The computer readable storage medium may further include instruction to pre-configure at least one mobile transaction to facilitate an execution of the plurality of resolution actions; and to perform the at least one mobile transaction. The step of performing the at least one mobile transaction may not require user selection of a transaction. The step of performing the at least one mobile transaction may not require user selection of a resolution action. The resolution action when activated by the user triggers invocation of a resolution path adapted to address the life occurrence via a life occurrence node.

A method is disclosed herein that may include analyzing one or more mobile transactions processed by a mobile transaction platform, life occurrence metadata and user related data derived, at least in part, from third party data sources in order to determine a plurality of resolution actions in response to a life occurrence and configuring a plurality of mobile transactions to facilitate the execution of the plurality of resolution actions. The method may further include presenting the plurality of mobile transactions to a user in response to a detection of at least one trigger event associated with the life occurrence. The life occurrence may be an event in the user's life that has not yet occurred. In another aspect, the life occurrence may be a user-related event that occurred in the past.

A computer readable storage medium having data stored therein representing software executable by a computer is disclosed herein. The software may include instructions to analyze one or more mobile transactions processed by a mobile transaction platform, life occurrence metadata and user related data derived, at least in part, from third party data sources in order to determine a plurality of resolution actions in response to a life occurrence and to configure a plurality of mobile transactions to facilitate the execution of the plurality of resolution actions. The software may further include instructions to present the plurality of mobile transactions to a user in response to a detection of at least one trigger event associated with the life occurrence. The life occurrence is an event in the user's life that has not yet occurred in an aspect. The life occurrence is a user-related event that occurred in the past in another aspect.

A mobile transaction platform (MTP) is disclosed herein that may include a transactional analytics facility that analyzes at least one user transaction conducted with the MTP and creates at least one of a user profile, a dynamic profile of the user, and a multidimensional context for use by an expert engine. The MTP further include the expert engine that determines a life occurrence based on the multidimensional context and user-related data from third-party sources, and generates a resolution path of resolution actions that are responsive to one or more action trigger-events for resolving one or more aspects of the life occurrence. The MTP further includes at least one life occurrence container deployed on a life occurrence node. The life occurrence container may alert a user of the life occurrence node to the resolution path, gather a user response to the alert, and generate one or more life occurrence node-based transactions matched to the resolution path. The life occurrence container may be in electronic communication with the mobile transaction facility to maintain currency of life occurrences, trigger-events, and resolution actions. The transaction facility and the expert engine exchange resolution trigger-events, static user profiles, and dynamic user profiles. The expert engine may determine a life occurrence using a combination of at least two of fuzzy logic, machine learning, and neural networks. The expert engine and the transaction facility may access one or more ecosystem resources when determining and analyzing through an enterprise service bus or a utility resource access switch. The ecosystem resources may include at least one each of third party analytics, a social network interface, a context driver, an offer, a value added service, a trusted service manager (TSM), a certificate authoritie (CA), and a database. The life occurrence node may be a mobile device. The mobile device may be used to select one of the life occurrence node-based transactions. In an aspect, a personalized instrument may be configured to securely cause the life occurrence node-based transaction matched to the resolution path to be executed by a server. The user transactions and user-related data from third-party sources may be stored in a multi-dimensional database. The analysis by the transactional analytics facility may produce transactional analytics data. The expert engine may be configured to consolidate the transactional analytics data with data from a third party source of user data and with a current context in determining the life occurrence. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The at least one user profile or dynamic profile may also used be in determining the life occurrence.

A non-transitory computer readable medium with an executable program stored thereon is disclosed herein. The program instructs a microprocessor to perform the steps of determining and resolving a life occurrence. The steps may include analyzing at least one user transaction conducted with a mobile transaction platform (MTP) to create at least one of a user profile, a dynamic profile of the user, and a multidimensional context, determining a life occurrence based on at least one of the multidimensional context, the user profile, and the dynamic profile, and user-related data from third-party sources, generating a resolution path of one or more action trigger-events for resolving one or more aspects of the life occurrence, alerting a user, using a life occurrence container deployed on a life occurrence node, to the resolution path, gathering a user response to the alert, and generating one or more life occurrence node-based transactions matched to the resolution path. The step of determining a life occurrence may involve using a combination of at least two of fuzzy logic, machine learning, and neural networks. The step of determining and analyzing may involve accessing one or more enterprise resources through at least one of an enterprise service bus and a utility resource access switch. The ecosystem resources may include at least one each of third party analytics, a social network, a context driver, an offer, a value added service, a trusted service manager (TSM), a certificate authority (CA), and a database. The life occurrence node may be a mobile device. The mobile device may be used to select one of the life occurrence node-based transactions. The steps may further include providing a personalized instrument configured to securely cause the life occurrence node-based transaction matched to the resolution path to be executed by a server. The user transactions and user-related data from third-party sources may be stored in a multi-dimensional database. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A mobile transaction platform (MTP) is disclosed herein that may include a transactional analytics facility that analyzes at least one user transaction conducted with the MTP and creates at least one of a user profile, a dynamic profile of the user, and a multidimensional context for use by an expert engine. The MTP may further include the expert engine that determines a life occurrence based on the multidimensional context and user-related data from third-party sources, and generates a resolution path of one or more resolution actions for resolving one or more aspects of the life occurrence; and at least one life occurrence container deployed on a life occurrence node, wherein the life occurrence container executes at least one transaction of at least one resolution action of the resolution path.

A mobile transaction platform (MTP) is disclosed herein that may include a multidimensional data set of transaction details of transactions conducted by a user through the MTP and a transactional analytics facility for analyzing the multidimensional data set to produce a context for at least one of a life occurrence determination and a resolution of at least one aspect of a life occurrence. The platform may further include an expert engine that uses the context to determine a life occurrence and at least one resolution path for the life occurrence. The step of determining may involve using a combination of at least two of fuzzy logic, machine learning, and neural networks. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The data in the multidimensional data set may at least be one of client specific data and service provider specific data. The multidimensional data set may be a user database. The transactional analytics facility may analyze the data in the context of other users to establish a weighting. The transactional analytics facility may analyze the data in the context of similar or interested vendors to establish a weighting. The platform may further include an expert engine configured to consolidate the context with at least one third party source of user data in determining the life occurrence.

A non-transitory computer readable medium with an executable program stored thereon is disclosed herein. The program may instruct a microprocessor to perform the steps of determining a context for determining a life occurrence. The steps may include gathering transaction details of transactions conducted by a user through a mobile transaction platform into a multidimensional data set and analyzing, using a transactional analytics facility. The multidimensional data set may produce a context for at least one of a life occurrence determination and a resolution. The step of determining may involve using a combination of at least two of fuzzy logic, machine learning, and neural networks. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The data in the multidimensional data set may at least be one of client specific and service provider specific. The multidimensional data set may be a user database. The analysis of the data may be done in the context of other users to establish a weighting. The analysis of the data may be done in the context of similar or interested vendors to establish a weighting. The computer readable medium may further store instructions to perform consolidating the context with at least one third party source of user data in determining the life occurrence.

An instrument-based mobile transaction platform is disclosed herein that may include a transaction facility that handles transactions of a plurality of personal mobile devices registered to perform transactions with the transaction facility and configured with at least one life occurrence capable executable container, analyzes the transactions, and populates a multidimensional context with output from the analysis. The platform may further include an expert engine that determines life occurrences based on the multidimensional context and third-party sources of user-related data and that generates a resolution path for resolving one or more aspects of the life occurrence, the resolution path having a series of resolution actions that are responsive to trigger-events related to the life occurrence and that lead to resolution of the life occurrence. The platform may further include an enterprise service bus for facilitating access by the expert engine and the transaction facility to one or more ecosystem resources and at least one life occurrence container deployed on a life occurrence node. The life occurrence container may alert a user of the life occurrence node to resolution actions available for addressing an aspect of the life occurrence, gathers a user response to the alert, and provides a personalized instrument configured to securely cause a life occurrence-based, mobile transaction matched to the resolution action to be executed by a server. The life occurrence container may be in electronic communication with the transaction facility to maintain currency of life occurrences, trigger-events, and resolution actions. The transaction facility and the expert engine may exchange resolution trigger-events, static user profiles, and dynamic user profiles. In an aspect, at least one static user profile or at least one dynamic user profile may also used be in determining the life occurrence. The expert engine may determine life occurrences using a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The analysis by the transactional analytics facility may produce transactional analytics data. The expert engine may be configured to consolidate transactional analytics data with at least one of a third party source of user data and a current context in determining the life occurrence. The context may include vendor personalization of a widget executing in the container and at least one context item selected from a list of context items consisting of a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein. The program instructs a microprocessor to perform steps of determining and resolving a life occurrence. The steps may include analyzing at least one user transaction conducted with a mobile transaction platform (MTP) to create a static user profile, a dynamic profile of the user, and a multidimensional context comprising data representing aspects of a plurality of user-specific life occurrences, determining a life occurrence based on user-related data from third-party sources and at least one of the multidimensional context, the static user profile, and the dynamic profile, generating a resolution path of one or more action trigger-events for resolving one or more aspects of the life occurrence, alerting a user, using a life occurrence container deployed on a life occurrence node, to the resolution path, gathering a user response to the alert; and providing a personalized instrument configured to securely cause a life occurrence-based, mobile transaction matched to the resolution path to be executed cooperatively with a server. The step of determining involves using a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

An instrument-based life occurrence transaction platform is disclosed herein that may include a transaction facility for handling transactions of a personal mobile device, analyzing the transactions, and extracting a multidimensional context from the analysis, the multidimensional context comprising data representing aspects of a plurality of user-specific life occurrences. The platform may further include an expert engine that determines user-specific life occurrences based on the multidimensional context and third-party sources of user-related data, and generates a resolution path for resolving one or more aspects of the occurrence, the resolution path having a series of resolution actions that are performed based on occurrences of trigger-events leading to resolution of the life occurrence. The platform may further include an enterprise service bus for facilitating access by the expert engine and the transaction facility to one or more ecosystem resources and at least one life occurrence container deployed on a life occurrence node that administers selection of at least one resolution action for addressing an aspect of the life occurrence, wherein the at least one resolution action comprises providing a personalized instrument configured to securely cause a life occurrence-based, mobile transaction matched to the resolution action to be executed cooperatively with a server. The life occurrence container may be in electronic communication with the transaction facility to maintain currency of life occurrences, trigger-events, and resolution actions. The transaction facility and the expert engine may exchange resolution trigger-events, static user profiles, and dynamic user profiles. The at least one static profile or at least one dynamic profile may also be used in determining the life occurrence. The expert engine may use a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The analysis by the transactional analytics facility may produce transactional analytics data. The expert engine may be configured to consolidate transactional analytics data with at least one of a third party source of user data and a current context in determining the life occurrence. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The instrument may include metadata that identifies a transaction type accessible by a server and user/wallet/device information required to execute the transaction on behalf of the user. The instrument may be a coupon.

A non-transitory computer readable medium with an executable program stored thereon is disclosed herein. The program may instruct a microprocessor to perform steps of determining and resolving a life occurrence. The steps may include analyzing at least one user transaction conducted with a mobile transaction platform (MTP) to create at least one each of a user profile, a dynamic profile of the user, and a multidimensional context comprising data representing aspects of a plurality of user-specific life occurrences, determining a life occurrence based on user-related data from third-party sources and at least one of the multidimensional context, the user profile, and the dynamic profile, generating a resolution path for resolving one or more aspects of the life occurrence and providing a personalized instrument configured to securely cause a life occurrence-based, mobile transaction matched to the resolution action to be executed cooperatively with a server. The step of determining involves using a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The instrument may include metadata that identifies a transaction type accessible by a server and user/wallet/device information required to execute the transaction on behalf of the user. The instrument may be a coupon.

An instrument-based life occurrence transaction platform is disclosed herein that may include a transaction facility for handling transactions of a personal mobile device, analyzing the transactions, and providing the analysis to an expert engine as multidimensional context comprising data representing aspects of a plurality of user-specific life occurrences. The platform may further include the expert engine that determines life occurrences based on the multidimensional context and third-party sources of user-related data, and generates a resolution path for resolving one or more aspects of the occurrence, the resolution path having a plurality of resolution actions that are optionally performed based on occurrences of trigger-events leading to resolution of the life occurrence. The platform may further include a utility access switch for facilitating access by the expert engine and the transaction facility to one or more ecosystem resources and at least one life occurrence container deployed on a life occurrence node that administers selection of at least one resolution action for addressing an aspect of the life occurrence. The at least one resolution action comprises providing a personalized instrument configured to securely cause a life occurrence-based, mobile transaction matched to the resolution action to be executed cooperatively with a server. The life occurrence container may be in electronic communication with the transaction facility to maintain currency of life occurrences, trigger-events, and resolution actions. The transaction facility and the expert engine may exchange resolution trigger-events, static user profiles, and dynamic user profiles. The at least one static profile or at least one dynamic profile may also be used in determining the life occurrence. The expert engine may use a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The analysis by the transactional analytics facility may produce transactional analytics data. The expert engine may be configured to consolidate transactional analytics data with at least one of a third party source of user data and a current context in determining the life occurrence. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The instrument may include metadata that identifies a transaction type accessible by a server and user/wallet/device information required to execute the transaction on behalf of the user. The instrument may be a coupon.

A non-transitory computer readable medium with an executable program stored thereon is disclosed herein. The program may instruct a microprocessor to perform steps of determining and resolving a life occurrence that may include analyzing at least one user transaction conducted with a mobile transaction platform (MTP) to create at least one each of a user profile, a dynamic profile of the user, and a multidimensional context comprising data representing aspects of a plurality of user-specific life occurrences. The steps may further include determining a life occurrence based on at least one of the multidimensional context, the user profile, and the dynamic profile, and user-related data from third-party sources, generating a resolution path for resolving one or more aspects of the life occurrence and providing a personalized instrument configured to securely cause a life occurrence-based, mobile transaction matched to the resolution action to be executed cooperatively with a server. The step of determining may involve using a combination of at least two of fuzzy logic, machine learning, and neural networks. The ecosystem resources may include at least one each of third party analytics, a social network, a context driver, an offer, a value added service, a trusted service manager (TSM), a certificate authority (CA), and a database. The life occurrence node may be a mobile device. The user transactions and user-related data from third-party sources may be stored in a multi-dimensional database. The context may include vendor personalization of a widget executing in the container and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The instrument may include metadata that identifies a transaction type accessible by a server and user/wallet/device information required to execute the transaction on behalf of the user. The instrument may be a coupon.

An expert engine is disclosed herein that may include a processor that uses one or more algorithms to consolidate various transactional analytics from a mobile transaction platform (MTP) with data from third party sources to produce a multidimensional data set comprising data representing aspects of a plurality of user-specific life occurrences. The expert engine may further include the processor further programmed with a high-speed algorithm to determine a type of life occurrence of an individual among a set of possible life occurrences based at least in part on the multidimensional data set in real-time or near real-time, a resolution path generation facility that generates a plurality of resolution paths having a series of action events leading to resolution of at least one life occurrence of the determined type of life occurrence and a communications interface between the MTP and the expert engine that facilitates the sharing of responses to the action events between the MTP and expert engine, wherein at least one of determining the type of life occurrence and generating the plurality of resolution paths is based on the shared responses. The high-speed algorithm may determine using at least one of temporal data, spatial data and risk assessment. The response to the action events may be via use of a life occurrence node. The life occurrence node may be a mobile device. The processor may further generate a multidimensional context used by the high-speed algorithm in determining a life occurrence. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

An expert engine is disclosed herein that may include a processor that is programmed with a high-speed algorithm to determine a type of life occurrence of an individual among a set of possible life occurrences based at least in part on a multidimensional data set comprising data representing aspects of a plurality of user-specific life occurrences. The expert engine may further include a resolution path generation facility that generates a resolution path having a series of action events leading to resolution at least one life occurrence aspect that is common to the life occurrences in the determined type of the life occurrence and a communications interface between the MTP and the expert engine that facilitates the sharing of responses to the action events between the MTP and expert engine, wherein at least one of determining the type of life occurrence and generating the resolution path is based on the shared responses.

A non-transitory computer readable medium with an executable program stored thereon is disclosed herein. The program may instruct a microprocessor to perform steps of determining a life occurrence and generating a resolution path. The steps may include determining, using an algorithm deployed on a processor, a type of life occurrence of an individual among a set of possible life occurrences based at least in part on a multidimensional data set comprising data representing aspects of a plurality of individual-specific life occurrences, generating, using a resolution path generation facility, a resolution path having a series of action events leading to resolution of the life occurrence, and sharing responses to the action events from a life occurrence node with the processor and resolution path generation facility, wherein at least one of determining the type of life occurrence and generating the resolution path is based on the shared responses. The algorithm may determine using at least one of temporal data, spatial data and risk assessment.

The life occurrence node may be a mobile device. The steps may further include generating a multidimensional context used by the algorithm in determining a life occurrence. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A transactional analytics facility is disclosed herein that may include a processor that analyzes user transactions conducted through a mobile transaction platform (MTP) and third-party sources of user-related data to generate a static user profile and a memory for storing the static user profile where it can be accessed by an expert engine in determining a life occurrence based on multidimensional context comprising data representing aspects of a plurality of user-specific life occurrences. The aspects may be derived from analysis of the static user profile, and current context. The current context may include at least one of time, space, and user input. The multidimensional context may include a time, a location, a transaction detail, and at least one of an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The current context may include a risk assessment. The transactional analytics facility may be in electronic communication with a mobile transaction platform (MTP). The facility may further include a user interface that allows a user to limit which user transactions and third-party sources of user-related data can be used to generate the static user profile.

A transactional analytics facility is disclosed herein that may include a processor that analyzes user transactions conducted through a mobile transaction platform (MTP) and third-party sources of user-related data to generate a static user profile and a memory for storing the static user profile where it can be accessed by an expert engine in determining a life occurrence based on multidimensional context comprising data representing aspects of a plurality of user-specific life occurrences. The aspects may be derived from analysis of the static user profile, and current context. The facility may further include a user interface that may allow a user to limit which user transactions and third-party sources of user-related data can be used to generate the static user profile. The current context may include at least one of time, space, and user input. The multidimensional context may include a time, a location, a transaction detail, and at least one of an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The current context may include a risk assessment. The transactional analytics facility may be in electronic communication with a mobile transaction platform (MTP).

A mobile transaction platform (MTP) is disclosed herein that may include a transactional analytics facility that creates a static profile of the user for use by an expert engine of the MTP and the expert engine that determines a life occurrence based on multidimensional context derived from analysis of user transactions associated with the MTP and third-party sources of user-related data, and that generates at least one resolution path for resolving one or more aspects of the life occurrence. The resolution path may include a series of action trigger events leading to resolution of the life occurrence. The transaction facility and the expert engine may exchange resolution trigger-events, static user profiles, and dynamic user profiles. The expert engine may use a combination of at least two of fuzzy logic, machine learning, and neural networks. The expert engine and the transaction facility may access one or more ecosystem resources when determining and analyzing through an enterprise service bus. The ecosystem resources may include at least one each of third party analytics, a social network, a context driver, an offer, a value added service, a trusted service manager (TSM), a certificate authority (CA), and a database. The platform may further include at least one life occurrence container deployed on a life occurrence node. The life occurrence container may alert a user of the life occurrence node to the resolution path, gather a user response to the alert, and generate one or more life occurrence node-based transactions matched to the resolution path. The life occurrence node may be a mobile device. The mobile device may be used to select one of the life occurrence node-based transactions. A personalized instrument may be configured to securely cause the life occurrence node-based transaction matched to the resolution path to be executed by a server. The user transactions and user-related data from third-party sources may be stored in a multi-dimensional database. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The platform may further include at least one life occurrence container deployed on a life occurrence node that administers selection of at least one resolution action for addressing an aspect of the life occurrence. The at least one resolution action may include providing a personalized instrument configured to securely cause a life occurrence-based, mobile transaction matched to the resolution action to be executed cooperatively with a server. The life occurrence node may be a mobile device.

A mobile transaction platform (MTP) is disclosed herein that may include a transactional analytics facility that creates a dynamic profile of the user for use by an expert engine of the MTP and the expert engine that determines a life occurrence based on multidimensional context derived from analysis of user transactions associated with the MTP and third-party sources of user-related data, and that generates at least one resolution path for resolving one or more aspects of the life occurrence, the resolution path having a series of action trigger events leading to resolution of the life occurrence. The transaction facility and the expert engine may exchange resolution trigger-events, static user profiles, and dynamic user profiles. The expert engine may use a combination of at least two of fuzzy logic, machine learning, and neural networks. The expert engine and the transaction facility may access one or more ecosystem resources when determining and analyzing through an enterprise service bus. The ecosystem resources may include at least one each of third party analytics, a social network, a context driver, an offer, a value added service, a trusted service manager (TSM), a certificate authority (CA), and a database. The platform may further include at least one life occurrence container deployed on a life occurrence node. The life occurrence container may alert a user of the life occurrence node to the resolution path, gather a user response to the alert, and generate one or more life occurrence node-based transactions matched to the resolution path. The life occurrence node may be a mobile device. The mobile device may be used to select one of the life occurrence node-based transactions. A personalized instrument may be configured to securely cause the life occurrence node-based transaction matched to the resolution path to be executed by a server. The user transactions and user-related data from third-party sources may be stored in a multi-dimensional database. The context may include vendor personalization of a widget executing in a life occurrence enabled container of a mobile device of the user and at least one context item selected from a list of context items consisting of: a time, a location, a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information. The platform may further include at least one life occurrence container deployed on a life occurrence node that administers selection of at least one resolution action for addressing an aspect of the life occurrence. The at least one resolution action comprises providing a personalized instrument configured to securely cause a life occurrence-based, mobile transaction matched to the resolution action to be executed cooperatively with a server.

A non-transitory computer readable medium with an executable program stored thereon is disclosed herein. The program may instruct a microprocessor to perform steps that may include creating a dynamic profile of the user for use by an expert engine of a mobile transaction platform (MTP), determining a life occurrence based on multidimensional context derived from analysis of user transactions associated with the MTP and third-party sources of user-related data and generating at least one resolution path for resolving one or more aspects of the life occurrence, the resolution path having a series of action trigger events leading to resolution of the life occurrence. The step of determining may involve a combination of at least two of fuzzy logic, machine learning, and neural networks. The steps may further include deploying at least one life occurrence container on a life occurrence node. The life occurrence container may alert a user of the life occurrence node to the resolution path, gather a user response to the alert, and generate one or more life occurrence node-based transactions matched to the resolution path. The life occurrence node may be a mobile device. The mobile device may be used to select one of the life occurrence node-based transactions. A personalized instrument may be configured to securely cause the life occurrence node-based transaction matched to the resolution path to be executed by a server. The steps may further include deploying at least one life occurrence container on a life occurrence node that administers selection of at least one resolution action for addressing an aspect of the life occurrence. The at least one resolution action may include providing a personalized instrument configured to securely cause a life occurrence-based, mobile transaction matched to the resolution action to be executed cooperatively with a server.

A transactional analytics facility is disclosed herein that may include a communications facility that gathers multidimensional life occurrence context from a mobile transaction platform (MTP) and a processor that analyzes user transactions conducted through the MTP. The multidimensional life occurrence context and third-party sources of user-related data may generate a risk profile of a user, trigger-events, third-parties, resolution actions, life occurrences, and potential transactions. The risk profile may be used for determining if one or more resolution actions are suitable for presenting to the user. The risk profile may be used to rank resolution actions. The risk profile may relate to the risk of a transaction for a vendor.

A mobile transaction platform (MTP) is disclosed herein that may include a lifestyle container deployed on a life occurrence node that gathers multidimensional life occurrence context, a transactional analytics facility that analyzes data extracted from a plurality of user transactions by the MTP, third-party sources of user-related data, and the multidimensional life occurrence context to generate a risk profile of a user, trigger-events, third-parties, resolution actions, life occurrences, and potential transactions and an expert engine that uses the risk profile to perform a risk-based ranking of resolution actions. The risk profile may further be used by the expert engine for determining if one or more resolution actions are suitable for presenting to the user. The risk profile may relate to the risk of a transaction for a vendor. The life occurrence node may be a mobile device.

A mobile transaction platform (MTP) is disclosed herein that may include a lifestyle container deployed on a life occurrence node that gathers multidimensional life occurrence context, a transactional analytics facility that analyzes user transactions conducted by the life occurrence node through the MTP, third-party sources of user-related data, and the multidimensional life occurrence context to generate a risk profile of a user, trigger-events, third-parties, resolution actions, life occurrences, and potential transactions and an expert engine that uses the risk profile to determine if one or more resolution actions are suitable for presenting to the user. The risk profile may relate to the risk of a transaction for a vendor. The expert engine may further use the risk profile to perform a ranking of resolution actions. The life occurrence node may be a mobile device.

A non-transitory computer readable medium with an executable program stored thereon is disclosed herein. The program may instruct a microprocessor to perform steps that may include gathering multidimensional life occurrence context from a mobile transaction platform (MTP) and analyzing user transactions associated with the MTP. The multidimensional life occurrence context and third-party sources of user-related data may generate a risk profile of a user, trigger-events, third-parties, resolution actions, life occurrences, and potential transactions. The risk profile may be used for determining if one or more resolution actions are suitable for presenting to the user. The risk profile may be used to rank resolution actions. The risk profile may relate to the risk of a transaction for a vendor.

A non-transitory computer readable medium with an executable program stored thereon is disclosed herein. The program may instruct a microprocessor to perform steps that may include gathering multidimensional life occurrence context, analyzing user transactions associated with the MTP, third-party sources of user-related data, and the multidimensional life occurrence context to generate a risk profile of a user, trigger-events, third-parties, resolution actions, life occurrences, and potential transactions, and ranking resolution actions based on the risk profile. The steps may further include determining if one or more resolution actions are suitable for presenting to the user based on the risk profile. The risk profile may relate to the risk of a transaction for a vendor.

A non-transitory computer readable medium with an executable program stored thereon is disclosed herein. The program may instruct a microprocessor to perform steps that may include gathering multidimensional life occurrence context, analyzing user transactions associated with the MTP, third-party sources of user-related data, and the multidimensional life occurrence context to generate a risk profile of a user, trigger-events, third-parties, resolution actions, life occurrences, and potential transactions and determining if one or more resolution actions are suitable for presenting to the user based on the risk profile. The risk profile may relate to the risk of a transaction for a vendor. The steps may further include performing a ranking of resolution actions based on the risk profile.

A method for configuring an eco-system enabled life occurrence container operating on a mobile device to address a life occurrence is disclosed herein that may include. The method may include developing and storing on a non-transient computer readable medium a context for trigger-events based, at least in part, on life occurrence time data, user and life occurrence location data, transaction analytics of transactions conducted through a mobile transaction platform of the eco-system, and third-party user-related data, monitoring the trigger-event context to detect at least one trigger-event indicative of a life occurrence, deploying on the mobile device at least one personalized widget available in the eco-system that facilitates delivery of a third-party provided service for addressing the life occurrence, associating at least one resolution action presented to a user in response to a detected trigger-event with preconfigured mobile transactions for executing the at least one resolution action in response to a user acceptance of the presented action, and pre-configuring mobile transactions that are executed via the personalized widgets to effect delivery of the third-party service that satisfies an aspect of the life occurrence. The method may further include updating the trigger-event context through an enabling layer operable on the mobile device. The enabling layer may provide access to at least one trigger-event context source. The at least one trigger-event context source comprises at least one of a GPS data source, a clock and a calendar. The third-party user-related data may include at least one of social data, calendar data and family associations.

A computer readable storage medium having data stored therein representing software executable by a computer to configure an eco-system enabled life occurrence container operating on a mobile device to address a life occurrence is disclosed herein. The software may include instructions to develop and store on a non-transient computer readable medium a context for trigger-events based, at least in part, life occurrence time data, user and life occurrence location data, transaction analytics of transactions conducted through a mobile transaction platform of the eco-system, and third-party user-related data, instructions to monitor the trigger-event context to detect at least one trigger-event indicative of a life occurrence, instructions to deploy on the mobile device at least one personalized widget available in the eco-system that facilitates delivery of a third-party provided service for addressing the life occurrence, instructions to associate at least one resolution action presented to a user in response to a detected trigger-event with preconfigured mobile transactions for executing the at least one resolution action in response to a user acceptance of the presented action and instructions to pre-configure mobile transactions that are executed via the personalized widgets to effect delivery of the third-party service that satisfies an aspect of the life occurrence. The steps may further include updating the trigger-event context through an enabling layer operable on the mobile device. The enabling layer may provide access to at least one trigger-event context source. The at least one trigger-event context source may include at least one of a GPS data source, a clock and a calendar. The third-party user-related data may include at least one of social data, calendar data and family associations.

A mobile device configured for life occurrence resolution is disclosed herein that may include a life occurrence container operable on a life occurrence node operable to coordinate the operation of at least two of a detection of at least one trigger-event, a use of at least one personalized widget, a presentation of at least one resolution action and an execution of preconfigured actions to facilitate addressing a life occurrence. The mobile device may further include at least one personalized widget for facilitating service delivery associated with a preconfigured transaction with a vendor that is determined from analysis of mobile transactions processed through a mobile transaction platform, life occurrence metadata, and user-related data derived from third party user data sources. The mobile device may further include an enabling layer operable on the mobile device for facilitating interoperation of the life occurrence container and life occurrence node resources comprising at least one of a user interface, communications and secure element access and at least one electronic wallet operable on the life occurrence node that the personalized widget is authorized to access for facilitating service delivery. The life occurrence node may be the mobile device. The preconfigured actions may include mobile transactions. The life occurrence may be predicted based, at least in part, on user-specific mobile transactions processed through a mobile transaction platform and user-related data derived from third party user data sources. The service delivery may be facilitated via a service layer of a platform for secure personalized transactions.

A non-transitory computer readable medium with an executable program stored thereon is disclosed herein. The program may instruct a microprocessor to perform steps that may include configuring an eco-system-enabled life occurrence container that is operable on a life occurrence node to facilitate coordinating detection and monitoring of trigger-events for addressing a life occurrence. The steps of configuring may include generating context at an expert engine for trigger-events based on at least one of a life occurrence time, a life occurrence location, transaction analytics of user-specific transactions conducted through a mobile transaction platform, third-party user-related data, and a risk to a vendor of a transaction between a user and the vendor and programming the life occurrence container to monitor the trigger-event context for detection of trigger-events. The program may instruct a microprocessor to perform the steps that may further include synchronizing the life occurrence container with at least one of the expert engine and a mobile transaction platform (MTP) through which transactions are conducted on behalf of a user via a life occurrence node to maintain a current context for the trigger-events. The step of synchronizing may include updating the trigger-event context of the life occurrence container through an enabling layer operable on the life occurrence node. The enabling layer may provide access to trigger-event context sources. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, a transaction detail, and at least one of an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A sync architecture is disclosed herein that may include an eco-system-enabled life occurrence container, that is operable on a life occurrence node, and is configured to facilitate coordinating monitoring and detection of trigger-events for addressing a life occurrence. The architecture may include an expert engine that generates context for trigger-events based on at least one of time, a location, transaction analytics, third-party user-related data, and a risk and a communications facility for synchronizing the life occurrence container with at least one of the expert engine and a mobile transaction platform (MTP) through which transactions are conducted on behalf of a user via a life occurrence node to maintain a current context for the trigger-events. The step of synchronizing may include updating the trigger-event context of the life occurrence container through an enabling layer operable on the life occurrence node. The enabling layer may provide access to trigger-event context sources. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, a transaction detail, and at least one of an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein. The program may instruct a microprocessor to perform steps that may include configuring an eco-system-enabled life occurrence container that is operable on a life occurrence node to facilitate coordinating monitoring and detection of trigger-events for addressing a life occurrence. The step of configuring may include generating context at an expert engine for trigger-events based on at least one of time, a location, transaction analytics, third-party user-related data, and a risk. The program may instruct a microprocessor to perform steps that may further include communicating among the life occurrence container, the expert engine and a mobile transaction platform (MTP) through which a user conducts transactions via the life occurrence node to maintain current context for the trigger-events. The step of communicating may include updating the trigger-event context of the life occurrence container through an enabling layer operable on the life occurrence node. The enabling layer may provide access to trigger-event context sources. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, and at least one of a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

An enhanced communications architecture is disclosed herein that may include an eco-system-enabled life occurrence container, that is operable on a life occurrence node, and is configured to facilitate coordinating monitoring and detection of trigger-events for addressing a life occurrence. The architecture may include an expert engine that generates context for trigger-events based on at least one of time, a location, transaction analytics, third-party user-related data, and a risk and a communications facility for communicating among the life occurrence container, the expert engine and a mobile transaction platform (MTP) through which a user conducts transactions via the life occurrence node to maintain current context for the trigger-events. The step of communicating may include updating the trigger-event context of the life occurrence container through an enabling layer operable on the life occurrence node. The enabling layer may provide access to trigger-event context sources. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, and at least one of a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein. The program may instruct a microprocessor to perform the steps of a life occurrence alert that may include taking metadata that describes a future potential life occurrence, determining possible resolution actions beneficial to take in advance of the future life occurrence based on multidimensional context derived from analysis of transactions performed on behalf of a user with a life occurrence node via a mobile transaction platform and third-party sources of user-related data, and determining context of trigger-event conditions for each resolution action, monitoring trigger-event context. When trigger-event conditions are met, the steps may include presenting resolution actions that include life occurrence context that is relevant to a user making a decision about accepting the resolution action. The steps may further include preparing an action for each resolution action and adapting the action based on action/transaction context when a resolution action is accepted by the user. The action may be at least one of a mobile device action and a transaction. The preparing of the action may include configuring a widget to access an ecosystem service provider, an electronic wallet on the user's mobile device, a secure element of the mobile device, and to optionally trigger other widgets to execute on the mobile device. The preparing of the action may include configuring one or more widgets that follow user preferences for form of payment, receipt handling, and delivery/contact details to facilitate service delivery that effects the action/transaction without requiring user input. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, and at least one of a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein. The program may instruct a microprocessor to perform steps of a life occurrence alert that may include taking metadata that describes a future potential life occurrence, determining possible resolution actions beneficial to take in advance of the future life occurrence based on multidimensional context derived from analysis of transactions performed on behalf of a user with a life occurrence node via a mobile transaction platform and third-party sources of user-related data, and determining context of trigger-event conditions for each resolution action, monitoring trigger-event context. When trigger-event conditions are met, the steps may include determining if one or more resolution actions are suitable for presenting to the user. The steps may further include presenting suitable resolution actions that include life occurrence context that is relevant to a user making a decision about accepting the resolution action, preparing an action for each resolution action, adapting the action based on action/ transaction context when a resolution action is accepted by the user. The action may be at least one of a mobile device action and a transaction. The step of preparing the action may include configuring a widget to access an ecosystem service provider, an electronic wallet on the user's mobile device, a secure element of the mobile device, and to optionally trigger other widgets to execute on the mobile device. The step of preparing the action may include configuring one or more widgets that follow user preferences for form of payment, receipt handling, and delivery/contact details to facilitate service delivery that effects the action/transaction without requiring user input. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, and at least one of a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein. The program may instruct a microprocessor to perform steps of an instrument-based method of life occurrence alert. The steps may include taking metadata that describes a potential life occurrence, determining possible resolution actions beneficial to take in advance of the potential life occurrence based on multidimensional context derived from analysis of user transactions performed with a mobile device via a mobile transaction platform and third-party sources of user-related data, and determining context of trigger-event conditions for each resolution action, monitoring trigger-event context. When trigger-event conditions are met, the steps may include presenting resolution actions that include life occurrence context that is relevant to a user making a decision about accepting the resolution action. The steps may further include preparing an instrument to facilitate executing at least one of an action and a transaction for each resolution action and adapting the instrument based on context when a resolution action is accepted by the user. The instrument may include metadata that identifies a transaction type accessible by a server and user/wallet/device information required to execute the transaction on behalf of the user. The action may be a mobile device action. The steps of preparing the instrument may include configuring a widget to access an ecosystem service provider, an electronic wallet on the user's mobile device, a secure element of the mobile device, and to optionally trigger other widgets to execute on the mobile device. The step of preparing the instrument may include configuring one or more widgets that follow user preferences for form of payment, receipt handling, and delivery/contact details to facilitate service delivery that effects the action/transaction without requiring user input. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, and at least one of a transaction detail, an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A non-transitory computer readable medium with an executable program stored thereon is disclosed herein that may include. The program may instruct a microprocessor to perform steps of an instrument-based method of life occurrence alert. The steps may include taking metadata that describes a potential life occurrence, determining possible resolution actions beneficial to take in advance of the potential life occurrence based on multidimensional context derived from analysis of user transactions performed with a mobile device via a mobile transaction platform and third-party sources of user-related data, and determining context of trigger-event conditions for each resolution action, monitoring trigger-event context. When trigger-event conditions are met, the steps may include determining if one or more resolution actions are suitable for presenting to the user. The steps may further include presenting suitable resolution actions that include life occurrence context that is relevant to a user making a decision about accepting the resolution action, preparing an instrument to facilitate executing at least one of an action and a transaction for each resolution action, and adapting the instrument based on context when a resolution action is accepted by the user. The instrument may include metadata that identifies a transaction type accessible by a server and user/wallet/device information required to execute the transaction on behalf of the user. The action may be a mobile device action. The step of preparing the instrument may include configuring a widget to access an ecosystem service provider, an electronic wallet on the user's mobile device, a secure element of the mobile device, and to optionally trigger other widgets to execute on the mobile device. The step of preparing the instrument may include configuring one or more widgets that follow user preferences for form of payment, receipt handling, and delivery/contact details to facilitate service delivery that effects the action/transaction without requiring user input. The life occurrence node may be a mobile device. The trigger-event context sources may include at least one of a GPS, a clock, a calendar, an alert, an e-mail, a message, a call, and a bookmark. The life occurrence container may include at least one widget, electronic wallet, resolution action, context monitor, trigger event detector, and an enabling layer. The trigger-event context sources may include a time, a location, a transaction detail, and at least one of an urgency, an importance, the status of a credit card or account, mobile device use history, payment source, wallet state, type of transaction, product/service, vendor, delivery method, delivery arrangements, tax status, transaction participant, user preferences, the presence of a network or a particular account, user associations with a non-vendor third-party, presence of vouchers and promotions, loyalty points, third-party user-related data, social network information, and calendar information.

A method for initiating on-boarding for a user is disclosed herein. The method may include inputting user related information from a lifestyle container for a specific user ID, registering at least one intelligent appliance with the specific user ID, applying at least one rule on the user related information to determine profile of the user using at least one of machine learning, fuzzy logic and neural network, and displaying information on a display interface corresponding to the lifestyle container. The method may further include accessing at least one external source to derive information related to at least to user behavior, user profile on a social networking site, transaction history for a merchant, travel information, and health related information, wherein the derived information is used for determining the profile of the user. The displaying of information on the display interface may include displaying a welcome message on creating the user profile at a mobile transaction platform. The method may further include analyzing the user profile and determining offers, notification and messages based on the analyses of the user profile. The method may further include displaying the offers, notification and messages on the display interface corresponding to the lifestyle container.

A system for initiating on-boarding for a user is disclosed herein. The system may include a lifestyle container configured to receive input information from a user having a user ID, an at least one intelligent appliance associated with the user ID, an expert engine of a mobile transaction platform, wherein the expert engine is configured to process the user related information and facilitate communication with at least one external source to retrieve information corresponding to the user, at least one rule for determining profile of the user using at least one of machine learning, fuzzy logic and neural network, and a display interface configured to display information for the user. The expert engine may be configured to communicate with the at least one external source using an enterprise service bus. The lifestyle container may be configured to receive offers, notification and messages from the mobile transaction platform. The lifestyle container may be configured to receive offers, notification and messages from the mobile transaction platform during synchronization process. The mobile transaction platform may be configured to utilize push message to transmit the offers, notification and messages to the lifestyle container.

A method for facilitating shopping transaction for a user is disclosed herein. The method may include receiving a first shopping list from a lifestyle container, determining at least one trigger-event corresponding to the first shopping list, wherein the at least one trigger-event is associated with at least one life occurrence of the user, modifying the first shopping list based on the behavior pattern of the user, transmitting the modified first shopping list to at least one merchant via an enterprise service bus, transmitting the shopping list from the merchant to the user for facilitating selection of at least one shopping item, and performing a shopping transaction based on the selection of the at least one shopping item. The method may further include configuring the expert engine to determine the transaction behavior of the user from the shopping transaction that is based on the selection of the at least one shopping item. The method may further include adding at least one offer for the at least one shopping item based on the transaction behavior of the user. The receiving of a first shopping list from a lifestyle container may include receiving a manual selection of the at least one shopping item from the user. The receiving of a first shopping list from a lifestyle container may include automatically selecting at least one offer saved on the lifestyle container associated with the user, in another aspect. The at least one trigger-event may be at least one of a temporal event and a location event associated with the life occurrence of the user.

A system for facilitating shopping transaction for a user is disclosed herein that may include a lifestyle container configured to receive a first shopping list, and a mobile transaction platform configured to determine at least one trigger-event corresponding to the first shopping list. The at least one trigger-event may be associated with at least one life occurrence of the user. The system may further include an expert engine configured to modify the first shopping list based on the behavior pattern of the user, to transmit the modified first shopping list to at least one merchant via an enterprise service bus and to transmit the shopping list from the merchant to the user for facilitating selection of at least one shopping item, and an enabled ecosystem configured to performing a shopping transaction based on the selection of the at least one shopping item. The at least one trigger-event may be at least one of a temporal event and a location event associated with the life occurrence of the user. The expert engine may be configured to determine the user behavior using fuzzy logic, machine learning and neural network. The expert engine may be configured to determine the user behavior using data corresponding to the shopping transaction being performed by the enabled ecosystem.

A method is disclosed herein for facilitating parking arrangements for a user. The method may include determining time and location associated with the parking requirements of the user, monitoring user behavior for the at least one parking preference, and generating a list of parking requirements for the user. The list of the parking requirements may include at least one parking requirement in accordance with the at least one parking preference of the user. The method may further include transmitting the list of parking requirements to at least one parking provider, and communicating the status of the parking requirement to the user in response to a life occurrence. The step of determining time and location associated with the parking requirements of the user may include monitoring at least one event that may be extracted from at least one of a calendar application and travel booking information of the user. The monitoring of user behavior for the at least one parking preference may include monitoring the user behavior using at least one of a machine learning, fuzzy logic and neural network. The method may further include determining an availability of pre-booking facility from the at least one parking provider. The method may further booking a parking space in accordance with the at least one parking requirement of the user when the at least one parking provider support pre-booking of the parking space. The method may further include generating a reference number for the at least one parking requirement when the at least one parking provider does not support the pre-booking of the parking space. The method may further include communicating live parking updates to the user for the reference number, wherein the live parking updates may include at least one of: parking prices and an availability of the parking space in accordance with the at least one parking requirement of the user.

A system is disclosed herein for facilitating parking arrangement for a user. The system may include a lifestyle container configured to determine time and location associated with the parking requirements of the user, a transaction platform configured to store the parking requirements of the user, an expert engine configured to monitor user behavior for the at least one parking preference, to generate a list of parking requirements for the user. The list of the parking requirements may include at least one parking requirement in accordance with the at least one parking preference of the user and to transmit the list of parking requirements to at least one parking provider. The system may further include an enabled ecosystem configured to communicate the status of the at least one parking requirement to the user in response to an life occurrence. The transaction platform may be further configured to facilitate synchronizing parking requirements of the user with the lifestyle container. The expert engine may be further configured to monitor the user behavior using at least one of: a machine learning, fuzzy logic and neural network.

These and other systems, methods, objects, features, and advantages of a life occurrence management platform will be apparent to those skilled in the art from the following detailed description of the preferred embodiment and the drawings. All documents mentioned herein are hereby incorporated in their entirety by reference.

BRIEF DESCRIPTION OF THE FIGURES

The methods and systems of life occurrence management and the following detailed description of certain embodiments thereof may be understood by reference to the following figures:

Figure 16:
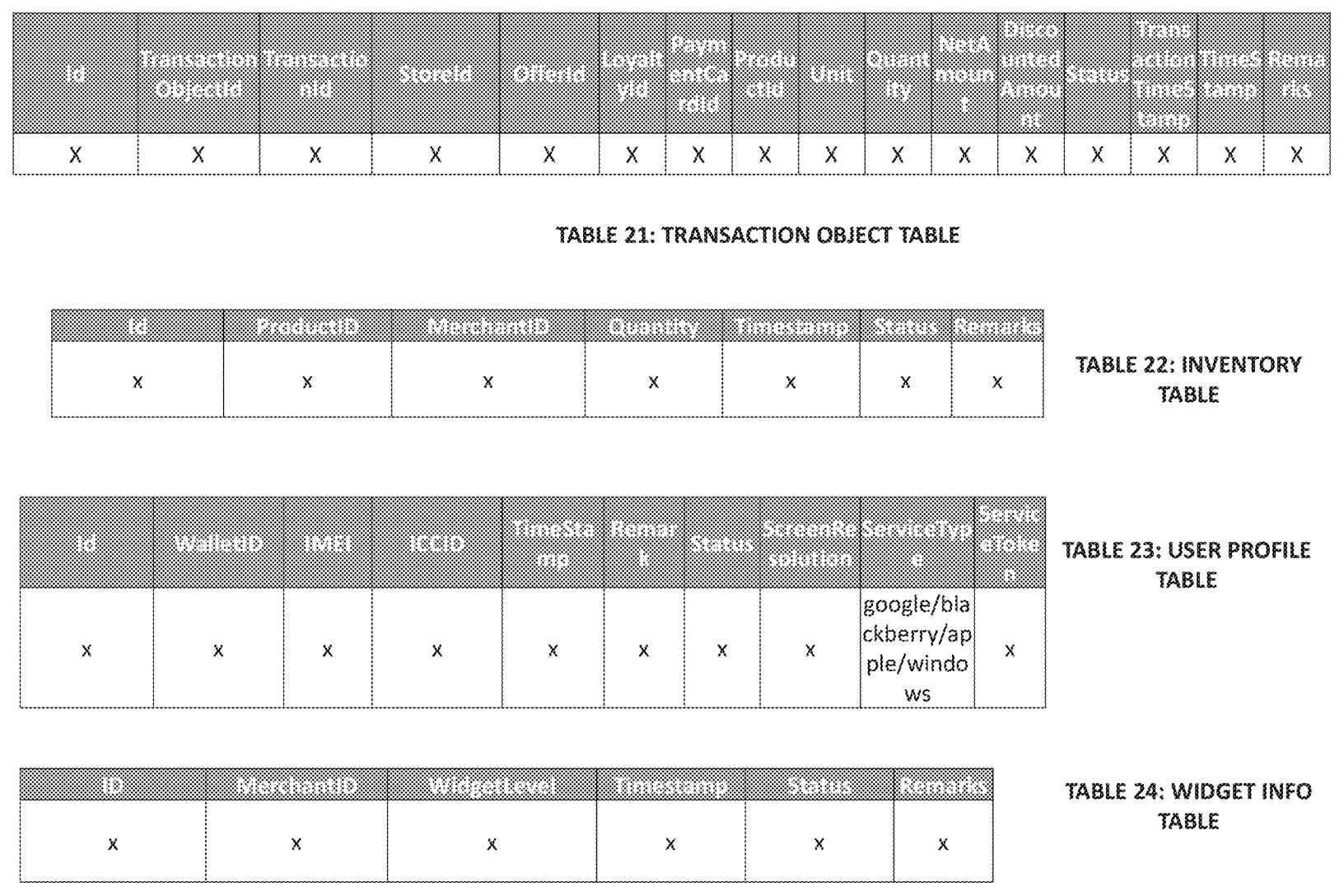

FIG. 10-16 depicts various tables that may include a plurality of data types and corresponding attributes of the data types.

FIG. 17A-D illustrates an example embodiment of a method for facilitating on boarding of a user.

FIG. 18A-D depicts an example embodiment of method for facilitating shopping transaction for the user in the mobile transaction platform.

FIG. 19A-D depicts an example embodiment of a method for facilitating parking arrangements for the user in response to a life occurrence.

FIG. 25 depicts guiding principles for a user centric life occurrence determination and servicing capability.

DETAILED DESCRIPTION

Figure 1:
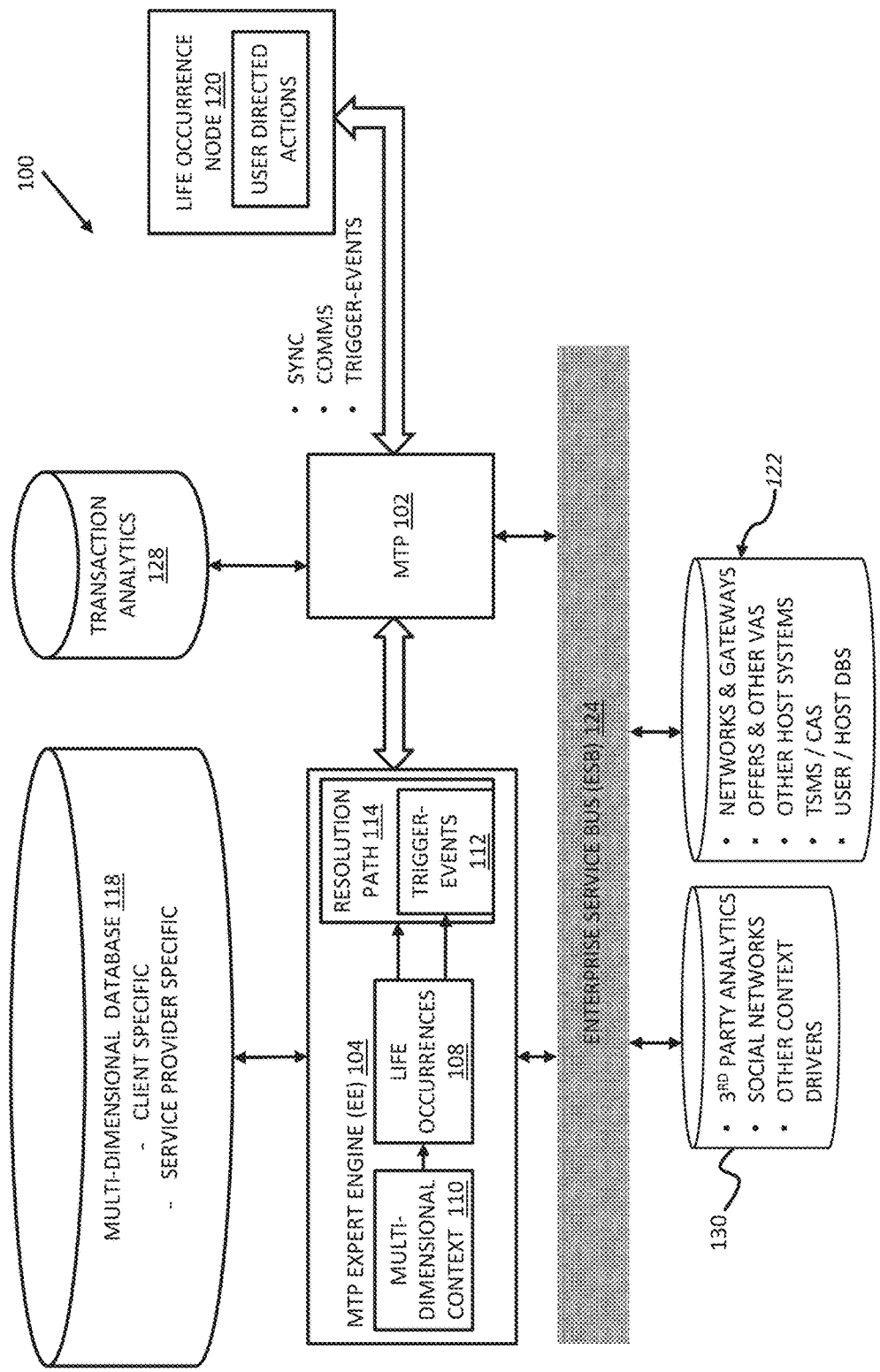
FIG. 1 depicts a high-level system diagram including a mobile transaction platform (MTP) expert engine (EE) configured to determine life occurrences from a plurality of data sources, some of which are accessible to the mobile transaction platform.

A mobile lifestyle that leverages a mobile transaction ecosystem to provide a range of life occurrence services that maximize usability of the ecosystem while minimizing intrusions on the user may enable a managed process of performance and risk driven escalation of alerts, actions, and transactions to resolve aspects of life occurrences. With the premise that a mobile lifestyle experience should revolve around the mobile user, thereby establishing a user-centric experience, an intuitive interface that allows a user to view alerts, tokens, notifications and the like is provided. A mobile lifestyle environment may also provide a seamless experience with applications driving transactions for a wide range of life occurrences covering finance, retail, health, personal, business, government, and the like. To facilitate a seamless low-intrusion experience, such a platform may handle interfacing to all payment and transaction channels by applying a proactively intelligent capability based around an expert engine-like environment that accepts and utilizes inputs from users, rules, behavioral analytics, all forms of electronic user-related content (e.g. social media), and the like. The result is a mobile user-centric experience that works to deliver actionable alerts that relate to what a user wants to do rather than just what the user has to do. Driving such actionable alerts is multi-dimensional context derived from time, location, user mobile uses history, transaction history, third party sourced data, and the like. These actionable alerts are time, location, and context aware while including sufficient flexibility to adjust to a user's reaction to suggestions, and/or recommendations in real time. The result being an intuitive system that focuses on simple, seamless, contextual experience that brings all personalized applications into a user lifestyle interface while facilitating all necessary secure transactions behind the scenes thereby not requiring the user to deal with these complexities.

Life occurrence management services may be extended well beyond direct user mobile device interaction to include any network-connected computing-capable device that is related to or can facilitate resolution of user-related life occurrences through a secure electronic transaction ecosystem. While determining and resolving some life occurrences may involve presentation of resolution path options to a user on the user's mobile or other computing device, life occurrences may be resolved without any need for user notification or interaction, thereby minimizing intrusion on a user, while addressing the resolution actions that the user desires. Such automatic life occurrence resolution services may be initiated by any life occurrence node (e.g. intelligent electronic device) or may simply be initiated by an expert engine that handles determination of and resolution of life occurrences for users. Resolution of aspects of life occurrences, via a secure electronic transaction ecosystem, may include communicating resolution actions among life occurrence devices and the ecosystem.

A life occurrence node may be any of a wide range of types of machines, appliances, toys, equipment, packaging, service facilities, healthcare devices, and the like that are provided with computing and networking. A few such examples include laundry appliances, drug administration devices, self-powered toys, air conditioning units, on-road and off-road vehicles, automated package delivery vehicles, industrial equipment, home-making appliances, personal health monitoring wearable devices, and the like. Each exemplary life occurrence node and any other computing and network-capable device may be configured with life occurrence servicing functionality to generate and/or contribute to the generation of alerts, resolution actions, life occurrence servicing transactions, and the like.

Figure 17C:
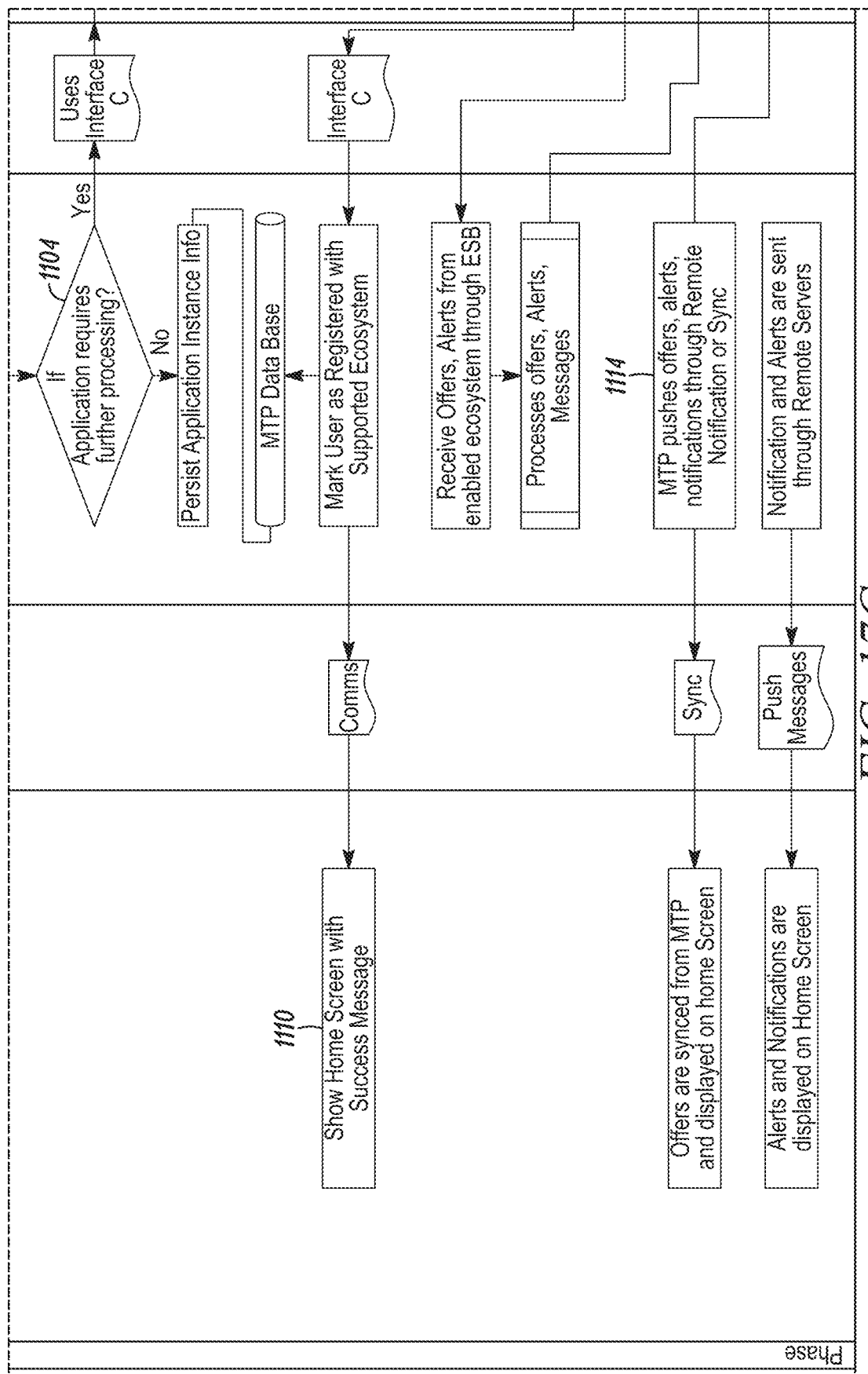
Figure 17D:
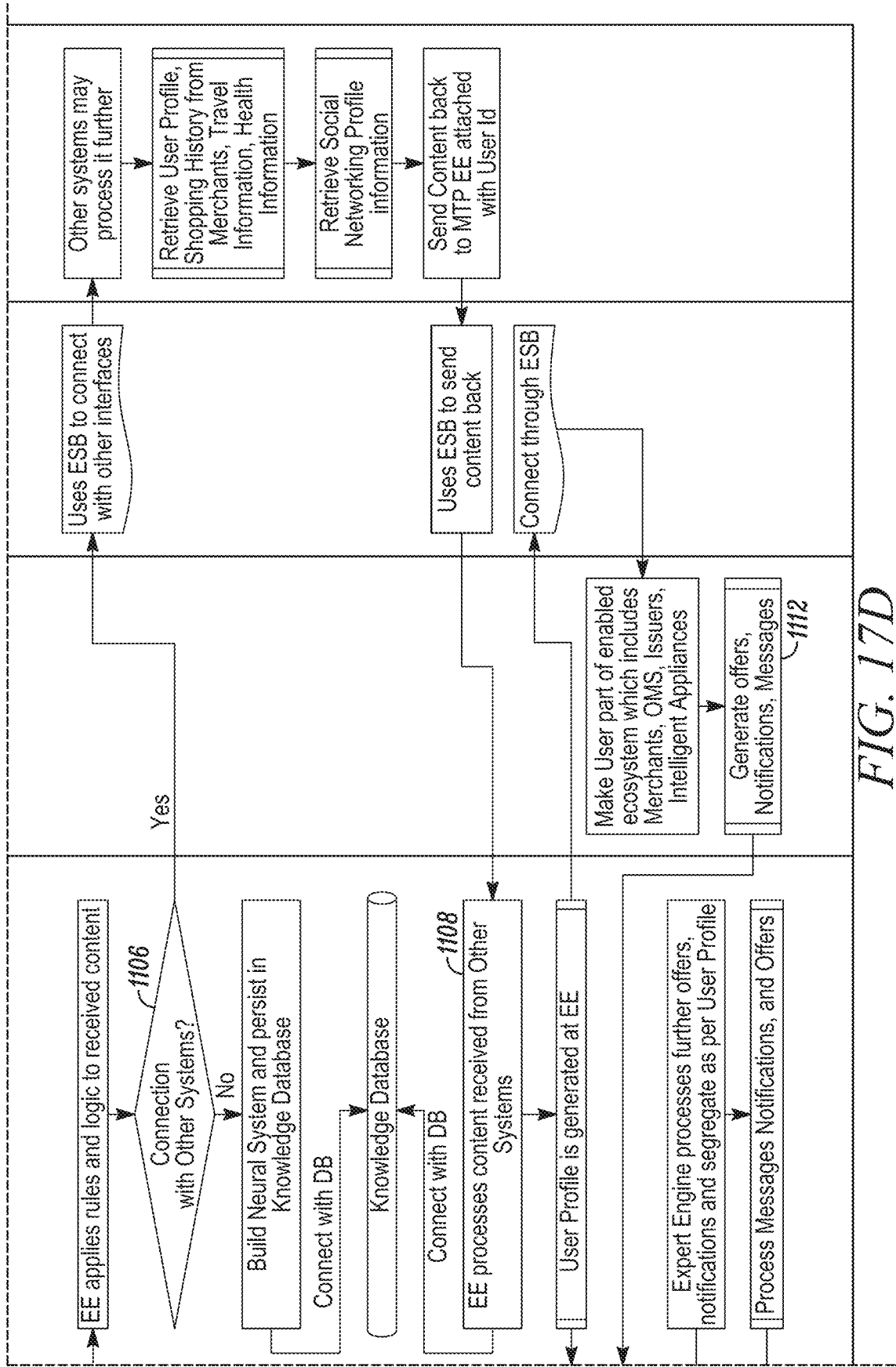

The methods and systems of life occurrence management described herein may be optionally activated for a user through an affirmative consent by the user. Confidentiality of user data, such as user transactional data at any level of detail, is of paramount of importance when considering the embodiments of life occurrence management described herein. Any user may choose to register with a platform providing life occurrence management services as described herein. An example of such user-chosen registration is depicted in FIG. 17 described later herein. Without such an explicit user choice to participate, user information, including confidential information available to a mobile transaction platform will remain secure.

The systems and methods of life occurrence management disclosed herein may comprise a mobile transaction platform (MTP) expert engine. Such an engine may be used to determine life occurrences based on multidimensional context derived from user transactions. Such transactions may be handled either through the mobile transaction platform, or third-party sources of user-related data. Life occurrences may be an event that has not yet occurred. Life occurrences may be based on at least one user-related event that has occurred in the past. The MTP expert engine may use the derived multidimensional context in order to generate resolution action triggers to resolve such life occurrences by facilitating user directed mobile actions. In order to facilitate such resolution actions, the expert engine may include preconfigured mobile transaction capabilities to facilitate execution of the resolution actions in response to a user selection of a certain resolution action. Each life occurrence may also be preconfigured with various triggers, which may facilitate a user's ability to review and take action to the resolution action. Such triggers may also be associated with certain life occurrences so as to alert users to the events and allow users to select certain resolution paths.

As generally used herein, a resolution path may comprise one or more resolution actions that lead to a resolution related to a life occurrence, wherein the resolutions actions may be performed individually. A resolution action that is part of a resolution path may influence the direction of the path (e.g. cause a branching of the resolution path). Alternatively, a resolution action may comprise one or more resolution paths that when executed lead to a resolution related to a life occurrence. A resolution action that comprises at least one resolution path may be used to activate the resolution path. Likewise a user may be provided with more than one resolution action and based on which resolution action the user chooses, the resolution path associated with the selected resolution action will be taken to resolve an aspect of the life occurrence.

The MTP may facilitate a secure mobile transaction. The data associated with the transaction, such as the date, time, location, payment source, wallet state, type of transaction, vendor, product type, among others, may be harvested, categorized, aggregated, and processed with other transaction data for the user. The data collected may also be sent to a data repository from which the expert engine can determine life occurrences and generate resolution paths.

An expert engine may use mobile transaction data sources for generating action triggers. Such an expert engine may be coupled with a mobile transaction platform (MTP) and may use a multidimensional context derived from user mobile-based transactions handled through the MTP to generate action triggers for resolving life occurrences by facilitating user directed mobile device actions.

The expert engine may determine a type of life occurrence of an individual among a set of possible life occurrences. The determination may be based at least in part on a multidimensional data set constructed in connection with a MTP through which the individual conducts transactions. The expert engine may then generate a resolution action, that when activated, triggers invocation of a resolution path in order to address or resolve the life occurrence. Such a resolution path may be generated to operate via use of a life occurrence node, such as a user's mobile device and the like. The expert engine may use numerous sources and methods to determine the type of occurrence and subsequent generation of a resolution path. The expert engine occurrence detection and resolution generation is based on fuzzy logic associating life occurrences with resolution paths.

The expert engine may determine the type of life occurrence and subsequent generation of a resolution path according to a rule administered by a rules engine. The rules engine may relate life occurrence types with available resolution paths and apply the rules to the data for the individual associated with the multidimensional data set.

An expert engine, based on neural networking, may facilitate determining life occurrences. Such an expert engine may determine a type of life occurrence of an individual among a set of possible life occurrences based at least in part on a multidimensional data set constructed in connection with a mobile transaction platform (MTP) through which the individual conducts transactions. The expert engine may also generate a resolution path for resolving one or more aspects of the occurrence via uses of a life occurrence node, such as a user's mobile device and the like. Determining the type of life occurrence may be performed based on the application of a neural network the inputs for which include data of the type contained in the multidimensional data set and feedback for which includes a set of known life occurrences by which the neural network may learn to infer a life occurrence from the occurrence of data in the multidimensional data set.

The determination of the type of life occurrence is performed based on the application of a neural network. The inputs for the neural network may include data of the type contained in the multidimensional data set. The feedback for the multidimensional data set may include a set of known life occurrences by which the neural network may learn to infer a life occurrence from the occurrence of data in the multidimensional data set. The feedback for the multidimensional data set may also include outcomes for sets of individuals having undertaken different resolution paths for different types of life occurrences.

The generation of a resolution path to resolve one or more aspects of the life occurrence detected is based on user feedback. Users may provide feedback indicating whether the determination of the life occurrence is correct or whether the resolution path offered is appropriate. Such user feedback may then be incorporated into the expert engine's algorithms, rules sets, fuzzy logic set, neural network, or other decision-generating engine. Such feedback may be shared between the MTP and the expert engine.

The expert engine may determine a type of life occurrence of an individual among a set of possible life occurrences based at least in part on consolidated analytics that may be based on transaction and non-transaction data. The consolidated analytics may be derived from a multidimensional data set that may be constructed by using data from the mobile transaction platform through which the individual conducts mobile transactions, data from third party analytics data sources, and/or location data for the individual at a particular point in time. Such data may also be used to generate resolution paths, which are contextual and may be used in conjunction with other data points such as, but not limited to, when the determination of the resolution path is made or where the user is at the time of determination. Other data points that may add to the contextual determination of a resolution path may be data such as pre-learned preferences from past transactions, past patterns, change in patterns, levels of loyalty to customer loyalty programs, account status or credit card status, urgency or importance of the occurrence, among others. For example, the expert engine may observe from third party analytics that a user has begun to purchase certain products, such as diapers, or in certain stores, such as Home Depot. Such changes may be indicative of the user becoming a parent or buying a house, respectively.

The expert engine may generate triggers related to a level of loyalty points. By analyzing transactions, the MTP can ascertain if a user's level of loyalty points is high or low. Such information is more than just knowledge of the mere membership of a user in a loyalty program. Once such information is consolidated by the expert engine into a multidimensional context, the expert engine may generate triggers to propose offers which are especially attractive when the user redeems some of his loyalty points, or where an extra amount of loyalty points can be collected.

The status of a credit card or account may comprise a context driver. For example, if the expert engine knows about how 'strained' a certain credit card already is, then, depending on the amount to be paid, it might propose another card. Also, the user might have a preference to pay for expensive goods (or travel-related things) with a specific credit card, because it offers some additional insurance that may be beneficial in that situation.

In addition to the time/date element that is part of the occurrence descriptor, one might add an 'urgency+importance' attribute to the occurrence descriptor, and this 'urgency+importance' attribute is likely to be very personal for each user (and the weight might change over time), and the expert engine can learn such preferences and make appropriate proposals. For example, one user may like to pay all bills and taxes absolutely on time, so the closer the due date of this kind of transaction comes the more a certain element of the screen would come to the top of the list, increase in size or change in color, or have a nagging UI dialogue. A different user may not be so focused on the bills, but more on relationships. For such a user, a friend's birthday will be more important as a reminder, because she needs to find the perfect present.

The expert engine may be sensitive to transaction risk for service providers. The expert engine may generate a resolution path based on a combination of the outcome predicted for an individual and an assessment of the risk that would be imposed by the generated resolution path on a third party service provider that may support the resolution path. By evaluating the risk of a resolution path while generating the resolution path, the expert engine may adjust the generation of the resolution path to mitigate at least a portion of the risk. In this way, risk may be dynamically evaluated and does not have to be predetermined, although it can be based on predetermined risk factors. Such an assessment of risk may be based on the cumulative risk to the service provider with respect to the individual user or an assessment may be based on an assessment of the cumulative risk the individual places across multiple service providers. Resolution path risk for third parties may be generated outside of the expert engine. The expert engine, or an alternate facility may assess this externally generated risk as part of generating a resolution path. In addition to resolution path-based risk, the expert engine when attempting to resolve a life occurrence may also assess resolution action risk to third parties. Resolution actions that pose a high degree of risk may be discarded rather than being presented to a user or otherwise enacted in response to a determination of a life occurrence. Risk generally may be mitigated by adjusting aspect of the resolution path (e.g. change vendors), the resolution action (e.g. propose an alternate action), preconfigured mobile transactions for resolving the life occurrence (e.g. adjust the transaction to use a card with more favorable vendor protection terms), and the like.

An expert engine may facilitate determination and use of resolution action to facilitate resolving aspects of a user's life occurrence. Such an expert engine may determine a plurality of resolution actions for presenting to a user in response to a life occurrence. The resolution actions may be determined by analyzing combinations of mobile transactions processed through a mobile transaction platform, life occurrence metadata, and user-related data derived from third-party user data sources. The expert engine may further facilitate preconfiguring mobile transactions to facilitate execution of the resolution actions in response to a user selection of the resolution actions. In addition, triggers may be associated with the life occurrence to facilitate enabling the user to review and take action on the resolution actions.

An expert engine may facilitate configuring a plurality of mobile transactions for facilitating execution of a plurality of resolution actions that are presented to a user in response to detection of at least one trigger associated with a life occurrence. The resolution actions may be determined from analyzing combinations of mobile transactions processed through the mobile transaction platform, life occurrence metadata, and user-related data derived from third-party user data sources. The life occurrence is an event that has not yet occurred and is based on at least one user-related event that occurred in the past.

FIG. 1 depicts a high-level diagram of a potential embodiment of a life occurrence management platform 100 including an expert engine configured to determine life occurrences using a plurality of data sources, including data sources accessible to a mobile transaction platform (MTP) 102. The life occurrence management platform 100 may comprise a MTP expert engine (EE) input device 104 that may be used to facilitate determining life occurrences 108 based on multi-dimensional context 110 derived from, among other things, user transactions. The life occurrences 108 may be an event that has not yet occurred or may be based on at least one user-related event that has occurred in the past.

The MTP expert engine 104 may use the derived multi-dimensional context 110 in order to generate resolution action trigger-events 112 to resolve such life occurrences 108 by facilitating user-directed mobile actions. In order to facilitate resolving the life occurrence 108 via the generated resolution action trigger-events 112, the MTP 102 and/or the expert engine 104 may prepare preconfigured mobile-device compatible transactions to facilitate execution of the resolution actions and/or present the user-directed mobile actions in response to detected trigger-events 112. In an example, a corresponding preconfigured mobile transaction may be executed in response to a user selection of a certain resolution action. Each life occurrence 108 may also be associated with various trigger-events 112, so that a user is able to review and select a resolution action. Such trigger-events 112 may also be associated with certain life occurrences 106 so as to alert users to the events and allow users to select certain resolution paths 114.

The multi-dimensional context 110 may comprise location information associated with resolving a life occurrence, such as user location, resolution path and/or resolution action location information, and the like. For example, the current location of the user may be determined using any location determination technologies such as global positioning system (GPS) and the like. The current location associated with the specific life occurrence may be a location that is not the user's current location (e.g. another person's home, any of a plurality of waypoints, and the like) The multi-dimensional context 110 may comprise at least one of time of life occurrence and current time.

The MTP expert engine 104 may determine a type of life occurrence of an individual among a set of possible life occurrences based at least in part on consolidated analytics that may be based on transaction and non-transaction data. The consolidated analytics may be derived from a multi-dimensional database 118 that may be constructed by using data from the mobile transaction platform through which the individual conducts mobile transactions, data from third party analytics data sources, location data for the individual at a particular point in time, and a wide range of other data from a range of sources, such as social media, calendars, user contacts, prior life occurrences, user relationships, and the like.

The multi-dimensional database 118 may be used to store attributes related to clients, client devices, services, service providers, merchants, merchant systems, transactions, payments, tokens, receipts, and other items. The multi-dimensional database 118 may store such information in more than one dimension, so that it can be accessed by different applications or for different purposes. In an embodiment, the multi-dimensional database includes three database dimensions (namely, user mobile transactions, user calendar, and user preferences), it should be appreciated that the number of dimensions may be one, two, three, or any whole number greater than three.

The units of a first dimension of the multi-dimensional database 118 may correspond to an attribute of user mobile transactions, such as names of service providers, cash values of transactions, types of transactions, date of transactions, quantities of items in transactions, sources of items in a transaction, or any other attribute of a mobile transaction.

The units of a second dimension of the multi-dimensional database 118 may correspond to an attribute of the user calendar, wherein this attribute may without limitation comprise names of meeting attendees, types of the calendar events, geographic location of the calendar events, and so forth.

The units of a third dimension of the multi-dimensional database 118 may correspond to an attribute of user preferences for mobile transactions, wherein this attribute may without limitation comprise maximum amounts for automatic payment of bills, names of preferred payers of bills, name of preferred payees for certain items, and so forth. The multi-dimensional database structure may be associated with the mobile transaction platform.

A structure of the multi-dimensional database 118 may be designed to support various functional aspects of the MTP 102 such as a user-centric interface, a user-centric engine, security aspects, transmission aspects, hardware and/or software infrastructure that may be associated with the MTP 102, an expert system, a self-learning and self-scaling system, a secure web-services protocol, distributed infrastructure services and other functions of the MTP 102.

Information from multiple sources may be populated in the multi-dimensional database 118 in such a way that the attributes of the data may be set in multiple dimensions, including relationships among data items across different dimensions. This enables querying data in different ways for different purposes. For example, the multi-dimensional database 118 supports the user-centric engine whereby various data relating to various services, service providers, domains, devices and systems are stored to allow a user to access services that use such data. The multi-dimensional database 118 allows the life occurrence management platform to sift through data more efficiently, employing different dimensions that are optimized for particular retrieval tasks. For example, an element of data may be transaction-related. Another dimension may relate to how data is evaluated. A third element of the data might allow static profiles or entries. A fourth element may allow external entities to enter data associated with the data. Data may include data related to financial transactions such as billings, data related to service providers, data related to content items, or a host of other kinds of data. Storing data in the multi-dimensional database 118 may assist with application throughput, as data may be stored in a fashion that allows efficient retrieval of data according to a user's specific needs. For example, a learning algorithm or the MTP expert engine 104 as described herein may learn which services a user tends to use in which circumstances and the MTP expert engine 104 may push data from the multi-dimensional database 118 to, for example, a client device to improve performance of such services.

A user user-centric engine may look at data of the multi-dimensional database 118 to attain advantage from the one or more dimensions. For example, if a user flies into London, the platform may be aware of that fact, be aware of past transactions (such as meetings the user had with various people in the past), and look at different dimensions of data to propose various transactions. Similarly, the engine may propose multiple transactions to the user, enabled by the data in the multi-dimensional database 118.

The multi-dimensional database 118 data may also be used to generate resolution paths 114 which are contextual and may be used in conjunction with other data points such as, but not limited to, when the determination of the resolution path 114 is made or where the user is at the time of determination. Other data points that may add to the contextual determination of a resolution path 114 may be data such as pre-learned preferences from past transactions, past patterns, change in patterns, levels of loyalty to customer loyalty programs, account status or credit card status, urgency or importance of the occurrence, among others. For example, the MTP expert engine 104 may observe from third party analytics that a user has begun to purchase certain products, such as diapers, or has begun making purchases in certain stores, such as Home Depot. Such changes may be indicative of the user becoming a parent or buying a house, respectively.

The MTP expert engine 104 may generate trigger-events related to a level of loyalty points. By analyzing transactions, the MTP expert engine 104 may ascertain if a user's level of loyalty points is high or low. Such information is more than just knowledge of the mere membership of a user in a loyalty program. Once such information is consolidated by the expert engine into the multi-dimensional context 110, the MTP expert engine 104 may generate trigger-events 112 to propose offers which are especially attractive when the user redeems some of his loyalty points, or where an extra amount of loyalty points can be collected.

The status of a credit card or account may comprise a context driver. For example, if the MTP expert engine 104 knows about how 'strained' a certain credit card already is, then, depending on the amount to be paid, it might propose another card. Also, the user might have a preference to pay for expensive goods (or travel-related things) with a specific credit card, because it offers some additional insurance that may be beneficial in that situation.

In addition to time/date elements that may be part of a life occurrence descriptor, a life occurrence may include an attribute related to urgency or importance that may be very personal for each user (and a weighting of such attributes might change over time). The MTP expert engine 104 can learn such preferences and thereby incorporate them into appropriate proposals, such as unsolicited offers, resolution actions, and the like. For example, one user may like to pay all bills and taxes absolutely on time. This preference may place a corresponding level of importance on life occurrences related to bill and tax payment-related. Therefore, the closer the current date is to a due date of this kind of transaction, the more the weighting for resolution actions or resolution paths determined to resolve this life occurrence. Such an increase in weighting may impact how a user may be notified of the life occurrence resolution options prepared by the expert engine 104. In an example of a visual user interface for allowing a user to interact with the life occurrence methods and systems described herein, certain elements of such a user interface display on a user's device screen may come to the top of a life occurrence resolution action list. Alternatively, elements in the user interface related to this increasingly urgent and important life occurrence might change visually, such as with an increase in size or change in color, or have a nagging UI dialogue. A different user may not be so focused on the bill payment life occurrences, but more on relationships and the life occurrences related thereto. For such a user, a friend's birthday may become an even more important reminder as the current date creeps closer to the friend's birthday, perhaps because she needs to find the perfect present.

The life occurrence management platform 100 enables a user experience through a life occurrence node 120. Examples of a life occurrence node 120 may include a user's mobile device that facilitates presenting notifications of triggered life occurrences derived from a robust multi-dimensional context 110 with associated consolidated resolution actions. A life occurrence node 120 may be any networkable device with a basic processing capability, not just a mobile device. Examples of life occurrence nodes 120 are described elsewhere herein. The life occurrence management platform 100 may facilitate communication between the life occurrence node 120 and the external entities 122 via an enterprise service bus (ESB) 124. While the MTP 102 operates to facilitate mobile transactions between the external entities 122 and the life occurrence node 120, it facilitates passing data between the external entities 122 and the life occurrence node 120 without substantively altering their content. However, the MTP 102 does acquire and collect for storage in, for example, a transactional analytics database 128, information and metadata related to various attributes of the transactions enabled by the MTP 102. For example, the MTP 102 may store in the transactional analytics database 128 information related to transaction times, transaction amounts, service provider identifiers, life occurrence-related trigger, user action(s) to effect the transaction, and the like.

In communication with the MTP 102, the MTP expert engine 104 operates to consolidate various transactional analytics received from the MTP 102 with one or more third party sources 130 to create the multi-dimensional context 110 that is suitable for determining life occurrences, developing and maintaining occurrence action triggers, generating resolution paths that resolve an aspect of a life occurrence via uses of the mobile device, and the like. In operation, the MTP expert engine 104 may employ one or more algorithms to consolidate various transactional analytics from the MTP 102 with data from the third party sources 130 to produce the multi-dimensional context 110 from which trigger-events may be produced. Such algorithms may further order and prioritize the display of life occurrence-related alerts to a user of the mobile device.

The MTP expert engine 104 of the life occurrence management methods and systems described herein may be configured to determine services that may be offered to clients and service institutions by using data from the plurality of sources including the multi-dimensional context database 118. The MTP expert engine 104 may be configured to process multi-dimensional information from the plurality of data sources that may include direct input specific instructions from a client and consolidated input from a plurality of service institutions and vendors. For instance, user or client life occurrence management registration information may be compiled based on surveys and interviews. A complete client profile may be compiled using information from external agencies, the direct information provided by the clients, and other sources of data suitable for a robust client profile. Various transaction analysis and records analysis may be conducted by a transaction service provider and may be offered as a service to the client in a desired form and format. The transaction service provider may feed transaction analysis and records analysis into the MTP expert engine 104 to form input to determine at least a portion of overall service offerings suitable for presenting to the clients by a wide range of service providers, such as retailers, banks, merchants, service consolidators, and other aspects of a life occurrence management platform. The direct input by the clients and specific flag information from them may form preferences that may be outlined by the clients to facilitate rapid use of the preferences in an electronic transaction-oriented computing environment. The consolidated input from the service institutions may include information about various vendors that may affect overall client profiles, and consequently the services offered to the clients. An output of the MTP expert engine 104 may be utilized to determine the services being offered to the clients and the service Institutions. Further, the MTP expert engine 104 may be preferably isolated from other processes to ensure confidentiality of user/client information designated as confidential by the clients, or as determined by the MTP expert engine to be confidential in light of similarities of a data item to data items designated as confidential by the clients. In this way, a user/client may not have to designate each item of data as confidential, yet gain the benefits of confidentiality of relevant information. In an example, the MTP expert engine 104 may analyze data that the current user or any other user or groups of users have designated as confidential and determine properties of such confidential information. When the MTP expert engine 104 encounters new information that has not yet been designated as confidential, it may determine if the new information has critical properties that are similar to properties of designated confidential information and may thereby treat this new information as confidential. A user may be alerted, based on user preferences, as to this designation of confidentiality. Alternatively, a user may not be alerted if the similarity of the new information properties to properties of confidential information is a high degree of similarity. In such a situation, a user may receive a report of new information that has been designated as confidential by the MTP expert engine 104.

The MTP expert engine 104 of a life occurrence management platform may be configured to perform vendor data consolidation. The MTP expert engine 104 may collect and assemble a complete profile on the service institutions and vendors through various sources. The complete profile may include profile information, products & services information, marketing & advertising information, information in terms of future releases of products and services (e.g., "Future Attractions"). Such profile information may further be utilized to determine the services offered to the client, service institutions and vendors. Vendor and service institution profile information may be accessible to the functional elements described herein, such as the MTP and the MTP-expert engine, and may be stored in the multi-dimensional database described herein.

The MTP expert engine 104 may facilitate in providing users seamless user-centric life experiences for the plurality of life occurrences. Some seamless user-centric life experience examples are provided herein without limitations. One such example is a flight-based travel scenario, in which when a user's plane lands, the MTP expert engine 104, having maintained context of the user and events related to the user may already be aware of the flight status and may arrange for a taxi pickup of the user automatically. A life occurrence management platform may not require the user to click a phone, select a coupon, etc. The life occurrence management platform may automatically book the taxi and bother the user only if something may not work the way the user wants it to.

The MTP expert engine 104 may be configured to determine life occurrences associated with life occurrence nodes that correspond to a user, such as intelligent devices that include some form of processing capability and accordingly, generate resolution paths including one or more resolution actions in accordance with the life occurrences that are associated with the intelligent devices. For example, an intelligent washing machine embodiment of a life occurrence node may facilitate activating a resolution path that includes a laundry detergent purchase context. The washing machine may link up to a user's mobile device so that the user can be given the option of being a trigger for the purchase of laundry detergent. Alternatively, the purchase of laundry detergent may be automated so that the washing machine effectively may start ordering detergent by itself through an enabled secure ecosystem. Determining whether to automatically order laundry detergent may be based on what the MTP expert engine 104 may learn from analysis of user context across a wide range of user transactions. In this way the life occurrence management platform may adapt its actions based on it's learning from the varying information.

Figure 2:
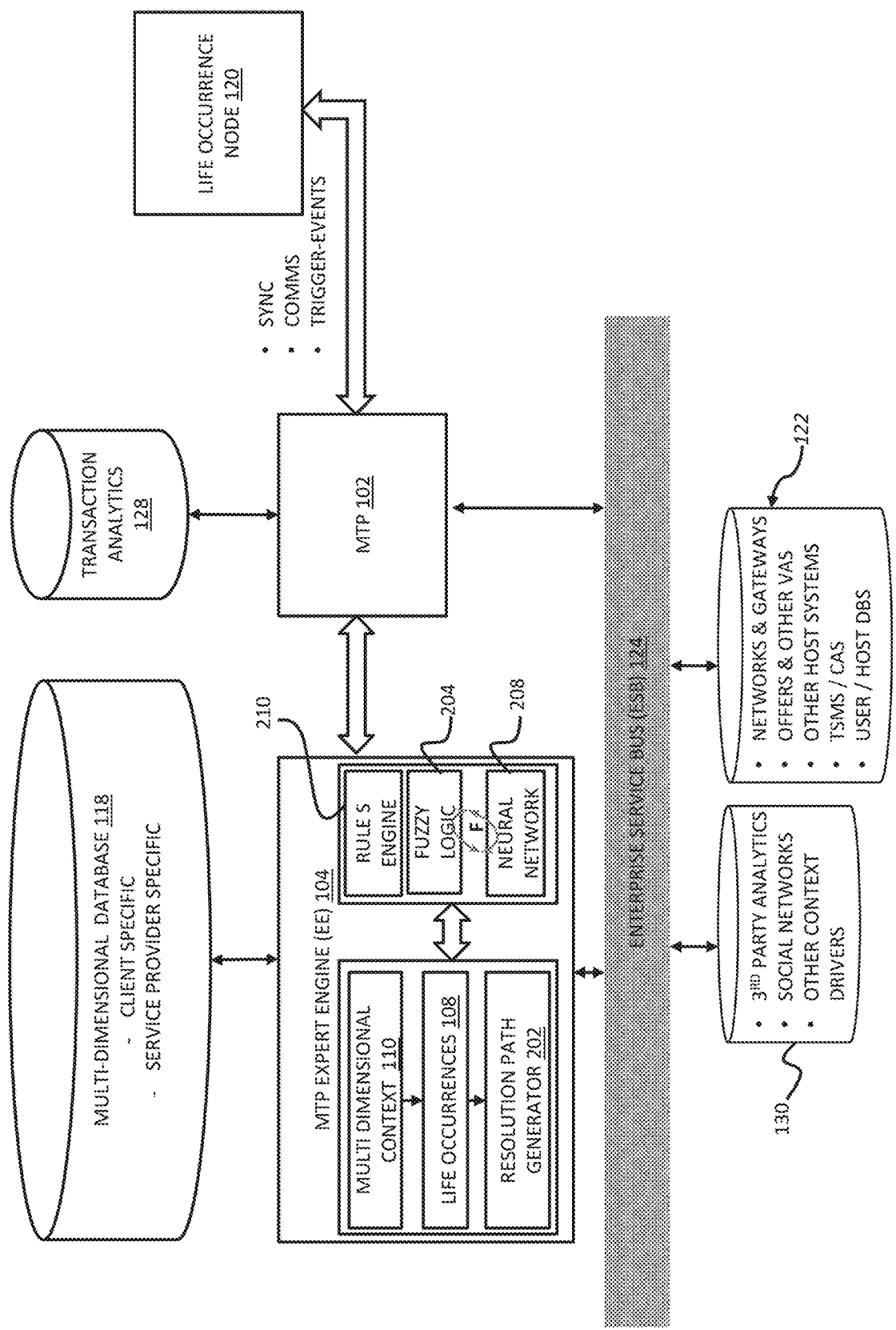
FIG. 2 depicts a high-level system diagram including an MTP expert engine (EE) configured to determine types of life occurrences of an individual and to generate candidate resolution paths for resolving one or more aspects of the life occurrence.

FIG. 2 is a high-level diagram of a potential embodiment of a life occurrence management platform including the MTP expert engine 104 that may be configured to determine a type of life occurrence of an individual and to generate a resolution path for resolving one or more aspects of the occurrence. As discussed above in conjunction with FIG. 1, the MTP expert engine 104 may be configured to determine life occurrences using one or more data sources of the MTP 102. The MTP expert engine 104 for example may be configured for determining a type of life occurrence of an individual among a set of life occurrences based at least in part on a multi-dimensional database 118 constructed in connection with the MTP 102 through which the individual conducts transaction. The MTP expert engine 104 may be further configured to access a resolution path generator 202 to generate a resolution path for resolving one or more aspects of the occurrence via uses of the life occurrence node 120. In various aspects, the determination of the various life occurrences 108 and their resolution paths may occur by using a set of automated algorithms, artificially intelligent systems, and or contextually-controlled actions that may operate in conjunction or within the MTP expert engine 104.

For example, as shown in FIG. 2, in an aspect, the MTP expert engine 104 may determine a type of the life occurrence 108 of an individual among a set of possible life occurrences and generate the resolution path by using a fuzzy logic 204 that associates life occurrences with available resolution paths. The fuzzy logic 204 may perform supervisory functions to let the MTP expert engine 104 learn from contextual information and allow it to make a decision regarding the life occurrence type and/or the appropriate resolution path for a particular type of life occurrence. In an example, fuzzy rules may be generated from information contained in the multi-dimensional data set so that an output of the fuzzy logic 204 may be indicative of the information received from the multi-dimensional database 118 which may include data related to user historical transactions in association with defined spatial, temporal, or other constraints and the like. Fuzzy logic 204 may be enabled through fuzzy systems and processors that may be configured to allow processing of contextual knowledge and project behavioral patterns, and the like. As an example, if a student heads toward his school for examination and a temporal contextual information indicates that the examination may be about to start and the student may be running late, the fuzzy logic 204 may facilitate the expert engine to interpret the context and make a decision regarding indicating a resolution path that suggests the student about the nearest taxi stand for hiring a taxi so that the student reaches the school on time.

The MTP expert engine 104 may determine the type of the life occurrence of the individual among the set of possible life occurrences 108 using a neural network 208. The neural network 208 may process data contained in the multi-dimensional database 118 and utilize the feedback from the fuzzy logic 204. The feedback may include a set of known life occurrences by which the neural network 208 may learn to infer a life occurrence from the occurrence of data in the multi-dimensional database 118. Further, the resolution path generator 202 may generate the resolution path based on the application of the neural network 208 such that the neural network 208 may process the data from the multi-dimensional database 118 in conjunction with the feedback, which includes outcomes for sets of individuals having undertaken different resolution paths for different types of life occurrence.

The MTP expert engine 104 may determine a type of life occurrence of an individual among a set of possible life occurrences and generate the resolution based on rules administered by a rules engine 210 that may be configured to relate life occurrence types with available resolution paths. The rules engine 210 may apply one or more rules to the data for the individual in the multi-dimensional database 118 to determine one or more resolution paths for the determined type of the life occurrence.

The MTP expert engine 104 may determine the type of life occurrence and generate the resolution path based on feedback among fuzzy logic 204 and neural network 208 and from users, sensors, another system, etc. as to at least one of the accuracy of the determination of the life occurrence and the appropriateness of the resolution path.

Figure 3:
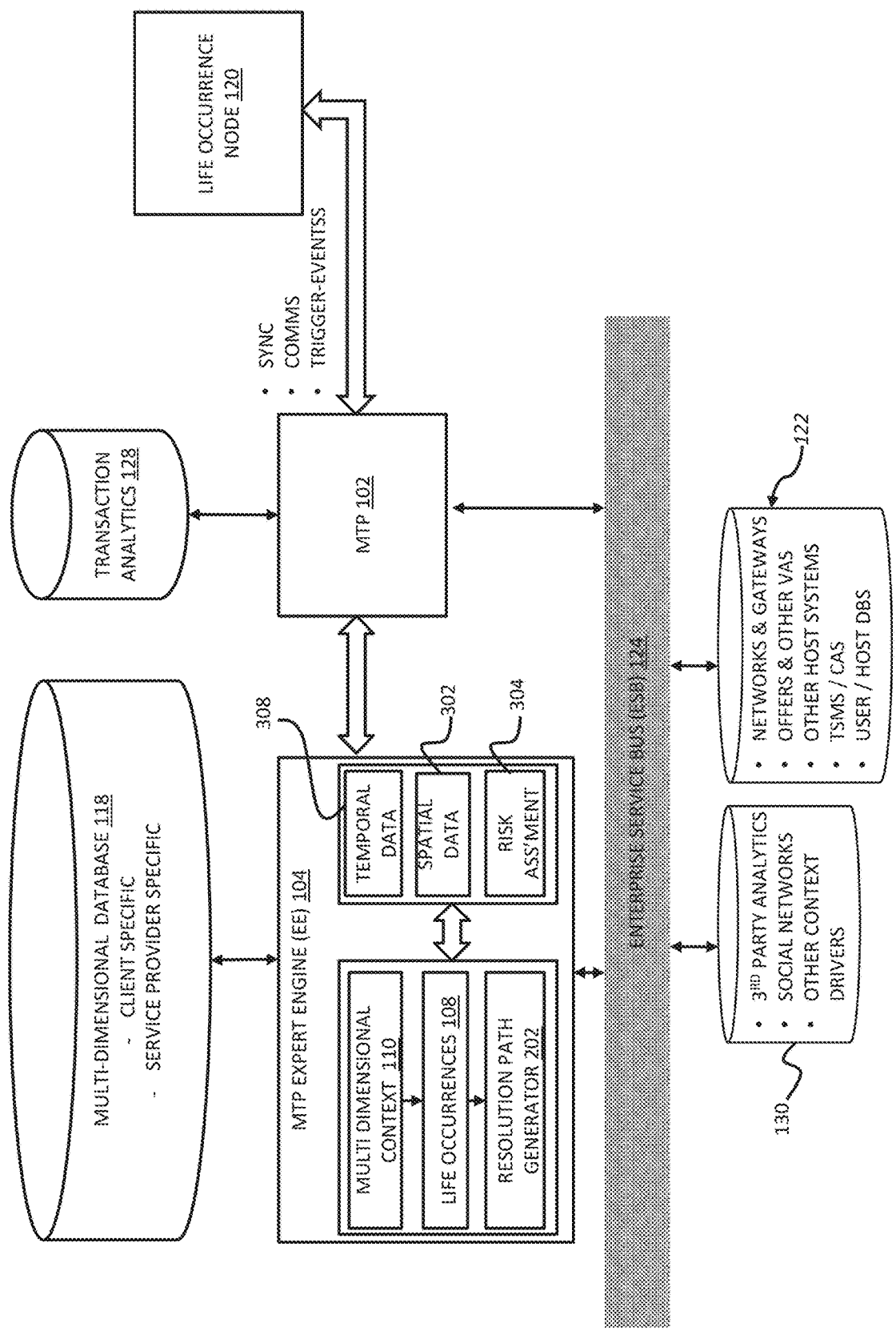
FIG. 3 depicts a high-level system diagram including an MTP-EE configured to generate context-based resolution paths using temporal data and spatial data.

FIG. 3 is a high-level system diagram depicting the MTP expert engine 104 configured to generate the resolution path 114 based on temporal data 308 and spatial data 302. The resolution path 112 may be based on an overall context of the individual that includes the point in time at which the determination is made, data from a mobile transaction platform (MTP) through which the individual conducts mobile transactions, data from a third party source relating to the individual, and location data for the individual at the point in time. For example, the MTP expert engine 104 may determine present location and time of the individual that may access the life occurrence node 120. Based on the current location and time, the MTP expert engine 104 may access multi-dimensional database 118 or third party sources to determine past actions of the individual. Accordingly, the MTP expert engine 104 may utilize the resolution path generator 202 to determine one or more resolutions paths from the contextual data. With regard to time-based actions, the MTP expert engine 104 may determine resolution paths that may include one or more actions such as display of notifications, alerts, suggestions and the like. Similarly, the MTP expert engine 104 may utilize location-based information to determine the resolution path 114. For example, the MTP expert engine 104 may extract information from the multi-dimensional database 118 or third party sources to determine past actions (e.g., visiting a restaurant) when the individual was present at the current location. Accordingly, the resolution path generator 202 may generate resolution path based on the past actions of the user at the current location.

The MTP expert engine 104 may perform risk assessment 304 to determine the resolution path 114. In such a case, the resolution path 114 may be based on a combination of the outcome predicted for the individual and an assessment of the risk imposed by the resolution path 114 on a third party service provider associated with the resolution path 114. The risk assessment 304 may include an assessment of the cumulative risk of the service provider with respect to the individual. Alternatively, the risk assessment 304 may include an assessment of the cumulative risk of the individual across multiple service providers. The risk assessment 304 may determine risk scores for each of the resolution paths 114 corresponding to at least one life occurrence 108 of the individual. Based on risk score threshold for an individual, the resolution path generator 202 may generate the one or more resolution paths that may have the risk score greater than the threshold score. As illustrated, the risk assessment 304 may be disposed within the MTP expert engine 104. However, other embodiments are envisioned, such as the risk assessment may be independent of the expert engine 104, may be accessible through the enterprise bus, and the like.

Figure 4:
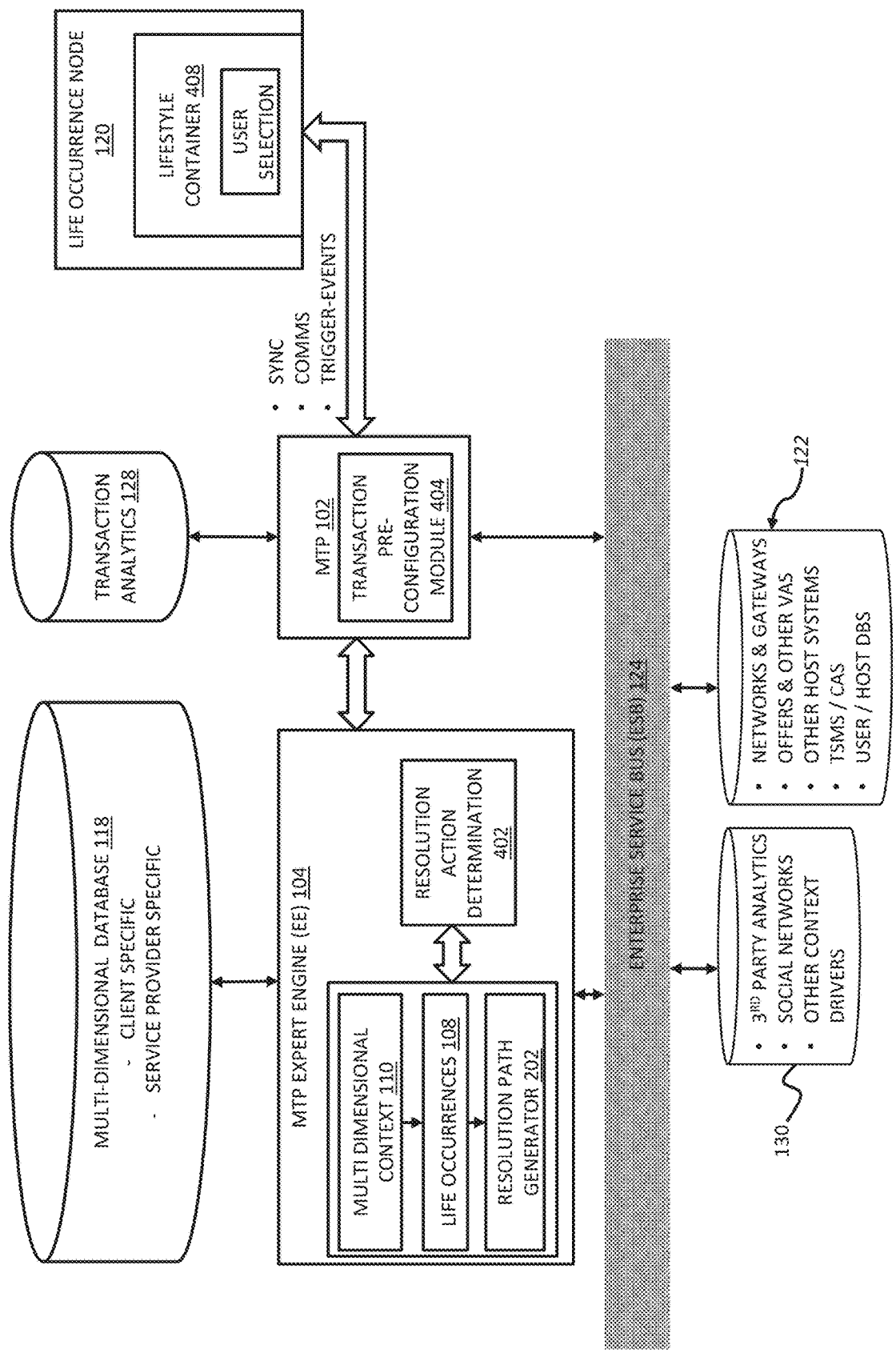
FIG. 4 depicts a high-level system diagram including an MTP-EE configured to determine resolution actions for presenting to a user in response to a determined life occurrence.

FIG. 4 is a high-level system diagram depicting an MTP expert engine configured to determine resolution actions for presenting to a user in response to a life occurrence. A resolution action determination 402 may be based on analysis that may be obtained from analyzing mobile transactions processed through the MTP 102, life occurrence metadata, user-related data derived from third party user data sources, and the like. The MTP 102 may include a transaction pre-configuration module 404 that may facilitate execution of the resolution actions in response to a user selection of the resolution actions. The transaction pre-configuration module 404 may facilitate execution of the resolution actions and based on the analysis, the transaction pre-configuration module 404 may perform at least one transaction without requiring user selection of a transaction or a resolution action.

The transaction pre-configuration module 404 may access third-party (e.g. Internet search based) resources for available offers. The transaction pre-configuration module 404 may analyze the available offers in combination with the multi-dimensional context 110 to select one or more offers that may be suitable for a transaction in a life occurrence resolution action. The transaction pre-configuration module 404 may configure a plurality of mobile transactions for facilitating execution of a plurality of resolution actions that are presented to a user in response to detection of at least one trigger-event associated with a life occurrence. The resolution actions are determined from analyzing mobile transactions processed through a mobile transaction platform, life occurrence metadata, and/or user-related data derived from third party user data sources.

The life occurrence node 120 may include a lifestyle container 408 that may, inter alias, facilitate alerting a user of the life occurrence node 120 to resolution paths available for addressing an aspect of the life occurrence. The lifestyle container 408 may also cause mobile transactions matched to the resolution path based on a user's response to a life occurrence alert. The lifestyle container 408 may synchronize with the mobile transaction facility to maintain currency of occurrences, trigger-events, and resolution actions.

The systems and methods disclosed herein may comprise a mobile transaction platform (MTP). The mobile transaction platform may comprise an expert engine for determining life occurrences based on multidimensional context. The multidimensional context may be derived from an analysis of user transactions associated with the mobile transaction platform and third party sources of user related data. The ecosystem of resources available to the MTP may include third party analytics, social networks, context drivers at networks and gateways, offers and value added services, host systems, trusted service managers, certificate authorities, and databases, among others. The engine may also generate resolution paths for resolving the aspects of the occurrence, where the resolution path has a series of action triggers leading to the resolution. The engine may be based on a combination of fuzzy logic, machine learning, and neural networks.

The platform may also comprise a transactional analytics facility. The facility may analyze the transactions conducted within the MTP. The data derived from this facility may be incorporated into a dynamic profile of the user for use by the expert engine. The transaction facility and the expert engine may exchange resolution triggers, static user profiles, and dynamic user profiles. Static user profiles may be used in conjunction with current context data such as time, space, and user input for the expert engine in order to determine life occurrences.

The MTP may comprise a lifestyle container. The lifestyle container may be deployable on a mobile device and may facilitate alerting a user of the mobile device to resolution paths available for addressing an aspect of the life occurrence. The lifestyle container may also cause mobile transactions matched to the resolution path based on a user's response to a life occurrence alert. The lifestyle container may synchronize with the mobile transaction facility to maintain currency of occurrences, triggers, and resolution actions.

A mobile transaction platform (MTP) may be enhanced to include a multidimensional data set of transaction details of transactions conducted by a user through the MTP that are framed in context of life occurrences and linked to third-party user-related data. The MTP may be further enhanced with an analytics facility for analyzing the multidimensional data set to produce context for life occurrence determination and resolution. The multidimensional data set may be a user database.

The MTP may be token-based. Such a token based MTP may comprise an expert engine for determining life occurrences based on multidimensional context derived from analysis of user transactions associated with a mobile transaction platform (MTP) and third-party sources of user-related data. Similarly, the expert engine may generate a resolution path for such occurrences. The resolution paths may have a series of action triggers leading to resolution of the life occurrence. The token-based MTP may comprise a transaction facility for handling transactions of a personal mobile device, analyzing the transactions, and providing the analysis to the expert engine. The token-based MTP may comprise additionally an enterprise service bus for facilitating access by the expert engine and the transaction facility to ecosystem resources. The token-based MTP may also comprise lifestyle containers that are deployable on a mobile device for facilitating alerting a user of the mobile device to resolution actions available for addressing an aspect of life occurrence. Based on a user's response to an alert, the token-based MTP may provide a personalized token configured to securely cause a mobile transaction matched to the resolution action to be executed by a server.

An MTP as described herein facilitates among other things secure mobile transactions (purchase, top-up, inquiry, etc.). The data associated with such a transaction (date, time, location, payment source, wallet state, type of transaction, product/service, vendor, portions of the platform used by the vendor (e.g. personalization, etc.) delivery method and arrangements, tax status, widget used, direct transaction or through transaction server, etc.) may be harvested, categorized, aggregated, and processed with other transaction data for the user by an analytics facility of the MTP. Such valuable data and context may also be fed to a data repository from which the expert engine can determine triggers, transactions, life occurrences, resolution paths, and the like.

Transaction data may be analyzed by the MTP in context of other users, similar or interested vendors, etc. to establish some sort of weighting, importance, etc. This analysis might result in determination of a new trigger, action, or occurrence. By itself it might be sufficient for such determination for the user, or it might be combined with other user data to determine an action. Example of setting an occurrence and action: Transaction data might indicate that the user has placed an order for a new rug that has been purchased by other users who also bought bedroom furniture (therefore the expert engine might determine that the rug might be suitable for a bedroom). A new action might be generated for the user to purchase bedroom furniture. The expert engine can then generate this action for the user once an occurrence and/or trigger related to the ordered rug is detected (e.g. setting the delivery date for the rug). Lead-time for the furniture, rug, etc. might also be factored into when the occurrence trigger(s) should be scheduled.

Figure 5:
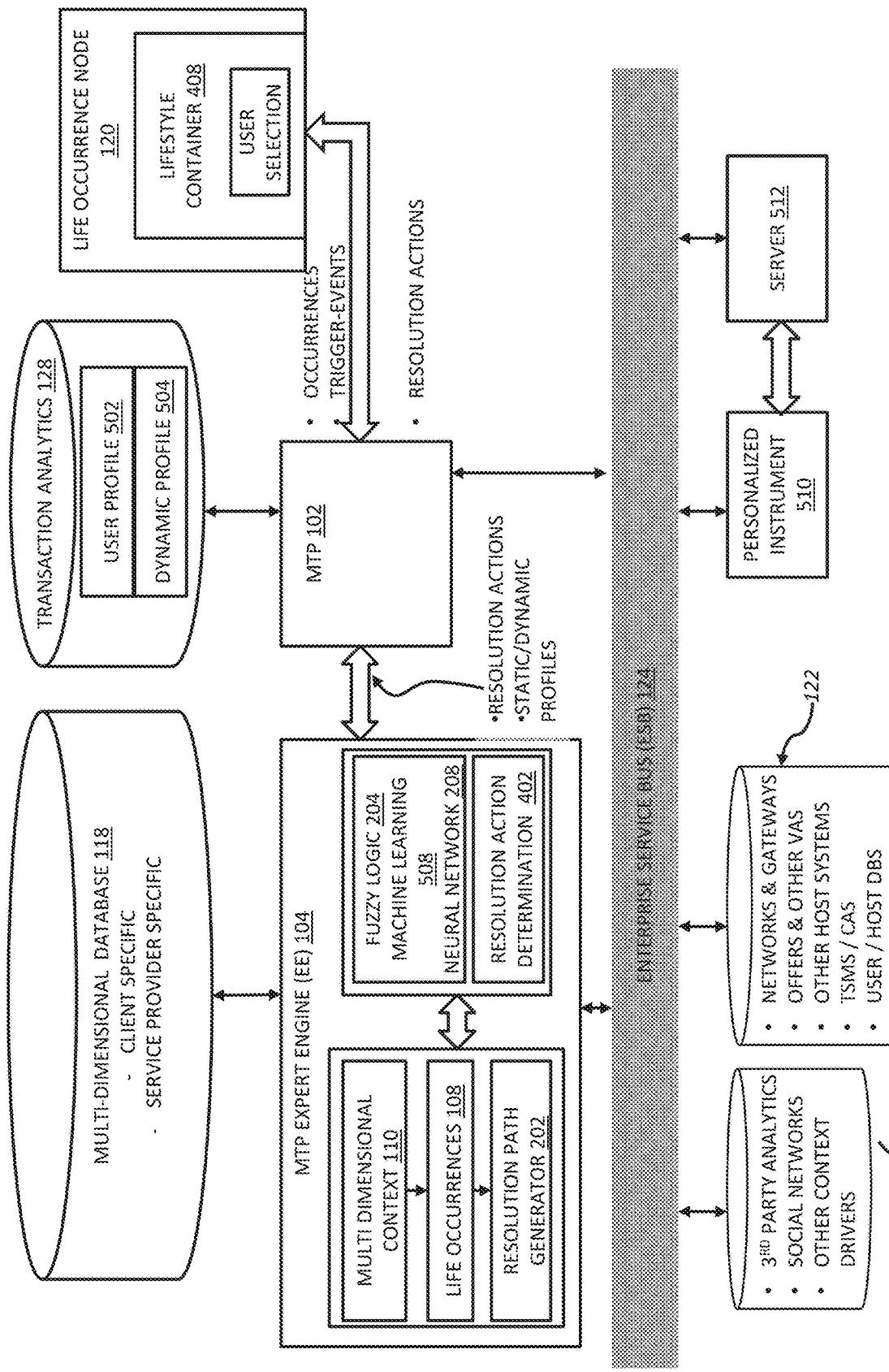
FIG. 5 depicts a high-level system diagram including an MTP-EE configured to determine resolution actions using user profiles.

FIG. 5 is a high-level system diagram depicting a MTP expert engine 104 configured to determine resolutions action using profile of a user. The secure transaction platform may comprise a transactional analytics facility 128 that may analyze the transactions conducted within the MTP 102. The data derived from the transactional analytics facility 128 may be incorporated into a static user profile 502 and/or a dynamic profile 504 of the user for use by the MTP expert engine 104. The transaction data may be analyzed by the MTP 102 in context of other users, similar or interested vendors, etc to establish some sort of weighting, importance, etc. This analysis may result in determination of a new trigger-event, action, or occurrence. The transactional analytics facility 128 and the MTP expert engine 104 may exchange resolution trigger-events, static user profiles 502, and dynamic user profiles 504. The static user profiles 502 may be used in conjunction with current context data such as time, space, and user input for the MTP expert engine 104 in order to determine life occurrences 108.

The MTP 102 may receive user data from a source, such as an external entity 122, and such as via the ESB 124. The MTP 102 may then transmit the user data to a user such as a user operating a mobile device executing the lifestyle container 408. Further, the MTP 102 may transmit the user data, static user profile 502, and the dynamic user profile 504 to the MTP expert engine 104. The MTP expert engine 104 may determine life occurrences based on the multi-dimensional context 110, and the profile related data. The MTP expert engine 104 may further generate the resolution path 114 for resolving one or more aspects of the occurrence. The resolution path 114 may comprise a series of action trigger-events leading to resolution of the life occurrence. The MTP expert engine 104 may generate the resolution path using any of the fuzzy logic 204, neural network 208, machine learning 508 or any combination thereof.

The MTP expert engine 104 may communicate one or more resolution actions to the MTP 102, which in turn may transmit the one or more resolution actions to the life occurrence node 120. For example, the static user profile 502 and the dynamic profile 504 may indicate that the user has placed an order for a new rug that has been purchased by other users who also bought bedroom furniture. Accordingly, the MTP expert engine 104 may determine that the rug may be suitable for the bedroom and generate a new action for the user to purchase bedroom furniture. The life occurrence node 120 equipped with the lifestyle container 408 may execute the one or more resolution actions based on the selection of the user. In addition, the MTP expert engine 104 may communicate a variety of types of data and perform a range of functions with the MTP 102. The variety of data may include notification, alerts, suggestions, time, location, and the like. The functions may include trigger bus exchange, synchronization, reconciling temporal/spatial windows for contextual consistency. On receiving the one or more resolution actions, the lifestyle container 408 may facilitate alerting a user of the mobile device to resolution paths available for addressing an aspect of life occurrence, and based on user response to an alert, the lifestyle container 408 may cause life occurrence node-based (e.g. mobile) transactions matched to the resolution paths.

The MTP 102 may be configured to communicate with a personalized instrument 510 (e.g., washing machine) that may be configured to securely cause a life occurrence-based/mobile transaction matched to the resolution action to be executed by a server 512. The MTP expert engine 104 may determine life occurrences based on the multi-dimensional context 110 derived from analysis of user transactions associated with the MTP 102 and third-party sources of user-related data. The MTP expert engine 104 may generate a resolution path for resolving one or more aspects of the occurrence. The resolution path may include a series of action trigger-events leading to resolution of the life occurrence. The life occurrence management platform may include the transactional analytics facility 128 for handling transactions of a personal mobile device, analyzing the transactions, and providing the analysis to the MTP expert engine 104. The ESB 124 may facilitate access by the MTP expert engine 104 and the transactional analytics facility 128 to ecosystem resources. The lifestyle container 408 deployable on the life occurrence node 120 may facilitate alerting a user of the life occurrence node (e.g. mobile device) to resolution actions available for addressing an aspect of life occurrence, and based on user response to an alert, the lifestyle container 408 may provide the personalized instrument 510 to securely cause a life occurrence-based/mobile transaction matched to the resolution action to be executed by the server 512.

The life occurrence node 120 may facilitate administering selection of at least one resolution action for addressing an aspect of the life occurrence. The resolution action may comprise providing the personalized instrument 510 to securely cause a life occurrence-based/mobile transaction matched to the resolution action to be executed cooperatively with a server 512.

Figure 6:
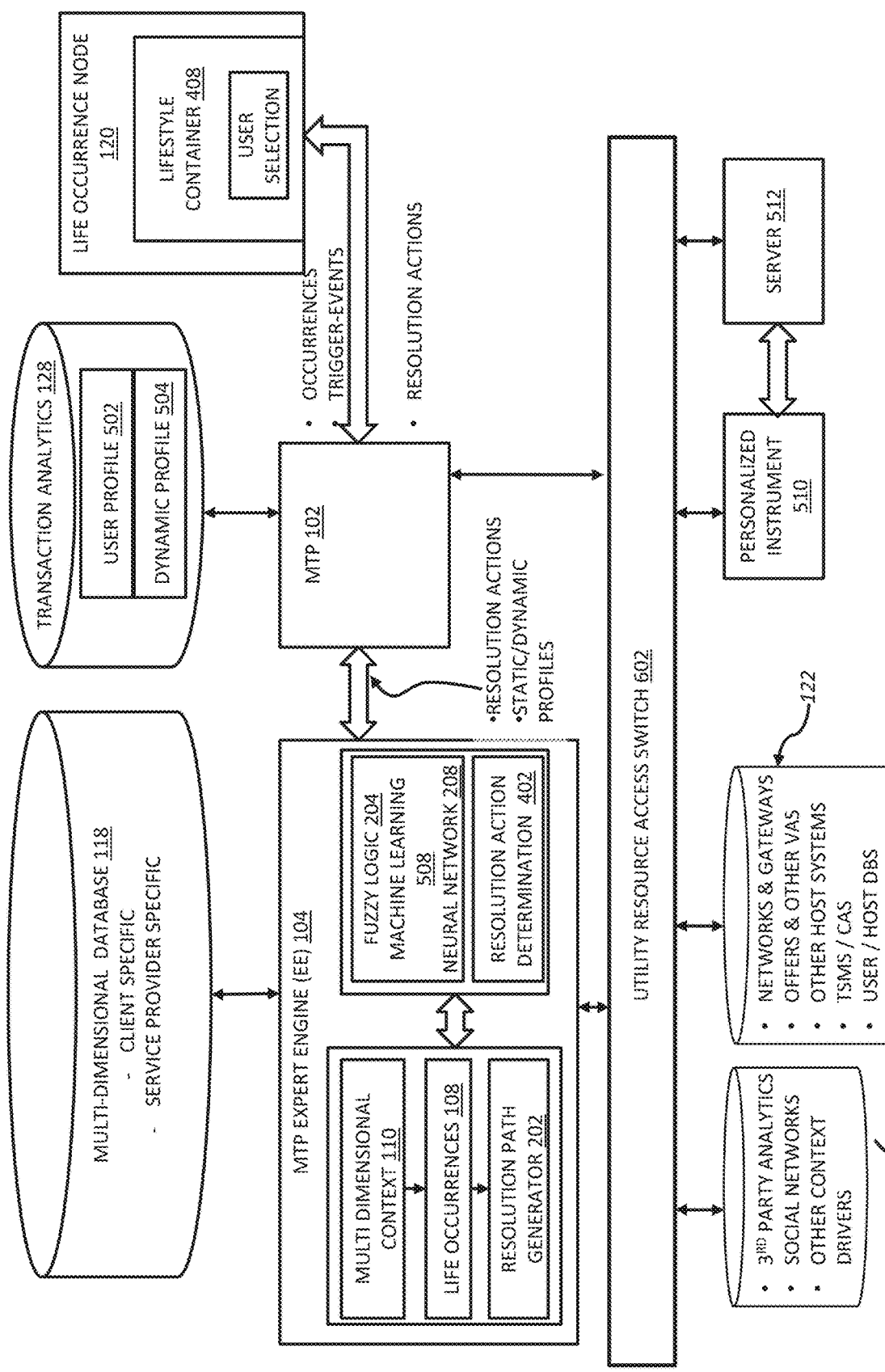
FIG. 6 depicts a high-level system diagram including an MTP-EE configured to communicate via a utility resource access switch to access ecosystem resources.

Referring to FIG. 6, a utility access switch 602 is depicted. The utility access switch 602 may facilitate access to the ecosystem resources such as third party analytics, social networks, context drivers and at least one of networks and gateways, offers and value added services, host systems, trusted service managers (TSM), certificate authorities (CA), and databases for the MTP expert engine 104 and the transactional analytics facility 128.

An expert engine may facilitate determining a type of life occurrence of an individual among a set of possible life occurrences based at least in part on a multidimensional data set constructed in connection with a mobile transaction platform (MTP) through which the individual conducts transactions and generating a resolution path having a series of action triggers leading to resolution of the life occurrence via uses of the mobile device. Determining the type of life occurrence and/or generating the resolution path is based on feedback shared between the MTP and the expert engine that is derived from user responses to the action triggers as to at least one of the accuracy of the determination of the life occurrence and the appropriateness of the resolution path.

A transactional analytics facility may facilitate analyzing user transactions associated with a mobile transaction platform (MTP) and third-party sources of user-related data to generate a static user profile for use by an expert engine for determining life occurrences based on multidimensional context derived from analysis of the static user profile and current context including time, space, and user input.

A mobile transaction platform may include an expert engine for determining life occurrences based on multidimensional context derived from analysis of user transactions associated with a mobile transaction platform (MTP) and third-party sources of user-related data. The expert engine may generate a resolution path for resolving one or more aspects of the occurrence. The resolution path may have a series of action triggers leading to resolution of the life occurrence. In addition, a transactional analytics facility may be employed for analyzing the transactions conducted with the MTP and creating a dynamic profile of the user for use by the expert engine for at least one of determining life occurrences and generating a resolution path.

Figure 7:
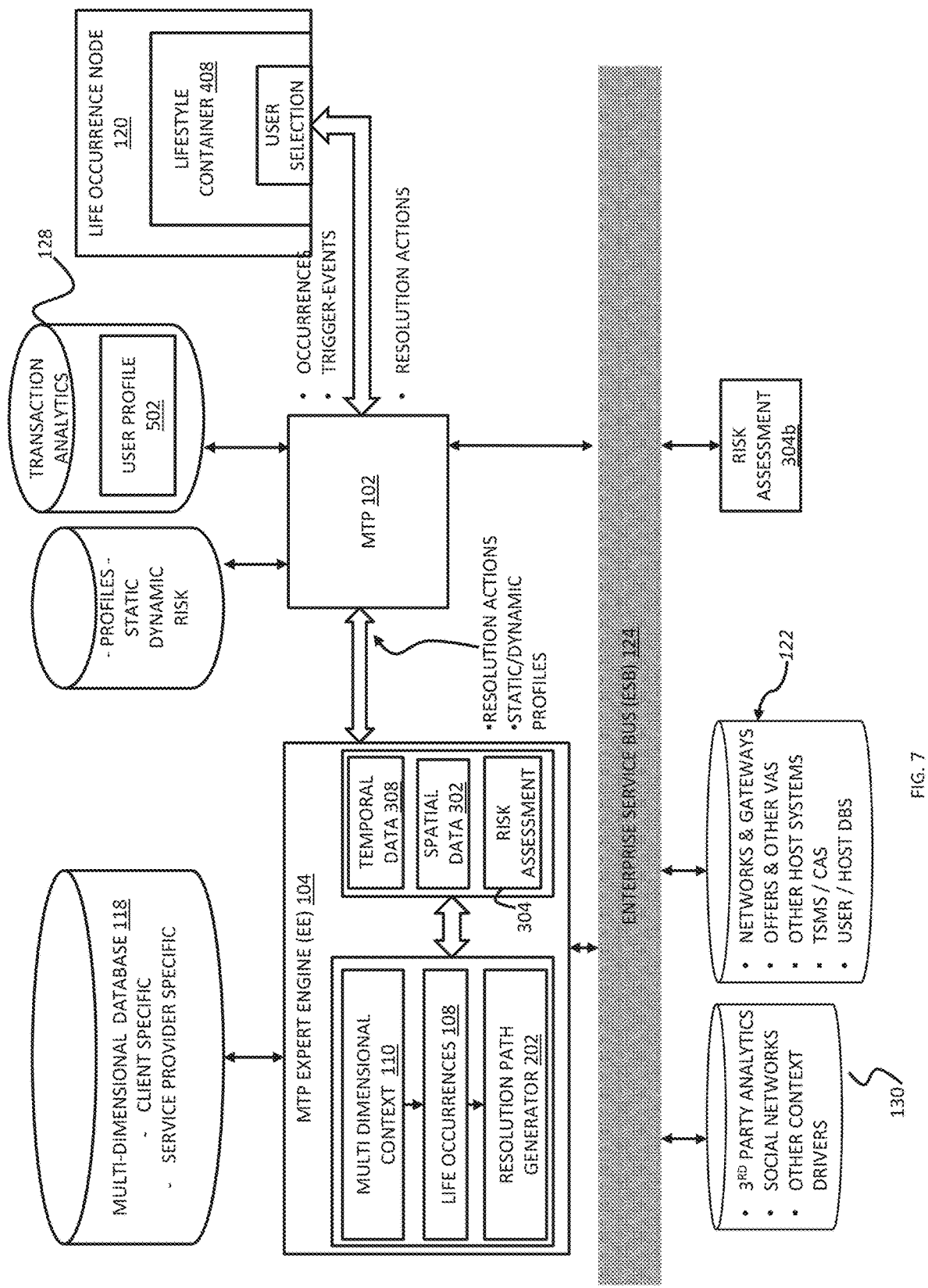
FIG. 7 depicts a high-level system diagram including an MTP expert engine configured to generate a resolution path having a series of action trigger-events.

FIG. 7 depicts a high-level system diagram including an MTP expert engine 104 configured to generate a life occurrence aspect resolution path having a series of resolutions actions, wherein the resolution path is responsive to one or more trigger-events associated with a life occurrence. As further described elsewhere herein, an individual may conduct transactions through the MTP 102, thereby making a wide range of transaction-related information available to the MTP 102. As illustrated, various forms of data, some of it transaction-specific, may be exchanged between the expert engine 104 and the MTP 102 including, but not limited to, trigger-event data, sync data, notifications, alerts, suggestions, temporal data, static profiles, dynamic profiles, risk profiles, generic user profiles, and the like. The MTP 102 may be connected to a user life occurrence node, such as a user's mobile device, to exchange important context related information, such as life occurrences, trigger-events, resolution actions, preconfigured mobile transactions, and the like.

A life occurrence services platform may participate in risk mitigation through risk assessment and management. A risk assessment capability 304 may be developed in conjunction with the expert engine 104. Alternatively risk assessment capabilities may be configured as separate risk assessment services 304b that may be provided by third parties that may interface with the platform through an enterprise service bus, such as ESB 124.

The expert engine may be sensitive to transaction risk for service providers. The expert engine may generate a resolution path based on a combination of the outcome predicted for an individual and an assessment of the risk imposed by the generated resolution path on a third party service provider that may support the resolution path. Such an assessment of risk may be based on the cumulative risk to the service provider with respect to the individual user or an assessment may be based on an assessment of the cumulative risk the individual places across multiple service providers.

The expert engine 104 may utilize risk as a context driver when generating triggers and attendant resolution actions. For example, as the MTP 102 executes one or more transactions in response to a user's inputs in response to an alert of a trigger, the MTP 102 may dynamically identify one or more attributes of the transactions as amounting to an unacceptable risk. In response, the MTP 102 may alert the user to, for example, chose a different mode of payment or another vendor. For example, a user may be provided multiple payment options for proceeding with the mobile transaction. The user may further have defined a default credit card for mobile transactions that may be selected in the event that no other form of payment is selected and/or if a chosen form of payment is not acceptable. In this way, the MTP, in cooperation with the container 106 and/or other MTP resources on the mobile device, may automatically switch forms of payment and/or vendors in response to detection of an unacceptable level of risk. A non-limiting example of risk management, the user may buy neckties and the expert engine 108 may identify matching cufflinks and suggest to the user to purchase the matching cufflinks at an identified vendor with the vendor's issued credit card. The user agrees and lifestyle container 408 is updated to facilitate presenting a consolidated view of the transaction. However, expert engine 104 determines that an aspect of risk of this transaction is unacceptable (e.g. payment terms of the vendor's credit card are onerous) and suggests to the user the choice of using a different credit card that is accessible in the user's mobile wallet via the mobile device instead of the store card, even though the user will lose out on some vendor-specific loyalty points.

A life occurrence management platform may include or be communicatively coupled with a central ID management system. A central ID management capable life occurrence management platform may be used to implement life occurrence servicing as described herein. A Profile and ID management and authentication capability may be separated out from core life occurrence management platform elements into a separate system that may communicate over a transaction support bus, such as the ESB 124 to facilitate handling ID-related functions associated with life occurrence servicing. Alternatively, a switching and brokering interface may be provided between the life occurrence handling elements (e.g. MTP, expert engine, and the like) and a separate ID management system rather than the ESB. ID related functions, such as security functions (e.g. cryptography, etc.) may also be pulled out in a separate system coupled with a life occurrence management platform such as for security, trust models, approaches for authentication and the like. An ID-aware container may be provided for life occurrence nodes using ID functions to securely execute mobile applications and other types of applications.

ID may be used as a handle to the profile in a life occurrence management platform and the profile can be of various types. These profiles may comprise static profile that may encompass a person or a user, a dynamic profile, a risk profile, and the like. ID may be associated with triggers and events. ID life occurrence management platform may interact with the risk system.

Feedback responses may be shared between the MTP 102 and the MTP expert engine 104. The feedback responses may be derived from user responses to presented resolution action and may be useful to determine at least one of a measure of accuracy of a life occurrence determination by the expert engine and a degree of appropriateness of a particular resolution path suggested by the expert engine.

A transactional analytics facility 128 may populate and maintain a transactional analytics data store by analyzing the user transactions associated with the MTP 102 and the third-party sources of user-related data, thereby generating at least a static user profile. The MTP expert engine 104 may utilize the static user profile for determining life occurrences based on the multi-dimensional context 110. The multi-dimensional context 110 may be derived from analysis of the static user profile 502 and current context including temporal data 308, spatial data 302 and user input.

A transactional analytics facility may also analyze the transactions conducted with the MTP 102 and create a portion of a dynamic profile of the user. A dynamic user profile may be used by the MTP expert engine 104 for at least one of determining life occurrences and generating a resolution path.

The transactional analytics facility 128 may analyze the user transactions associated with the MTP 102 and third-party sources of user-related data to generate a risk profile of users. The risk profile of the users of the MTP expert engine 104 may be used to generate trigger-events, resolution actions, life occurrences, potential transactions, and the like based on multi-dimensional life occurrence context. The risk profile may be useful for determining if one or more resolution actions are suitable for presenting to a user. The risk profile may be used for ranking resolution actions.

In the context of risk profiling, a life occurrence management platform may utilize user risk profiling to allow merchants to maximize checkout conversion rates while also decreasing fraud on transactions through use of a risk based authentication system and dynamic multi-factor authentication methods. Exemplary use cases of risk profile based transactions, without limitations, are presented herein below.

In an example, a merchant may be able to choose a type of Checkout during Account Management to accomplish a preferred degree of risk management. The life occurrence management platform may re-use existing functionality for merchants to opt into advanced checkout and onboard 3D Security authentication information. As part of account management, merchants may be able to opt in to different levels of authentication. The life occurrence management platform may provide a way for Merchant Service Providers to make choices on behalf of their merchants. The life occurrence management platform may be able to capture necessary data fields as part of bulk merchant upload file, including without limitations a channel of a merchant, Merchant Category Code (MCC/aka card acceptor business code), Merchant ID (MID), merchant account information at a payment gateway in order to process/accept payments, Acquirer ID, and the like. The life occurrence management platform may be able to update content on existing Advanced Checkout placements to reflect additional functionality.

In an example, a user may want to be able to choose how he would like his cards to be treated in advanced and verified Checkout while making transactions through a life occurrence management platform. The life occurrence management platform may maintain a batch file, which may contain Card Issuer preferences at the Bank Identification Number (BIN) level.

In an example, a life occurrence management platform may be able to run JavaScript to capture device details during checkout. The life occurrence management platform may be able to capture device ID and redirect checkout experience, including eCom, mobile web, and native app implementations and the like. The life occurrence management platform may be able to capture device ID in an API-based one click during checkout (full Primary Account Number (PAN) requested), including eCom, mobile web, and native app implementations. The life occurrence management platform may be able to capture device ID outside of checkout in cases where not all data will be present. This may include API pairing, Account Management, or future functionality. This may include eCom, mobile web, and native app implementations and the like.

In an example, the life occurrence management platform may determine the type of log in method for each session and normalize the selection. The life occurrence management platform may be able to create, assign and edit a 'login method' for each wallet. The life occurrence management platform may be able to execute an API one-click checkout that may be assigned a unique login method and may override the wallet value. Each API one-click checkout may be assigned its own value. The life occurrence management platform may create a mapping table that matches all the discrete login method values to generic values supported by the system. The life occurrence management platform may be able to create, assign, or edit for login methods and their mappings outside of a quarterly release, including new values on either end.

In an example, a life occurrence management platform may record how each card of a user has been previously authenticated for transaction by the system, and update the value on subsequent authentications. The life occurrence management platform may track the strongest authentication method used for every PAN within each wallet account. The life occurrence management platform may update the card authentication value during card add and edit or during checkout, and the like. The life occurrence management platform may create ability to add new verification methods (or break into more granular types) or re-order strength of each method for example Unverified methods, Card Verification Code (CVC) validation, Address Verification Schemes (AVS) w/ CVC validation, Camera/Video capture, SecureKey NFC, 3DS, 3DS—One Time Passcode (OTP), Direct Provisioned where card issuer=wallet issuer, or other methods. The life occurrence management platform may update card verification status to an equal, or stronger method and may authenticate it successfully. If a card fails explicit authentication, its verification method may be downgraded to Unverified by a life occurrence management platform. The life occurrence management platform may identify if a PAN is on a current 'fraud' list and add flag such as On System to Avoid Fraud Effectively (SAFE) list, High chargeback rate, On Issuer Provided Account Status List, and the like.

In an example, the life occurrence management platform may provide card verification status during checkout for certain cards as an API wallet. The life occurrence management platform may add card verification status as a checkout parameter for API wallets. If API wallet provides card verification status for a PAN during checkout, the life occurrence management platform may for example use provided value only if card issuer=wallet issuer. The life occurrence management platform may create BIN table to determine if wallet issuer=wallet issuer. For API wallet, if card issuer=/wallet issuer, then the life occurrence management platform may ignore the provided value and update the card verification status for the card only after successful step-up authentication. In an example, the life occurrence management platform may be able to normalize card verification methods to Risk Based Decisioning (RBD) supported generic values. The life occurrence management platform may create a mapping table between each card verification method and the generic values supported by a RBD system. The mappings may be able to be added or changed outside of a quarterly release.

In an example, the life occurrence management platform may assign a confidence interval to indicate if account owner is likely a fraudster or a legitimate customer and normalize it as a generic value for the RBD. In an example, the confidence interval may be the strongest card verification method of a card in a wallet. The confidence interval may be mapped to the RBD generic value (e.g. strong, medium, weak). In an example, the life occurrence management platform may create rules that may combine the card verification methods for multiple cards in the wallet with the level of contact information verification, and then map to the confidence interval RBD supported values (e.g. 2 cards with medium verification methods+email verified+phone verified=high confidence interval). The life occurrence management platform may identify the strongest card verification method used for the cards in the wallet account. The life occurrence management platform may update the wallet account status after every card add, edit, or delete selections. The life occurrence management platform may update also after email or phone validation. The life occurrence management platform may identify whether the account's contact details have been validated for example it may determine if email address and mobile phone is validated. In an example, the life occurrence management platform may determine whether to request a trust score from an RBD platform so as to minimize costs. The life occurrence management platform may create logic for this purpose.

In an example, the life occurrence management platform may collect and aggregate data from all wallet types to provide it to the RBD platform during either a recommendation request or a data-contribution only request. The life occurrence management platform may determine whether to submit a full recommendation request, which requires RBD to return a recommendation and score or a data-only contribution request, which does not require a recommendation or score.

In an example, the life occurrence management platform may collect data from all wallet types via API-based checkout requests to provide it to the RBD platform as a contribution or recommendation request. In an example, the life occurrence management platform may determine whether to invoke step-up authentication based on different preferences. The life occurrence management platform may create ability for a wallet to be flagged for example as Pre-authenticated and the like. Based on RBD recommendation or based on defined criteria, step up authentication may be bypassed. Otherwise if the RBD recommendation is bad, the life occurrence management platform may not continue with user flow and follow recovery path defined by each user experience. If RBD recommendation is a challenge, the life occurrence management platform may determine what step-up method may be presented to the user. If the life occurrence management platform does not receive a response from the RBD system that is sufficiently high enough for authentication, the life occurrence management platform may set default to challenge response. In an example, the life occurrence management platform may follow special step-up rules when wallet is pre-authenticated and the card issuer is same as wallet issuer or other preset conditions. The life occurrence management platform may maintain rules to determine which step up authentication method to use in different situations and user preferences. The life occurrence management platform may send data to a server to generate an Account Address Verification (AAV) for transactions. Authorizations may be appropriately flagged by the life occurrence management platform to indicate level of, and reason for, authentication. The life occurrence management platform may want authentication and transaction data to be collected so that reporting, billing, and analytics capabilities are improved.

The life occurrence management platform may store billing and tracking data. The life occurrence management platform may have data for tracking and to calculate possible future billing events which may made available to a billing system and/or to a customer reporting system and/or and to an internal reporting system. This data may comprise data for each processed transaction such as date and time, type of checkout used, Merchant ID, Wallet ID, PAN (may be kept encrypted for security reasons—and only made available on a need to have basis), transaction amount (in USD plus EUR/BRL, depending on the issuer country), Card brand (MasterCard/Maestro/Other), Card type (Debit/ Charge-or-Credit/Prepaid/not known), Issuer configuration options that are applied to a transaction, Merchant configuration options that are applied to a transaction (Basic, Verified, Advanced), step-up action taken (no step-up without valid Account Address Verification (AAV); no step-up with valid AAV; step-up; not applicable), step-up result (AAV received; no AAV received; not applicable), transaction risk level for a transaction, type of post-back received (successful, not successful, none), Check-out phase reached by a transaction (successful login; card selected; sent to 3DS; control handed back to merchant; post-back received), and the like. The life occurrence management platform may be able to provide check out quality data to Issuers, including failed authentication rate of 3D secure, failed authentication rate of check-out and the key components of such rate that may be calculated in various ways, failed authentication rate of verified check-out, failed authentication rate of basic check-out, fraud-related authorization decline rate, and the like. The life occurrence management platform may be able to provide general data to issuers and may provide data to merchants.

The methods and systems disclosed herein may comprise an ecosystem enabled lifestyle container. The lifestyle container may be implemented via a mobile device. The lifestyle container may allow a user to facilitate coordinating detection of triggers, use/execution of personalized widgets, presentation of resolution actions, and execution of preconfigured mobile transactions to facilitate addressing a life occurrence. Context for triggers may be developed based on time, location, transaction analytics, third-party user-related data such as social networks, calendars, family associations, etc. and adapting the container to monitor trigger context for detection of triggers. The trigger context may be updated through an enabling layer operable on the mobile device that provides access to trigger context sources such as GPS, clock, calendar, among others. The lifestyle container may comprise personalized widgets available to the eco-system that may be identified and configured to facilitate service delivery to address certain life occurrences. The lifestyle container may be preconfigured with mobile transactions that may be executed via the configured personalized widgets to effect service delivery that satisfies an aspect of the life occurrence. Such preconfigured mobile transactions may be associated with resolution actions presented to the user in response to a detected trigger. Users may then accept and execute the transactions or actions. The lifestyle container may communicate with the MTP or the expert engine to maintain current context for triggers. Trigger context may be synchronized to maintain current context for the triggers. Synchronization may include updating the trigger context of the lifestyle container through an enabling layer operable on the mobile device that provides access to trigger context sources.

Figure 8:
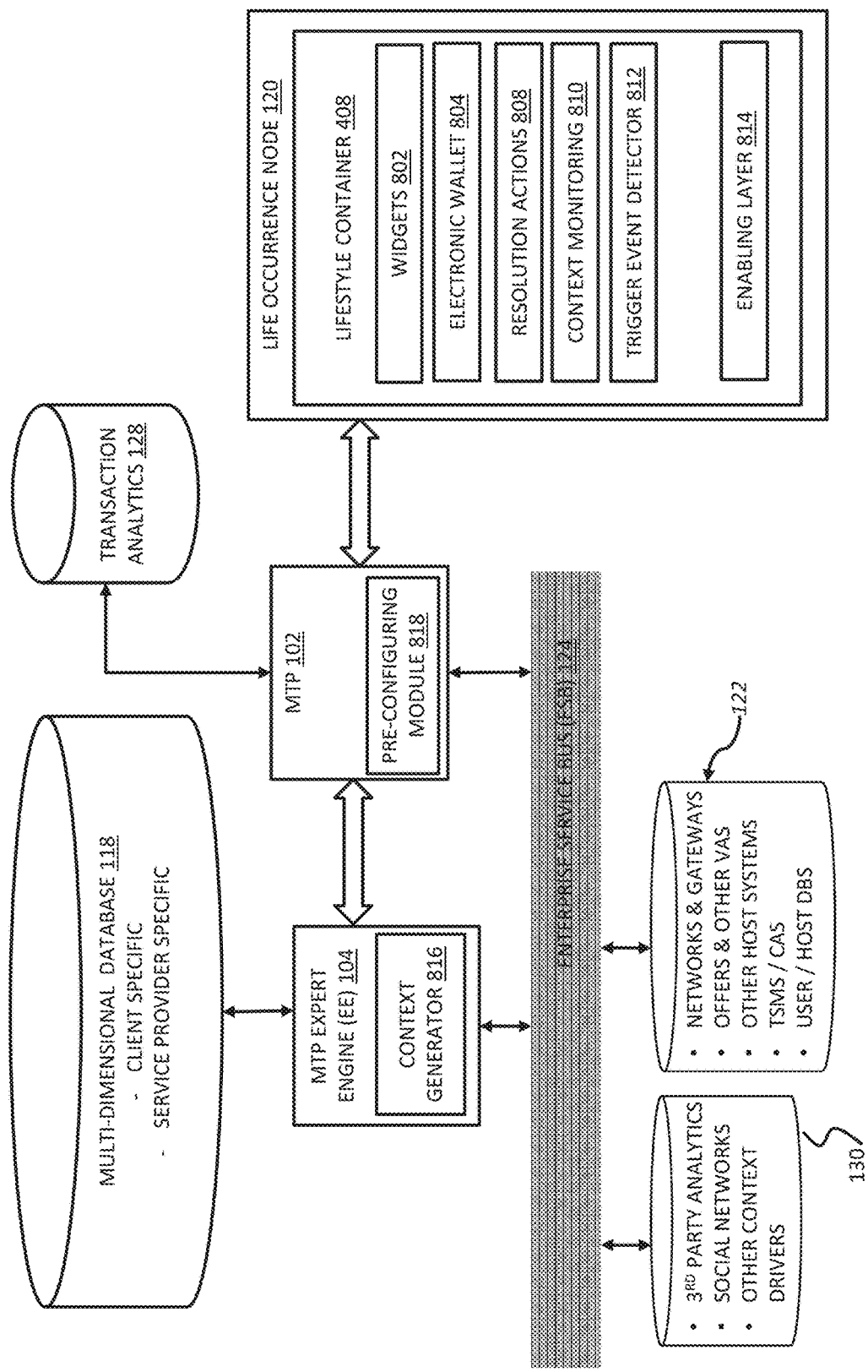
FIG. 8 depicts a high level system diagram including a life occurrence container configured to facilitate shopping transactions based on action trigger-events.

FIG. 8 depicts a high-level system diagram including a life occurrence container configured to facilitate execution of mobile transactions for satisfying an aspect of a life occurrence. The life occurrence node 120 may be a user's mobile device or any other network connected device. When a life occurrence node 120 indicates a transaction is required to satisfy an aspect of a life occurrence, the MTP expert engine 104 may identify merchants, determine coupons, utilize loyalty points and perform the transaction. The MTP 102 may facilitate a secure, enabled ecosystem, with personalized transactions involving multiple providers, and disparate domains.

The life occurrence node 120 may be configured to include a lifestyle container 156 for facilitating transactions for satisfying an aspect of a life occurrence in the secure mobile transaction platform. The lifestyle container 408 may include widgets 802, electronic wallet 804, resolution actions 808, context monitor 810, trigger event detector 812, and an enabling layer 814. The trigger-events detector 812 may detect one or more trigger-events associated with a life occurrence. The trigger-events may be temporal based trigger-events, spatial based trigger-events, or other types of trigger-events. The temporal based trigger-events can be explicit in nature (e.g., user may define such trigger-events) or may be implicit in nature (e.g., the trigger-events detector 812 may detect such time based events from the database, from social networking sites associated with the user, and the like). The location-based trigger-events may get activated when a life occurrence node associated with the user is detected in specific spatial location.

The MTP expert engine 104 may include a context generator 816 that may develop context for the trigger-events based on time, space [location], transaction analytics, third-party user-related data [social n/w, calendar, associations (e.g. family), etc]. The context monitor 810 of the lifestyle container 408 may monitor the trigger-events context for detection of trigger-events. Subsequently, the lifestyle container 408 may facilitate updating of the trigger-event context through the enabling layer 814 that may be operable on the mobile device that provides access to trigger-event context sources (GPS, CLOCK, CALENDAR, etc.). The lifestyle container 408 may further identify and configure the widgets 802 that may be available in the eco-system that facilitate service delivery for addressing the life occurrence. Accordingly, lifestyle container 408 may associate resolution actions 808 that may be presented to the user in response to a detected trigger-event with preconfigured mobile transactions for executing the actions in response to a user acceptance of the actions.

The MTP 102 may include a pre-configuring module 818 that may pre-configure mobile transactions that may be executed via the configured personalized widgets to effect service delivery that satisfies an aspect of the life occurrence.

The life occurrence may be predicted based on user-specific mobile transactions processed through a mobile transaction platform and user-related data derived from third party user data sources. Accordingly, the widget 802 may facilitate service delivery via a service layer of a platform for secure personalized mobile transactions. Such personalized mobile transactions may be associated with a vendor that may be determined from analysis of mobile transactions processed through a mobile transaction platform, life occurrence metadata, and user-related data derived from third party user data sources. The enabling layer 814 operable on the lifestyle container 408 may facilitate interoperation of the lifestyle container 408 and the life occurrence node 120 (e.g. mobile device) resources including user interface, communications, and secure element access.

An eco-system enabled lifestyle container may be configured for a user of a mobile device to facilitate coordinating detection of triggers for addressing a life occurrence determined by an expert engine via uses of the mobile device. Context for developing triggers may include triggers based on time, space [location], transaction analytics, third-party user-related data [social n/w, calendar, associations (e.g. family), etc.]. The container may be adapted to monitor trigger context for detection of triggers. The lifestyle container may be synchronized with at least one of the expert engine and a mobile transaction platform (MTP) through which a user conducts transactions via the mobile device to maintain current context for the triggers. Synchronizing may include updating the trigger context of the lifestyle container through an enabling layer operable on the mobile device that provides access to trigger context sources [GPS, CLOCK, CALENDAR, etc.].

Configuring an eco-system enabled lifestyle container for a user of a mobile device to facilitate coordinating detection of triggers for addressing a life occurrence determined by an expert engine via uses of the mobile device may include a few steps. At least one step may include developing context for triggers based on time, space [location], transaction analytics, third-party user-related data [social n/w, calendar, associations (e.g. family), etc.] and adapting the container to monitor trigger context for detection of triggers. Another step may include communicating among the lifestyle container, the expert engine and a mobile transaction platform (MTP) through which a user conducts transactions via the mobile device to maintain current context for the triggers.

A lifestyle container as described above and elsewhere herein may execute on a mobile device in a way that is similar to a container that is described in U.S. patent application Ser. No. 13/651,028 filed Oct. 12, 2012.

Configuring the lifestyle container may include communicating over a wireless signal (e.g. mobile network) between a mobile device that stores the container and networked connected resources, such as other mobile devices, servers, point of sale devices, and the like.

The systems and methods disclosed herein may comprise a method of alerting a user to a life occurrence. The creation of a life occurrence alerts may comprise taking metadata that describes a future life occurrence. Possible resolution actions beneficial to take in advance of the occurrence of the life occurrence may then be determined based on multidimensional context derived from analysis of user transactions performed with a mobile device via a mobile transaction platform and third-party sources of user-related data. Additionally, context of trigger conditions for each resolution action may be determined and the trigger context monitored. When trigger conditions are met, the resolution actions may be presented. Such resolution actions may include life occurrence context that is relevant to a user making a decision about accepting the resolution action. Each resulting action or transaction for the contextual resolution action may be prepared on the mobile device. When the user accepts a resolution action, the mobile device's action or transaction may be processed. Preparation of the mobile device for the action or transaction may include configuring a widget to access an ecosystem service provider, an electronic wallet on the user's mobile device, a secure element of the mobile device, and to optionally trigger other widgets to execute on the mobile device. Additionally, preparation of the mobile device may include configuring one or more widgets that follow user preferences for form of payment, receipt handling, delivery/contact details, etc. to facilitate service delivery that effects the action/transaction without requiring user input.

The systems and methods disclosed herein may comprise a token-based method of life occurrence alert. The method may comprise taking metadata that describes a future life occurrence and determining possible resolution actions beneficial to take in advance of the occurrence of the life occurrence. Such a resolution actions may be determined based on multidimensional context derived from analysis of user transactions performed with a mobile device via a mobile transaction platform and third-party sources of user-related data. The method may comprise determining context of trigger conditions for each resolution action and monitoring the trigger context. When trigger conditions are met, the user may be presented resolution actions with appropriate context so that the user may make a decision. The method may comprise preparing a token to facilitate executing an action or transaction for each resolution action and adapting the token based on context when the user accepts a resolution action. The token may include metadata that identifies a transaction type accessible by a server and user/wallet/device information required to execute the transaction on behalf of the user.

The systems and methods disclosed herein may comprise a mobile device configured for life occurrence resolution. The device may comprise a lifestyle container operable on a mobile device that coordinates detection of triggers, use/execution of personalized widgets, presentation of resolution actions, and execution of preconfigured mobile transactions to facilitate addressing a life occurrence. Such life occurrences may be predicted based on user-specific mobile transactions processed through a mobile transaction platform and user-related data derived from third party user data sources. The device may comprise a personalized widget for facilitating service delivery. The personalized widget may facilitate such service delivery via a service layer of a platform for secure personalized mobile transactions. The widget may be associated with a preconfigured mobile transaction vendor that is determined from analysis of mobile transactions processed through a mobile transaction platform, life occurrence metadata, and user-related data derived from third party user data sources. The lifestyle container may comprise an enabling layer operable on the mobile device for facilitating interoperation of the lifestyle container and mobile device resources including user interface, communications, secure element access. Additionally, the lifestyle container may comprise an electronic wallet operable on the mobile device that the personalized widget is authorized to access for facilitating service delivery.

Figure 9:
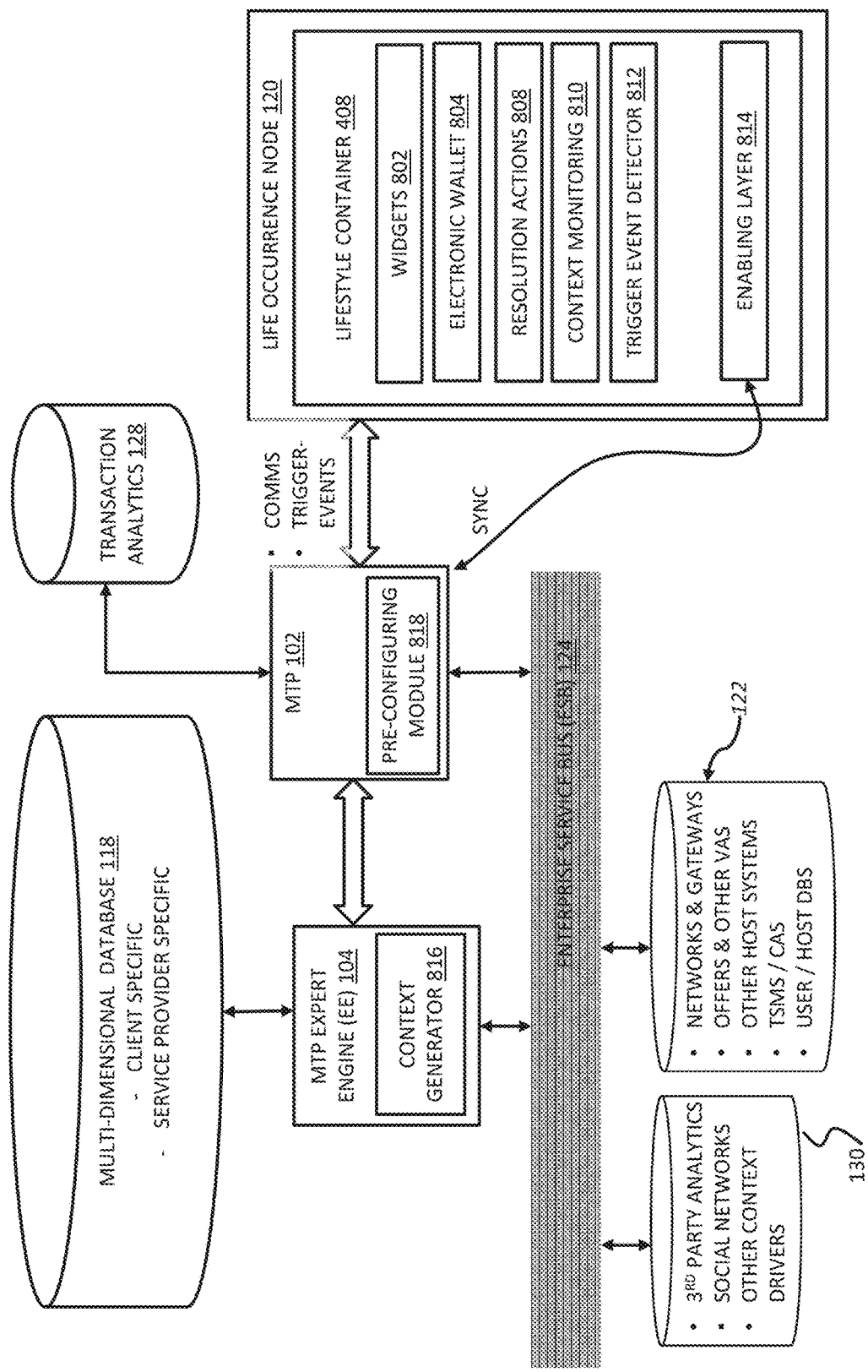
FIG. 9 depicts a high-level system diagram including a life occurrence container that may facilitate coordinating detection of trigger-events for addressing a life occurrence.

FIG. 9 depicts a high-level system diagram including a life occurrence container that may facilitate coordinating detection of trigger-events for addressing a life occurrence. In addition to functionalities description in FIG. 8, the life occurrence management platform may synchronize the lifestyle container 408 with at least one of the MTP expert engine 104 and the MTP 102 through which transactions are conducted on behalf of a user via the life occurrence node 120 (e.g. a mobile device) to maintain current context for the trigger-events. The synchronizing may include updating the trigger-event context of the life occurrence container through the enabling layer 814.

An eco-system enabled lifestyle container 408 may be configured to facilitate coordinating detection of trigger-events for addressing a life occurrence determined by an expert engine via uses of a life occurrence node, such as a mobile device. The context may be developed for trigger-events based on time, space (e.g., location), transaction analytics, third-party user-related data (e.g., social n/w, calendar, associations (e.g. family), etc), risk profiles and the lifestyle container 408 may be adapted to monitor trigger-event context for detection of trigger-events. Further, the communication among the life occurrence container, the expert engine and a mobile transaction platform (MTP) may be enabled to maintain current context for the trigger-events.

A method of life occurrence alert may include taking metadata that may describe a future potential life occurrence. Various possible resolution actions that may be beneficial may be determined in advance of the future life occurrence. The resolution actions may be determined using multi-dimensional context that may be derived from analysis of transactions performed on behalf of a user with the life occurrence node 120 (e.g. a mobile device) via a mobile transaction platform and third-party sources of user-related data. The context of trigger-event conditions for each resolution action may be determined and trigger-event context may be monitored. The method may present the resolution actions to the user when the trigger-event conditions are met. Such resolution actions may include life occurrence context relevant to a user making a decision about accepting the resolution action. The method may prepare a mobile device action/transaction for each resolution action and may adapt the mobile device action/transaction based on action/transaction context when a resolution action is accepted by the user.

A widget may be configured to access an ecosystem service provider, an electronic wallet on the user's mobile device, a secure element of the mobile device, and to optionally trigger other widgets to execute on the mobile device. Additionally, one or more widgets that follow user preferences for form of payment, receipt handling, delivery/contact details, etc may be configured to facilitate service delivery that effects the action/transaction without requiring user input.

An instrument-based method of life occurrence alert is disclosed. The method may include taking metadata describing a potential life occurrence and determining possible resolution actions beneficial to take in advance of the potential life occurrence. The possible resolution actions may be based on multi-dimensional context derived from analysis of user transactions performed with a mobile device via a mobile transaction platform and third-party sources of user-related data. The method may determine the context of trigger-event conditions for each resolution action and monitor trigger-event context. Further, the method may include presenting the resolution actions when trigger-event conditions are met. Such resolution actions may include life occurrence context relevant to a user making a decision about accepting the resolution action. Further, the method may include preparing an instrument to facilitate executing an action/transaction for each resolution action and adapt the instrument based on context when a resolution action is accepted by the user. The instrument may include metadata that may identify a transaction type accessible by a server and user/wallet/device information required to execute the transaction on behalf of the user.

The life occurrence management platform may facilitate interactions with the user through various user interfaces that are configured to display a plurality of moving panels for performing different trigger actions. Such user interfaces and the moving panels are discussed herein in conjunction with various figures related to the user interfaces associated with a life occurrence management platform. In an example, the user interfaces may be presented on a mobile device, cell phone, on a washing machine display panel. In other examples no user interfaces on life occurrence devices at all and a life occurrence management platform may simply run a series of transactions and settle wherever it needs to settle.

A node or a mobile device may be used for triggering a transaction. In other cases, a mobile phone with a lifestyle interface may be used to trigger the transaction. In some cases, the transaction triggering may be done without any device at all. The node may be a, tablet device, a mobile phone, or smart phone that may be configured for lifestyle mobile application for shopping or other life occurrences. In some cases, the node may be any other networked device such as a washing machine that may be connected with a secure, enabled ecosystem of payment providers, service providers, and the like.

A life occurrence management platform may be implemented through a lifestyle layer that may service the nodes including an endpoint device that may order things as well as act as an application on the node. For example, the nodes may be capable of performing shopping tasks. These nodes may comprise a washing machine, mobile phone, vending machine, or any other networked device. For example, if kids are returning from vacation, a person may need more supplies and the washing machine may also require more detergents. Therefore, based on the contextual information, the vending machine or washing machine may order more supplies accordingly based on derived contextual information about the user and his kids.

In a healthcare related example, the life occurrence management platform may facilitate refilling of medications based on information from sensors as end nodes. The life occurrence management platform may facilitate in purchasing pills for a user or manage hospital experiences such as including without limitations annual checkup, taking care of co-pay, insurance, etc. through the MTP. In an example, sensors may be provided with the nodes that may take signals e.g., embedded signals that may send out signals constantly, e.g., insulin levels for diabetics and the like. The sensors may be FDA approved sensors emanating signals. The life occurrence management platform may get the signals and guide routine hospital experiences accordingly. A life occurrence management platform may provide lifestyle experience on a user's phone such as walking him through whole hospital process and guiding him through the route etc. for the hospital and about parking arrangements and prepaid card that the user may use in the hospital and the like.

The life occurrence management platform may facilitate in applications such as a diet application that may constantly monitor dietary conditions, and may include consumer lifestyle utilities and the like wherein the user may log what he may eat. The logged information may be retrieved by a life occurrence management platform so as to take care of the healthcare and dietary aspects of the user. A user's FITNESS PAL™ may further take manual entry of calories, etc and the calories information may be used by a life occurrence management platform.

Utility/Usability

An entire transaction spectrum, starting from providers that are part of the secure enabled ecosystem, through the life occurrence management platform infrastructure, to the nodal devices, may be separated into a set of capabilities that may form an overall Utility, and, a set of capabilities that may form Usability. A life occurrence management functional layer may be provided that may intervene between the nodal points and the entire secure enabled ecosystem. A part of a life occurrence management platform may interact with the secure enabled ecosystem. Another portion of a life occurrence management platform may interact with the nodes. A life occurrence management platform may be enabled through several layers. These may include a utility layer and a usability layer. The utility layer may be enabled by the devices that may have capabilities that provide utility for conducting secure transactions. The utility layer may represent various portions of the life occurrence management platform as modular infrastructure elements of a utility. The various modules may be presented as infrastructure services sets that may be presented as utilities upon which applications may be made. The usability layer may be enabled through applications that may provide a layer on the usability side.

The utility and usability as discussed herein may be defined as tiers of capabilities, wherein at one end of the tiers will be features or building blocks that may comprise user, device, and application agnostic, and, at the other end may be capabilities which may be highly customized and personalized for users, devices, and applications and the like. The aspects of usability and utility may facilitate in building necessary linkages among various modules of a life occurrence management platform and their coupling for efficiency and scalability. It must be appreciated that utility components may be evolved and governed over time whereas usability components may be best suited to a relatively unrestricted and open development environment of a life occurrence management platform. It must be appreciated that certain features or capabilities of a life occurrence management platform may be part of a utility-tier, and certain features or capabilities may be part of a Usability-tier.

FIGS. 10-16 depict various tables that may include a plurality of data types and corresponding attributes of the data types that may be suitable for use in a multi-dimensional context-based database. The plurality of the data types may be indicative of the respective dimensions of the multi-dimensional database 118. The data of the multi-dimensional database 114 may be stored within the plurality of data tables as described herein. A table 1 depicts a category table that may be utilized for storing information associated with the type of the products for which the transaction may be carried out on detection of the life occurrence. The category table 1 may include category ID, name of the category and status of the category. A sub-category for each of the category may be utilized for storing information associated with the products corresponding to the sub-category of the main category. A table 2 depicts an exemplary embodiment of the sub-category table. For example, an electronics category in the table 1 includes two sub-categories, namely phone and laptops as depicted in the table 2.

A table 3 depicts a merchant table that may be configured to store information associated with the merchants that may be available to the user in the mobile transaction platform. The table 3 may be used for storing information such as a merchant ID, name of the merchant, types of the services being offered by the merchant, web address for the merchant websites, any image associated with the merchant and other related information. Such information may be displayed to the user or may be used by the MTP expert engine 104 so as to select a specific merchant from the plurality of stored merchants.

A table 4 depicts an example of a product table that is generated/referenced when performing a comparative shopping activity with lifestyle. The product table may be utilized for storing information such as product ID, product name, model number, sub category associated with the product (e.g., as indicated in table 2, information related to manufacturer, manufacturing date, price and other information associated with the product. A table 5 depicts an example of an inventory table for the products that be offered to the user while performing a shopping activity with the lifestyle container. The inventory table may be used to store information such as validity period of the offer, specifics of the offer, minimum adjustment amount of the offer, discount percentage for the user, available quantity and the status of the available offers. The MTP expert engine 104 may use these data so as to determine an offer to the user while generating a resolution path for the life occurrence.

A table 6 may include the example of plurality of units that the MTP expert engine 104 may support while determining the type of life occurrences and for generating a resolution path for resolving one or more aspects of the life occurrences. A table 7 depicts an example of an event table that may have been learnt by the MTP expert engine 104 so as to determine a candidate resolution action for resolving the one or more aspects of the life occurrences the life occurrence. The event table may include events such as a wedding date, birthday date, graduation ceremony, valentine day and other important days or time on occurrence of which the user may like to perform an action using the lifestyle container.

A table 8 depicts an example product offer table, which may be available to the user so as to perform shopping for the products available in the product offer table. A table 9 depicts an example of a loyalty table that may be generated for a specific user depending on the type of the user. The MTP expert engine 104 may determine the user behavior and analyze the transactions of the user to generate the loyalty offer for the user. The user register himself for the loyalty offers so that on detection of the life occurrence the MTP expert engine 104 may suggest a best possible loyalty offer to the user.

A table 10 is an example of a store message table, which may be used for storing messages for a specific merchant. The store message table may include information that may be harvested by, learned by, and/or pushed to the MTP expert engine 104 for use in the multi-dimensional context and resolution actions. A table 11 is an example of a product suggestion table that may store information associated with the suggestion for allowing mapping of one or more compatible products with a particular product. A table 12 is an example of a merchant_user table that may be used for storing information such as loyalty of the user for a specific merchant, any corresponding loyalty card related information, and merchant related information. The MTP expert engine 104 may utilize the table to suggest offers to the users depending on the loyalty of the user for the specific merchant.

A table 13 is an example user behavior table that may be indicative of the behavior of the user on the mobile transaction platform. The MTP expert engine 104 may be configured to analyze the user behaviors and make predictions for the patterns for the user using machine learning techniques, fuzzy logic or neural networks. Further, a table 14 is an example of initial behavior −1 for the user that may include list of life occurrences of the user, which need to be managed. Similarly, a table 15 is an example of other version of the behavior of the user. The MTP expert engine 104 may be configured to perform the behavior analysis of the user so that the MTP expert engine 104 may be learn the user engagement tendencies. Such type of behavior analysis may enable the MTP expert engine 104 to provide better grading of results that may be presented to the user. A table 16 is an example of a user alert table that may be generated for preparing a dynamic list of user lifestyle occurrence specific alerts. For example, when a user is planning to travel, the MTP expert engine 104 may determine the status of the flight of the user and accordingly, may alert the user.

The multi-dimensional database 118 may be configured to store various forms of the data in the form of tables. For example, a table 17 is an example of a payment card table that may include information associated with the payment card of the user. The payment card table may include information regarding the wallet ID that may be associated with the specific payments card. When the user may perform any transaction with the wallet, the user may select the associated payment card. The multi-dimensional database 114 may include a store table 18 that may include information associated with the available stores and corresponding merchants. The multi-dimensional database 118 may include a table 19 for storing address related information for the user. For example, for each user ID, a shipping address may be stored so that the MTP expert engine 104 may complete the shopping transaction and may dispatch the products to the shipping address as stored in the address table of the user.

The multi-dimensional database 114 may include transaction table 20 for storing information corresponding to the past transactions of the user. The transaction table 20 may include information corresponding to wallet ID, transaction ID, point of sale terminal ID, merchant ID and other related information. A table 21 may be used for transaction object related information for each transaction. The transaction table 20 and the transaction object table 21 may be used by the MTP expert engine 104 to determine transaction behavior analysis of the user so as to generate a resolution path for the one or more aspects of the life occurrence.

The multi-dimensional database 118 may include other information such as data related to inventory of the products associated with the merchant in an inventory table 22, user profile related information in a user profile table 23 and widget related information in the widget table 24.

FIG. 17 illustrates an example embodiment of a method for facilitating on boarding of a user. At step 1702, the user may onboard the lifestyle container to accept the initial terms and conditions. The lifestyle container may be closed when the user may reject the terms and conditions required to access the lifestyle container to perform one or more transactions. Otherwise, the details such as a mobile number, an email ID, and other user related information might be added. Further, various intelligent appliances such as washing machine, vending machine and the like may be registered with the lifestyle container and the lifestyle container is registered with the MTP 102.

At step 1704, a determination is made as to whether the lifestyle container requires additional processing. The MTP expert engine 104 may apply rules and logic to the received content when the lifestyle container may require additional processing. Otherwise, information associated with the lifestyle container may be persisted and stored in the multi-dimensional database 118. At step 1708, the method may include determining requirement of connecting with other systems. The MTP expert engine 104 may connect with the other networks/infrastructure via the enterprise service bus and information such as user profile from external sites, shopping history from merchants, travel information; health related information and social networking profile of the user might be retrieved. The retrieved information may be sent back to the MTP 102 for further processing.

At step 1710, the MTP expert engine 104 may process the content received from the external networks or from the internal database and generate a user profile at the MTP expert engine 104. The MTP expert engine 104 may communicate the profile generation information with the MTP 102 via MTP EE interfaces and subsequently, the MTP 102 may mark the user as a registered user with the system. At step 1712, a message corresponding to a successful registration of the user may be displayed on a display screen of the life occurrence node 120 such as the mobile device of the user.

At step 1714, the enabled ecosystem may generate offers, notifications and messages for the user to the MTP 102 via the ESB 124. Subsequently, the MTP 102 and the MTP expert engine 104 may processes these offers, notification and messages in accordance with profile of the user. At step 1718, the processed offers, notification and messages may be sent to the lifestyle container either through push messages or through synchronization methods. Subsequently, the offers, notification and messages may be displayed for the user.

Shopping Flow

Figure 18A:
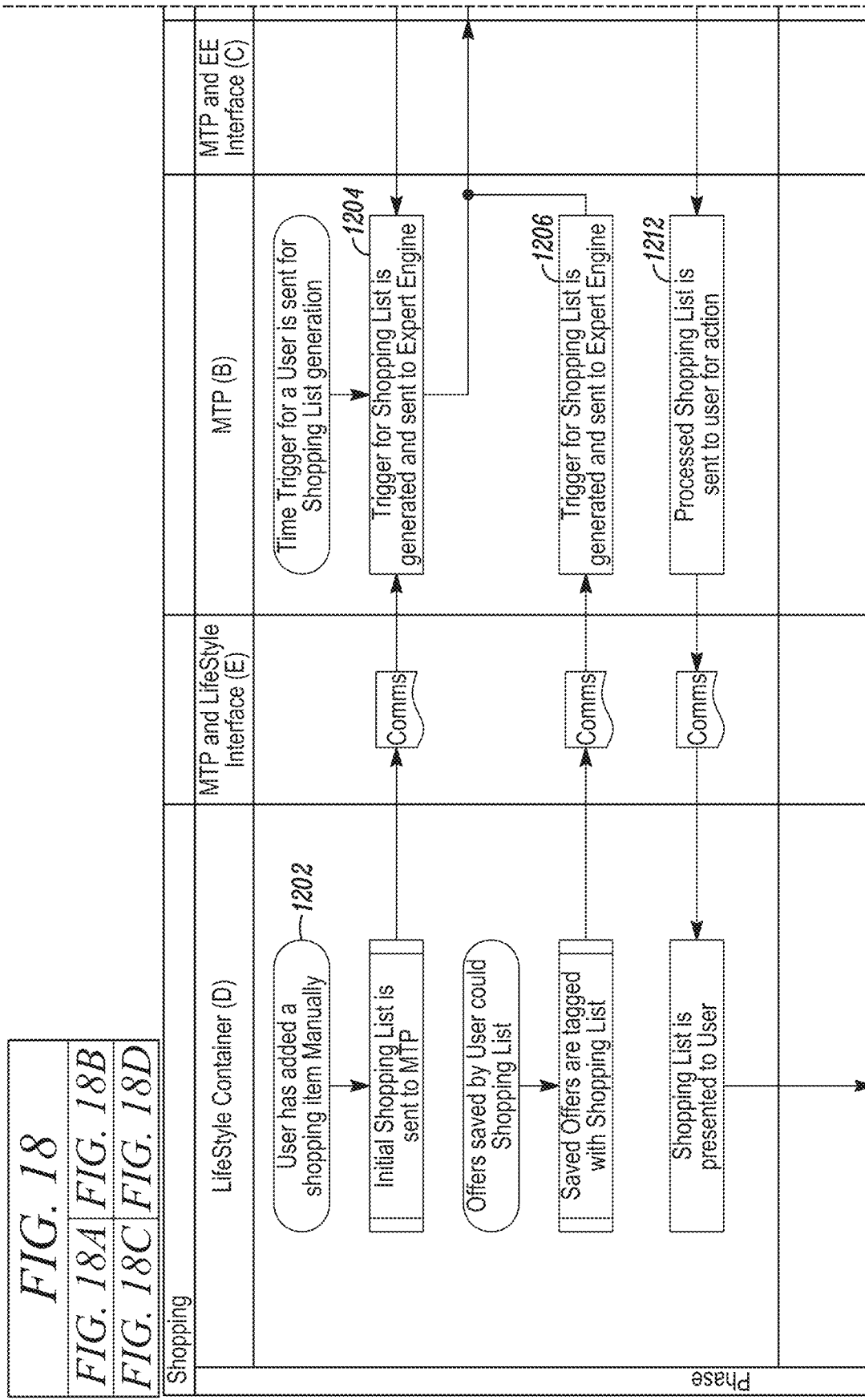
Figure 18B:
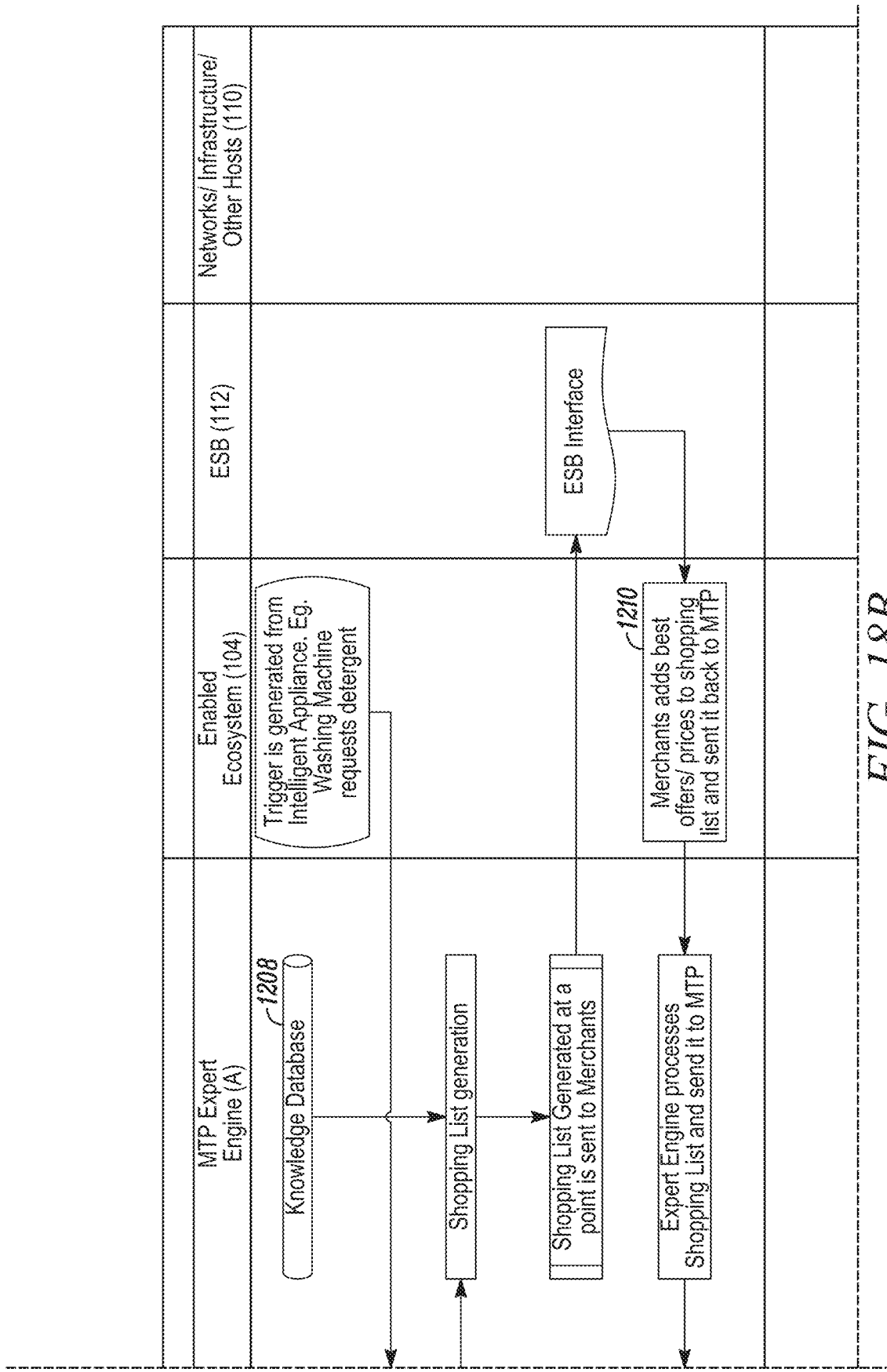
Figure 18C:
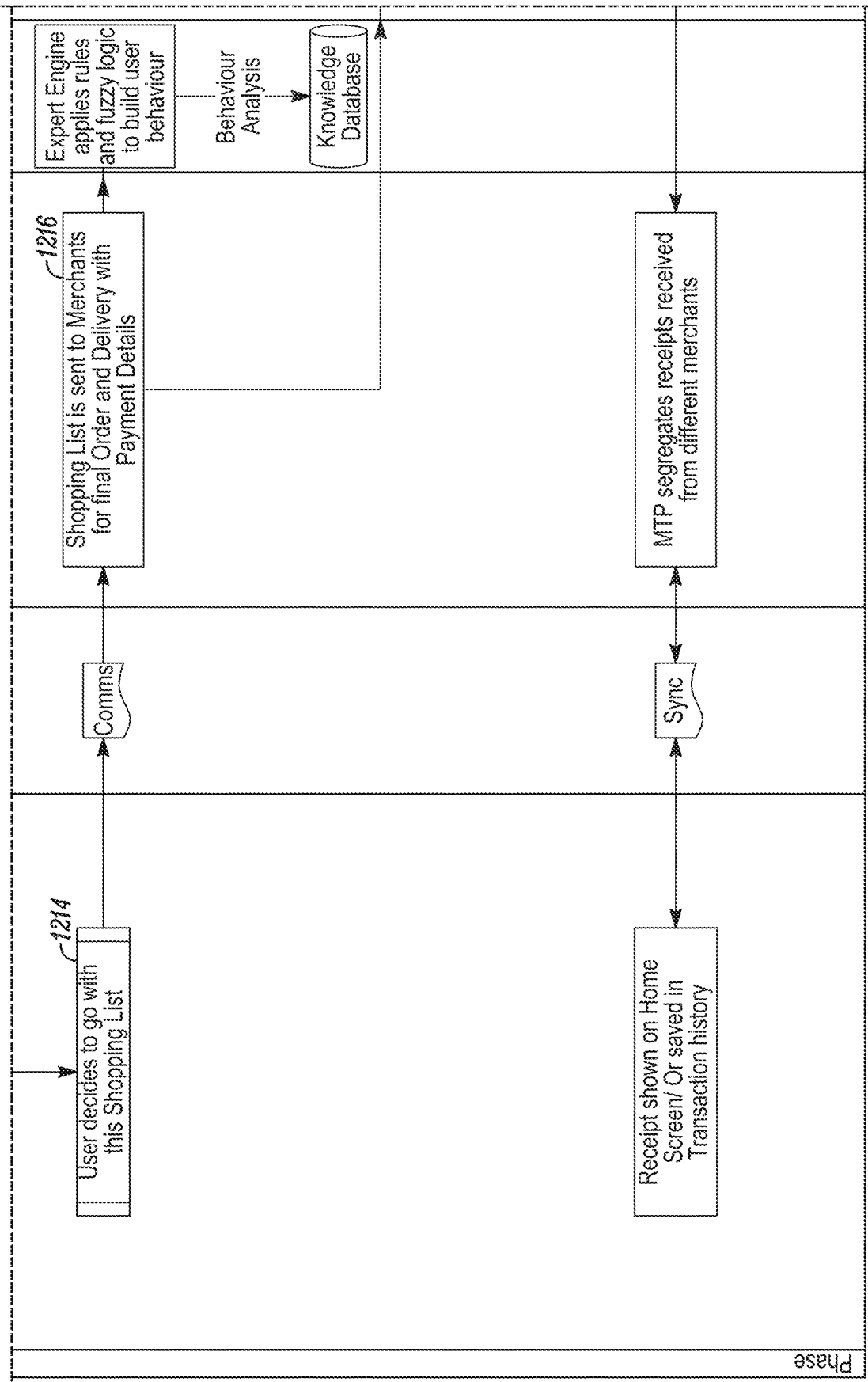

FIG. 18 depicts an example embodiment of method for facilitating shopping transaction for the user in the mobile transaction platform. The method may include accessing the lifestyle container for initiating the transaction on determining the life occurrences. The user may have the lifestyle container on a life occurrence node 120 such as the mobile device as a lifestyle app. In another example, a washing machine or any other utility device might also be set up for the lifestyle ecosystem. At step 1802, the lifestyle container may facilitate the user to add manually the shopping list and send the shopping list to the MTP 102. The lifestyle container may allow the user to tag the earlier saved offers in the shopping list and send the saved offers as items of the shopping list to MTP 102.

At step 1804, a trigger for the shopping list is generated and sent to the MTP expert engine 104. The trigger may be a time-based trigger or a location based trigger. For example, on detection of arrival of an event (e.g., birthday event), a time-based trigger is generated. In an example, Facebook birthday event may trigger possible birthday shopping and birthday itself may trigger a shopping flow. A Facebook application may remember that the user bought a tie for a friend last year, so it could inject a past purchase (cufflink) into the shopping flow to search for something else. The usability component may inject past history into the utility component at that time. The life occurrence management platform may collect information from third party data such as that the user's friend returned the tie last year. In another example, depending on the location of the user, a location-based trigger may be generated. At step 1808, the triggers thus generated may be sent to the MTP expert engine 104.

At step 1810, the MTP expert engine 104 may be configured to access the knowledge database and list of the triggers. The knowledge database may include initial behavior of the user so that the MTP expert engine 104 may utilize the behavior of the user to generate the shopping list that may be sent to the merchants. The behavior may include a plurality of shopping preferences such as sizes for example waist, dress, shoe, sizes and the like, brands, styles, genres, loyalty information, and the like. Other shopping attributes that may be extracted from the behavior analysis of the user may include merchant specific attributes across various merchants, transactions-related attributes including of other users, and the like.

For example, when a user goes to a merchant (couponing system) and he buys something, the user may get a coupon from the back end/cloud that may get pushed to the user. The user may get an instrument (coupon) as a result of that transaction. In such scenario, pushing out a coupon to a user's wallet might be a natural example in a life occurrence management platform. The coupon may be designed for anything. For example, if the user buys toothpaste, he instantly may get a coupon for a toothbrush. If every Friday Bob buys bread, the user might send a coupon from the couponing system, transfer it to the MTP and the MTP may push out the coupon to the user's wallet. The MTP expert engine 104 may recognize charity and coupons as a result of transactions but the user might want to generate a coupon based on a life occurrence analysis. For example, a user may buy bread on Fridays, so the life occurrence management platform may push a coupon on Thursday usable for buying the bread. The life occurrence management platform pushes coupons and the like that complements a transaction. The MTP expert engine 104 may for example intercept a coupon and know whether the user really needs a toothbrush. The life occurrence management platform may shop it around or find out whether that is the right coupon or whether the user needs something else. The life occurrence management platform finds out if the user is entitled to a discount on something he already bought.

The shopping list generated for the merchants may be sent to the merchants through the enterprise service bus. At step 1812, the enabled ecosystem may facilitate the merchants to add best offers/prices to the shopping list and may send the shopping list tagged with the best offers to the MTP expert engine 104. The life occurrence management platform may apply merchant rules. The rules may be user-dependent, may be based on a type of user, volume requirements e.g., across multiple users, and the like. An example of a merchant rule may be that Costco takes Amex but no other cards. If Costco is the best place to fulfill a user's complete order, then the user may not use his United MasterCard or other card. If the user uses a particular merchant like Costco, he can't use his MasterCard. The consumer might want to know what is going on before shopping at a place that won't take his card. Another example may be that Wal-Mart got customers to use PIN/Debit instead of credit cards. Merchant rules may be derived from the enabled ecosystem. They may be derived in through the Enterprise Service Bus through an API that allows specifying rules, conditions, etc. so that the expert engine may consume those rules. Merchant rules may be consulted when a bid is placed to see what rules apply to what that bid.

At step 1814, the MTP expert engine 104 may process the shopping list including the offers from the merchants to the MTP 102 and further to the lifestyle container for presenting the shopping list to the user. At step 1816, the user may decide to go with the shopping list and at step 1818, the shopping list is sent to the merchant via the ESB so that the merchant may process the shopping list. The processing of the shopping list may include generating the receipt and packaging the final order. The receipt is transmitted to the MTP 102 via the ESB and further to the user whereas, the order may be dispatched to the user. The MTP expert engine 104 may access the shopping list that may be processed by the merchant and may apply rules and fuzzy logic to build the user behavior.

In an example, shopping types may include just finding matching items, comparison shopping, Bidding, Reverse auction, expert using an expert shopping engine that may shop price line, hotwire and others. The life occurrence management platform may facilitate applying for any offers and coupons in a user's repository through lifestyle container on user's wallet or otherwise in his data repository. The life occurrence management platform may consult rules for the user and for example link them to the rules engine/ expert engine). The expert engine may apply learning stuff to figure out what bids are the best for a user. The expert engine may for example perform refinement of a bid because it senses from the user behavior that the user is not using cards at target anymore. The life occurrence management platform may consult rules regarding extent of desired intervention. A user may dial up or dial down the degree of intervention. The dial-up/dial-down may be based on sectors such as control in health care may be more relative to shopping. Within each sector, the life occurrence management platform may offer different sets of interventions. The life occurrence management platform may offer granular control for some cases and automated intervention for others. The expert engine may apply rules to general bids. For example, the life occurrence management platform may apply the rules to responses from step of shopping the shopping list. The rules engine may be connected with a fuzzy system. The rules engine may serve as a learning engine that may learn for example that someone likes a certain thing in a given circumstance.

Parking Flow

Figure 19B:
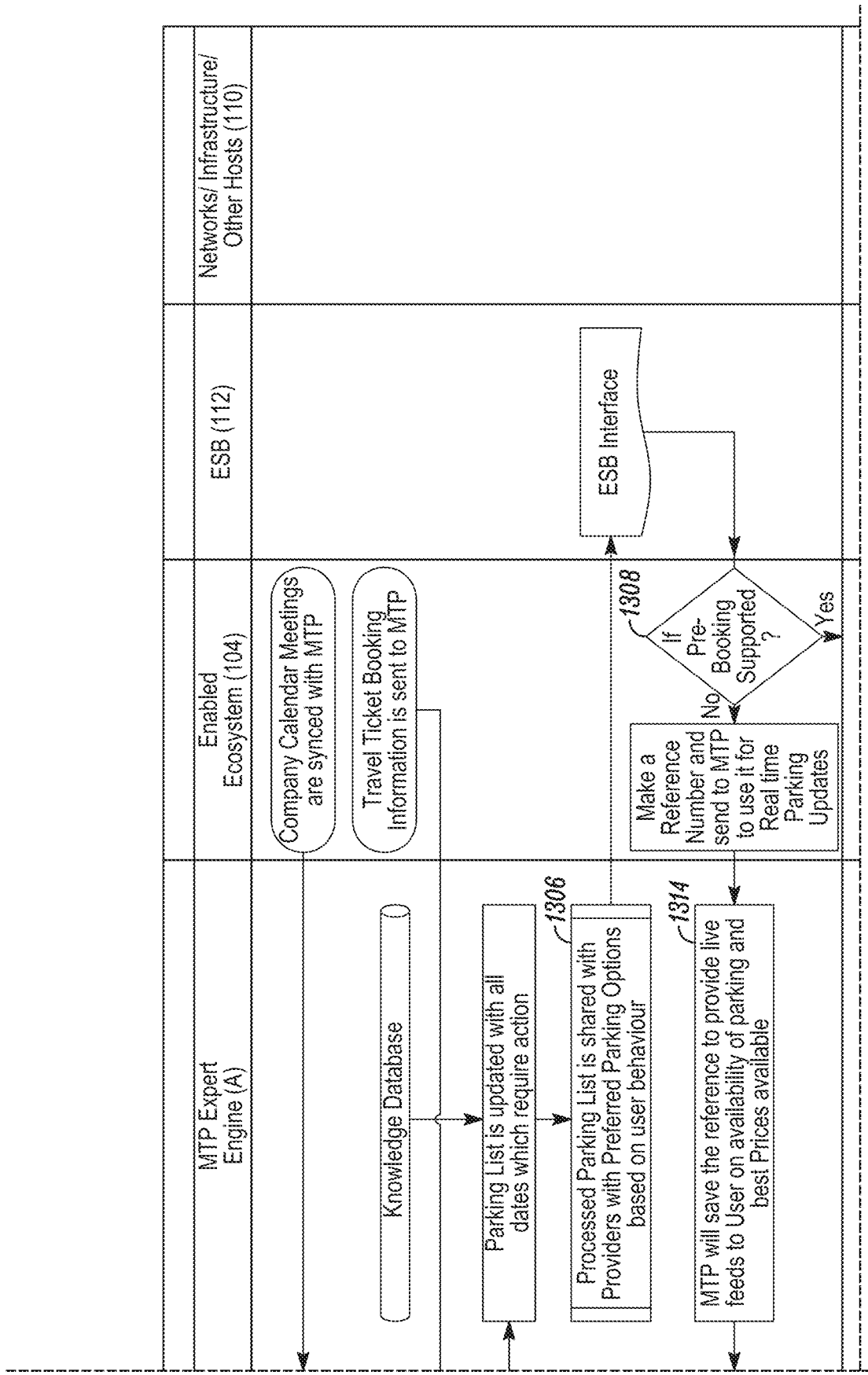
Figure 19C:
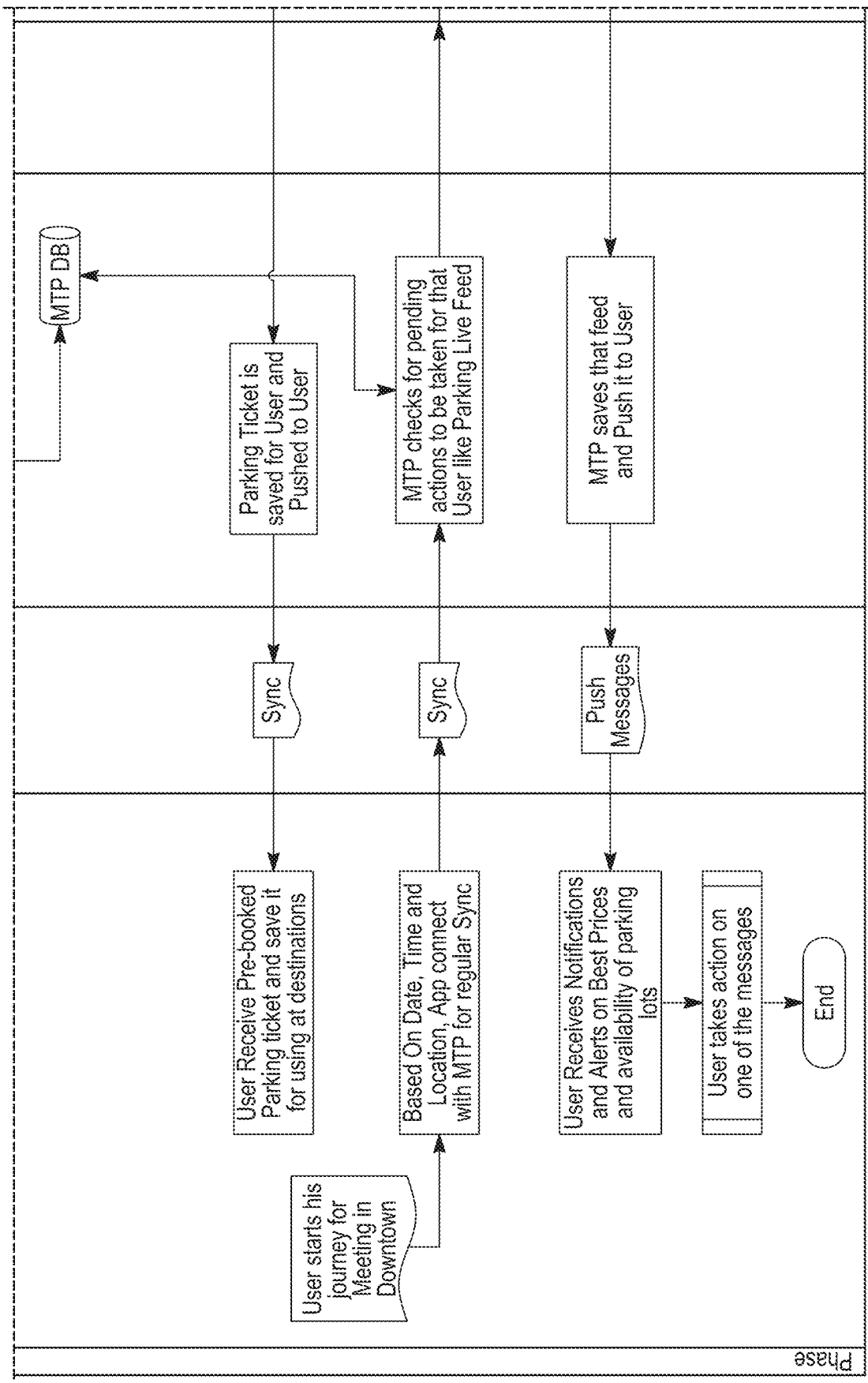
Figure 19D:
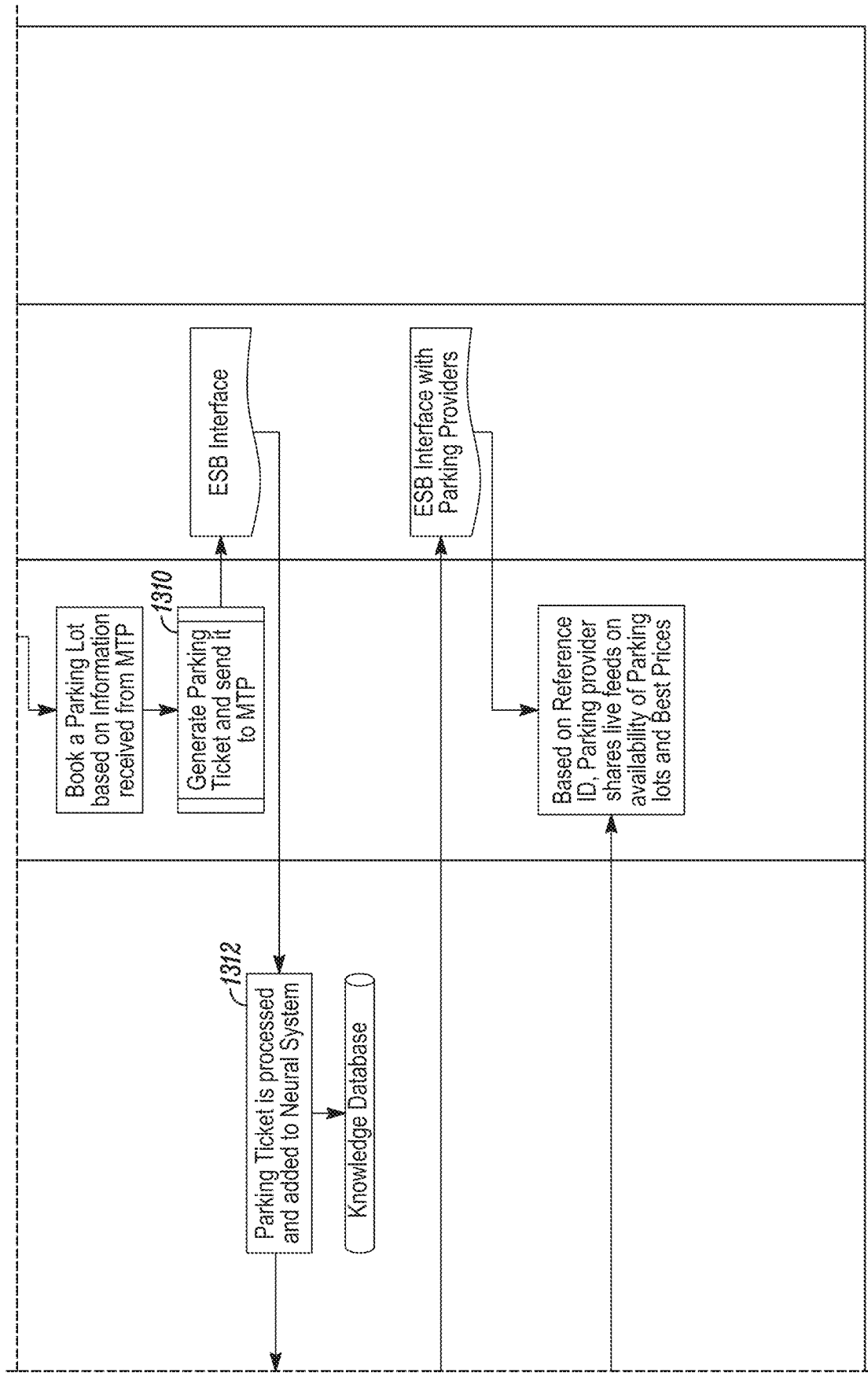

FIG. 19 depicts an example embodiment of a method for facilitating parking arrangements for the user in response to a life occurrence. At step 1902, the method may include identifying a location at which the user may be interested for discovering a parking space. The user may add appointment related information in the calendar of the lifestyle container. The lifestyle container may be configured to detect the timing and location from the calendar application so that the parking arrangement may be made for the user. The lifestyle container may determine the timing and location information from the travel bookings that may have been done by the user. FIG. 19 illustrates an example embodiment in which the life occurrence management platform may identify the timing and location required for making the parking arrangements from the calendar application. As depicted, the calendar available at the lifestyle container is synchronized with the cloud calendar available at the MTP 102. The cloud calendar available at the MTP 102 may also include information from the company calendar and the travel booking related information received from the enabled ecosystem.

At step 1904, the MTP 102 may share the cloud calendar with the MTP expert engine 104 so that the MTP expert engine 104 may process it to generate a parking list. The MTP expert engine 104 may be configured to determine user behavior that may be available in the knowledge database accessible to the MTP expert engine 104. The knowledge database may be the multi-dimensional database 114 as explained earlier in the description. The MTP expert engine 104 may determine usual preferences for parking such as vehicular based parking, parking prices and the like from the user behavior.

At step 1908, the MTP expert engine 104 may share the processed parking list with the parking providers through the enterprise service bus. At step 1910, a determination is made as to whether the parking providers support the pre-booking. At step 1912, a parking ticket may be generated when parking provider supports the pre-booking and the parking provider may transmit the parking ticket to the MTP expert engine 104. At step 1914, the MTP expert engine 104 may process the parking ticket with the fuzzy logic or neural network so as to update the user behavior in the knowledge database. Subsequently, the MTP expert engine 104 may transmit the parking ticket to MTP 102 that may push the parking ticket to the user.

Otherwise, at step 1918, the parking providers may generate a reference number when the parking providers may not provide a pre-booking. The reference number may be forwarded to the MTP expert engine 104 that may save the reference to provide live feed to the user on availability of parking and best available prices. The MTP 102 may send the reference id to the enabled ecosystem when the user has started journey and may not have the pre-booked ticket. The live feed may be pushed to the user device and the user may take action on these live feeds depending on the requirement.

As described more fully below, a system comprises a mobile transaction platform (MTP) in communication with a plurality of service providers and one or more containers operating on a mobile device. The MTP is configured to facilitate mobile transactions between the one or more containers and the plurality of service providers and to derive analytic data from the mobile transactions. The one or more containers may include a lifestyle container as described in further detail later herein. An expert engine is in communication with a plurality of sources of third party user data and the MTP and is configured to consolidate the analytic data and the plurality of sources of third party user data to create a multidimensional context for determining life occurrences and resolution paths for resolving aspects of a life occurrence.

The resulting system 100 enables a user experience through the mobile device by relying on a lifestyle container 408 that facilitates presenting notifications of triggered life occurrences derived from a robust multidimensional context with associated consolidated resolution actions. Such resolution actions may include, for example, at least one secure mobile transaction and collectively serve to guide a user through a series of choices to resolve the triggered occurrence. In this way, a triggered life occurrence event may drive the transactions that determine the user experience. As described more fully below, the MTP 102 aggregates disparate domains and attends to the complexities of secure transactions comprising components of the resolution actions. The expert engine consolidates numerous sources of analytics to create and maintain the multidimensional user specific context that drives the derivation of the life occurrence-related triggers.

Figure 20:
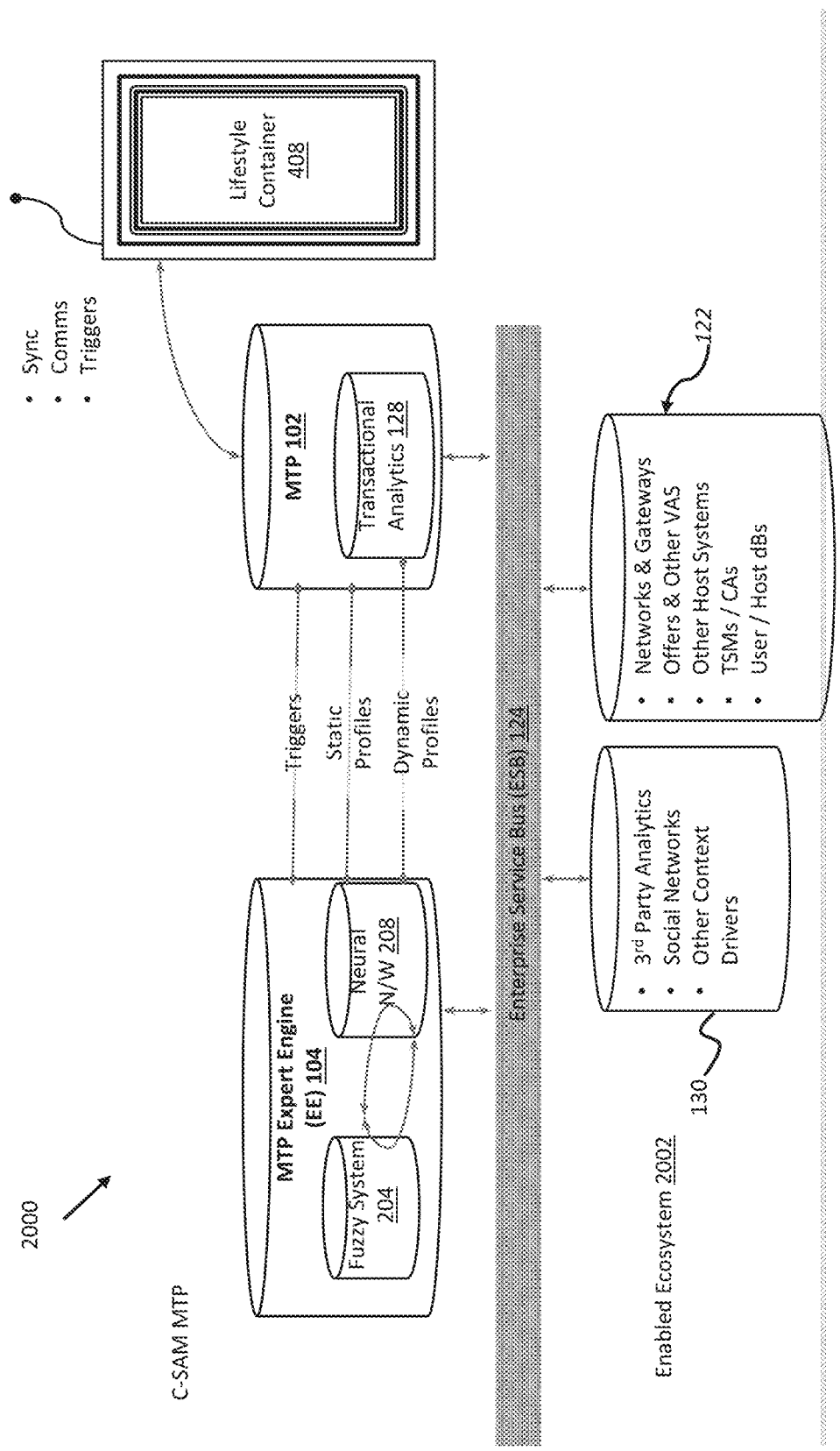
FIG. 20 depicts a block diagram of an embodiment of a life occurrence determination and service system.

With reference to FIG. 20, there is illustrated a system 2000 according to an exemplary and non-limiting embodiment. The Mobile Transaction Platform (MTP) 102 as discussed in conjunction with various figures already operates, generally, to facilitate communication between the external entities 122 and the lifestyle container 408. Examples of the external entities 122 include, but are not limited to networks and gateways, offers and value added services (VAS), other host systems, Trust Service Managers (TSMs) and Certificate Authorities (CAs), user/host databases, and the like. In accordance with an exemplary and non-limiting embodiment, the MTP 102 communicates with the external entities 104 via the enterprise service bus (ESB) 124. While the MTP 102 operates to facilitate mobile transactions between the external entities 122 and the lifestyle container 408, it facilitates passing data between the external entities 122 and the lifestyle container 408 without substantively altering their content. However, the MTP 102 does acquire and collect for storage in, for example, the transactional analytics database 128, information and metadata related to various attributes of the transactions enabled by the MTP 102. For example, the MTP 102 may store in the transactional analytics database 128 information related to transaction times, transaction amounts, service provider identifiers, life occurrence-related trigger, user action(s) to effect the transaction, and the like.

In communication with the MTP 102, the expert engine 104 operates to consolidate various transactional analytics received from the MTP 102 with one or more of the third party sources 130 to create a multidimensional context that is suitable for determining life occurrences, developing and maintaining occurrence action triggers, generating resolution paths that resolve an aspect of a life occurrence via uses of the mobile device, and the like. Examples of the third party sources 130 include, but are not limited to, third party analytics, social networks and various other context drivers examples of which are described more fully below. In accordance with an exemplary and non-limiting embodiment, the expert engine 108 communicates with the third party sources 130 via the ESB 124. As described more fully below, the expert engine 104 may employ a feedback system operating between, for example, a fuzzy system 204 or rules engine and a neural network 208. In operation, the expert engine 104 may employ one or more algorithms to consolidate various transactional analytics from the MTP 102 with data from the third party sources 130 to produce a multidimensional context from which triggers may be produced. Such algorithms may further order and prioritize the display of life occurrence-related alerts to a user of the mobile device.

As described more fully below, the expert engine 104 makes use of various context drivers to create the multidimensional context including past transactions, learning from preferences of a user, the presence of a network or a particular account, the presence of vouchers and promotions, loyalty points and the like.

In some embodiments, the multidimensional context may comprise at least one of user or life occurrence location information. For example, the current location of the user or the life occurrences may be determined using any location determination technologies such as global positioning system (GPS) and the like. The multidimensional context may comprise at least one of time of life occurrence and current time.

The data derived from the transactional analytics database 128 may be incorporated into a static user profile and a dynamic profile of the user for use by the MTP expert engine 104. In some embodiments, the transaction data may be analyzed by the MTP 102 in context of other users, similar or interested vendors, etc. to establish some sort of weighting, importance, etc. This analysis may result in determination of a new trigger, action, or occurrence. The transactional analytics database 128 and the MTP expert engine 104 may exchange resolution triggers, static user profiles, and dynamic user profiles. The static user profiles may be used in conjunction with current context data such as time, space, and user input for the MTP expert engine 104 in order to determine life occurrences.

Figure 21:
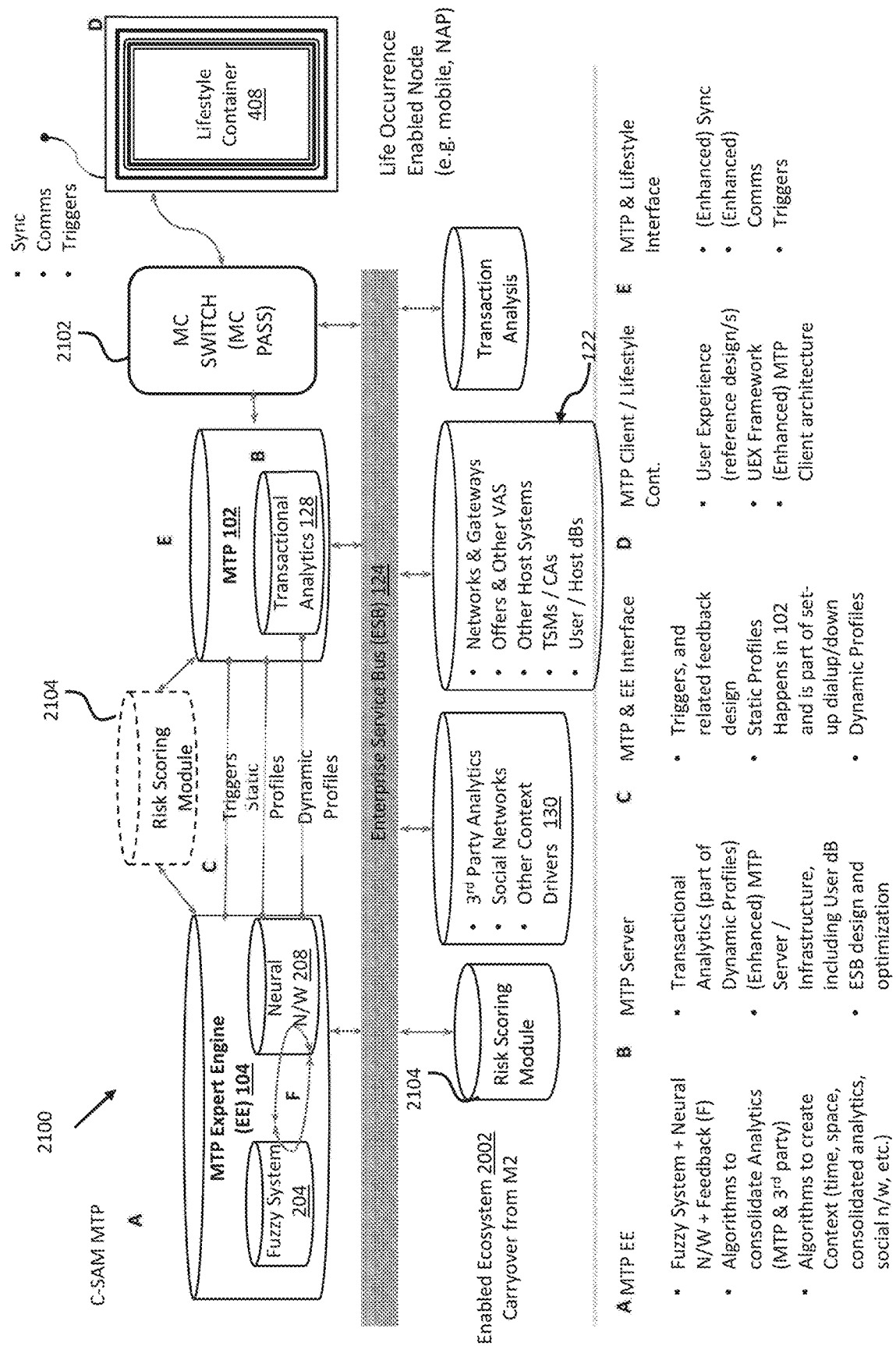
FIG. 21 depicts a block diagram of an embodiment of a life occurrence determination and service system with risk scoring.

With reference to FIG. 21, there is illustrated a system 2100 according to an exemplary and non-limiting embodiment. The Mobile Transaction Platform (MTP) 102 operates, generally, to facilitate communication between the external entities 122 and the lifestyle container 408. In accordance with an exemplary and non-limiting embodiment, the MTP 102 communicates with the external entities 122 via the enterprise service bus (ESB) 124. Among other elements and components, the system 2100 may include a switch 2102. The switch 14A02 may facilitate access to the ecosystem resources such as third party analytics, social networks, context drivers and at least one of networks and gateways, offers and value added services, host systems, trusted service managers (TSM), certificate authorities (CA), and databases for the MTP expert engine 104 and the transactional analytics facility 128. The switch 2102 may be configured to access transactional components in the ecosystem for facilitating financial transactions through for example prepaid cards among users, service providers, billing agents, and financial services agents and the like. For example, the switch 2102 may be communicatively connected with the transactional analytics 128 for facilitating such transactions among various entities to provide a user-centric experience. The switch 2102 may be accessible through the lifestyle container 408 deployable on a node such as a mobile device and the like.

The system 2100 may further include a risk scoring module 2104 that generates a risk score that may be utilized as a context and decision driver to determine if one or more resolution actions are suitable for presenting to a user. The risk based decisioning is an expert process and could be carried out at either the level of expert engine 108 or at the level of enterprise service bus 124. In accordance with the illustrated embodiment, the risk scoring module 2104 may operate in association with the transactional analytics facility 128 for analyzing user transactions associated with the mobile transaction platform 102 and third-party sources of user-related data to generate a risk profile of users, trigger-events, third-parties, resolution actions, life occurrences, potential transactions, and the like based on multidimensional live occurrence context. In an example, the risk profile may be used to determine if one or more resolution actions are suitable for presenting to a user. In an example, the risk profile is useful to rank resolution actions. Based on risk calculations by the risk scoring module 2104, the expert engine 104 may determine life occurrences and suggest resolutions based on multidimensional context derived from analysis of associated risks in connection with third party sources and the like. In an example, the risk scoring module 2104 may facilitate maximize checkout conversion rates and decrease fraud on transactions through use of a risk based authentication system and dynamic multi-factor authentication methods. A user may be able to choose if he wishes what type of Checkout he may want to use during Account Management. The system may re-use existing functionality for merchants to opt into advanced checkout (Direct and BMU) and onboard 3DS information. As part of account management, merchants may be able to opt in to different levels of authentication. In an example, the system 2100 may assign a confidence interval to indicate if account owner is likely a fraudster or a legitimate customer and normalize it as a generic value for the RBD.

In accordance with exemplary and non-limiting embodiments, the expert engine 104 may utilize risk as a context driver when generating triggers and attendant resolution actions. For example, as the MTP 102 executes one or more transactions in response to a user's inputs in response to an alert of a trigger, the MTP 102 may dynamically identify one or more attributes of the transactions as amounting to an unacceptable risk. In response, the MTP 102 may alert the user to, for example, chose a different mode of payment or another vendor. For example, a user may be provided multiple payment options for proceeding with the mobile transaction. The user may further have defined a default credit card for mobile transactions that may be selected in the event that no other form of payment is selected and/or if a chosen form of payment is not acceptable. In this way, the MTP, in cooperation with the lifestyle container 408 and/or other MTP resources on the mobile device, may automatically switch forms of payment and/or vendors in response to detection of an unacceptable level of risk based on the risk score generated by risk scoring module 2104. A non-limiting example of risk management, the user may buy neckties and the expert engine 104 may identify matching cufflinks and suggest to the user to purchase the matching cufflinks at an identified vendor with the vendor's issued credit card. The user agrees and the lifestyle container 408 is updated to facilitate presenting a consolidated view of the transaction. However, the expert engine 104 determines that an aspect of risk of this transaction is unacceptable (e.g. payment terms of the vendor's credit card are onerous) and suggests to the user the choice of using a different credit card that is accessible in the user's mobile wallet via the mobile device instead of the store card, even though the user will lose out on some vendor-specific loyalty points.

Figure 22:
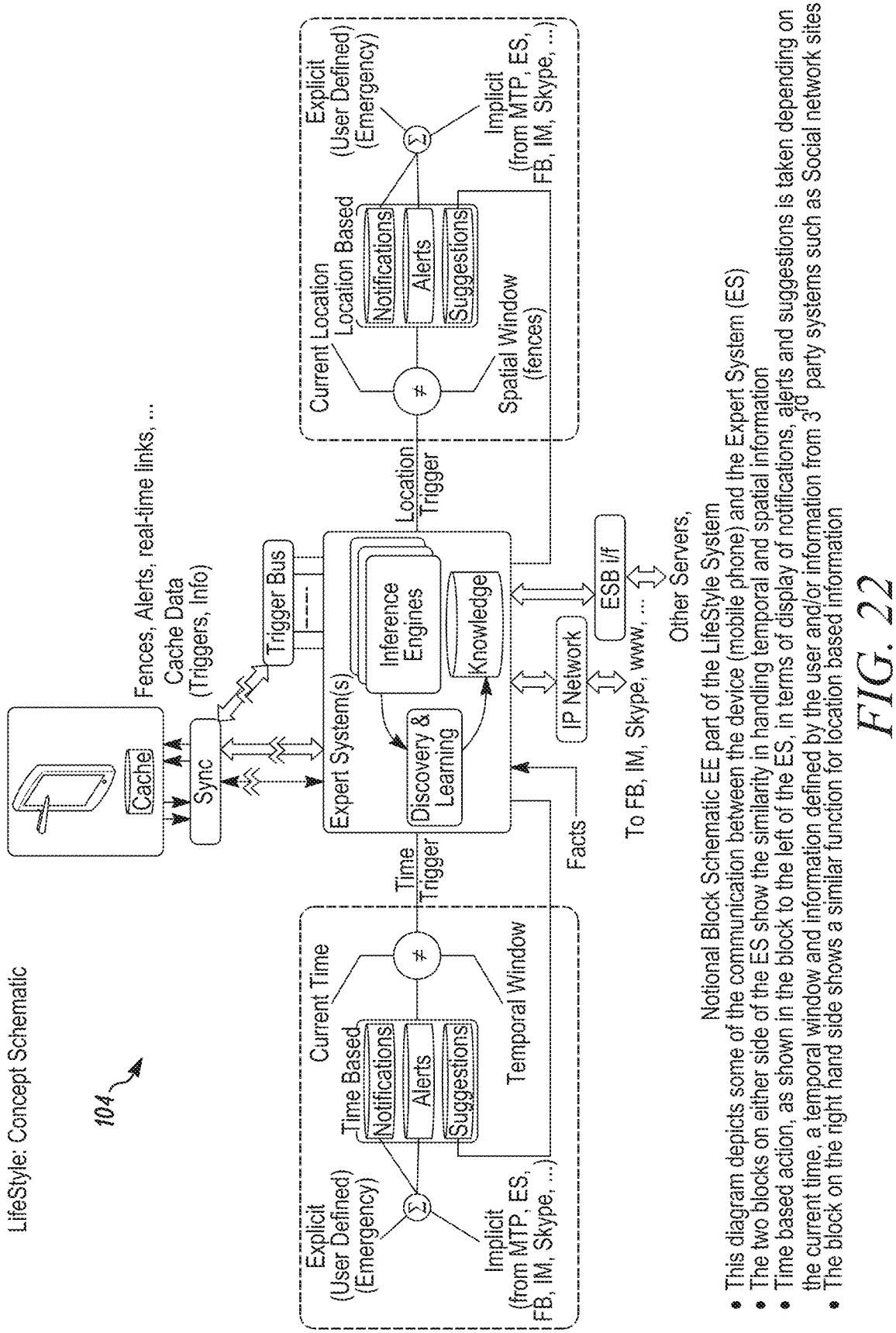
FIG. 22 depicts a functional and flow diagram of communications among functional blocks of a life occurrence determination and service system.

With reference to FIG. 22, there is illustrated a schematic diagram of the operation of the expert engine 104 according to an exemplary and non-limiting embodiment. As illustrated, it is evident the similarity in the manner in which the expert engine 104 handles temporal and spatial context drivers/data. With regard to time based actions, illustrated in the block to the left of the expert engine 104, actions including the display of notifications, alerts, suggestions and the like are taken based, at least on part on the current time, a temporal window and information defined by the user and/or information from third party systems such as, for example, social network sites. As illustrated in the bock to the right of the expert engine 104, location based information is treated in much the same manner. Alternatively, the expert engine 108 may handle temporal and spatial context drivers/data dissimilarly.

In general, the mobile transaction platform 102 may receive user data from a source, such as the external entity 122, and such as via the ESB 124. The MTP 102 may then transmit the user data to a user such as a user operating a mobile device executing the lifestyle container 408. Next, the MTP 102 may derive a plurality of transactional analytics data from the transmitted user data which it may then transmit to the expert engine 104 which may be configured to consolidate the plurality of transactional analytics data with at least one third party source of user data. As described more fully below, the MTP 102 may receive from the expert engine 104 one or more triggers derived from the multidimensional context wherein each trigger is triggered based on an occurrence for which one or more resolution actions are provided to the user of the lifestyle container 408 enabled mobile device.

An expert engine, such as the expert engine 104 depicted herein may be based on a variety of known technologies including several technologies co-owned by the applicants hereof. In U.S. patent application Ser. No. 10/284,676 filed Oct. 31, 2002 that is incorporated herein by reference in its entirety, an expert system in context of a transaction environment is described. This expert system performs data consolidation from a variety of sources including direct client input, service institutions, merchants, vendors, government agencies, client profile, transaction records analysis, rules/flags, and the like for providing to a knowledge based system that effects services to clients. Services include among other things, matching services to connect users with providers of services/products based on the user's request/interests (implicit and explicit), personal data, account data, and transaction data; suggesting a transaction based on user personal, account, and transaction data and a database of vendor/service provider information; and confidentially "negotiating" an offer on behalf of the user by revealing some confidential information related to the specific negotiation objective (e.g. frequent flyer miles/points details, size of household, etc.).

Another expert system embodiment is described in U.S. patent application Ser. No. 11/539,024 filed Oct. 5, 2006, that is incorporated herein by reference in its entirety, an expert system in context to a transaction environment for secure mobile transactions is described. This expert system facilitates customizing the user interface experience and determining user preferences by operating over time using the "user's behavior, usage patterns, transaction history and qualified external inputs", particularly as depicted in FIG. 47; includes a learning engine that may learn which services a user tends to use and push data to the mobile device to improve delivery of those services; rules-based operation to handle prioritizing data flow and transactions based on payment due date, payment "importance", etc., managing application throughput to improve user's access to data, and the like.

Yet another expert system embodiment is described in U.S. patent application Ser. No. 13/651,028 filed Oct. 12, 2012, that is incorporated herein by reference in its entirety, an expert system in context of a mobile transaction platform for secure personalized transactions is described. This expert system facilitates delivering a simplified user experience, customization of service and personalization elements, analyzing user habits; automatically adjusting the platform features to present itself in the manner most suitable to individual users including regional preferences ("most French like it this way while the Americans like it that way"), mobile device capabilities (screen size, keyboard available or only on-screen, and the like), and differences in client base (low-end versus luxury customers); carrying out analytics on the transactions, usage patterns, and other parameters that will help the 'learning' process of an inference engine, and the like.

Any of these expert systems may be capable of performing at least portions of the methods and systems of life occurrence determination and resolution path generation as described herein. An expert system of U.S. patent application Ser. No. 10/284,676 may, among other things, facilitate data consolidation from a plurality of data sources including mobile transactions performed in association with a transaction platform of the expert system. An expert system of U.S. patent application Ser. No. 11/539,024 filed Oct. 5, 2006 may, among other things, facilitate generating aspects of a multidimensional context that is suitable for life occurrence determination based at least in part on analysis over time of a user's behavior, usage patterns, transaction history and the like. An expert system of U.S. patent application Ser. No. 13/651,028 filed Oct. 12, 2012 may, among other things, provide context for a simplified and improved user experience, such as by analyzing user habits, carrying out analytics on transactions, and automatically adjusting service delivery-related features of an MTP so that the user perceives an output of an inference engine in a manner most suitable for an individual user.

In an example, the multidimensional context may include at least one of user or life occurrence location information. In an example, the multidimensional context may include at least one of time of life occurrence and current time. The multidimensional context derived from user transactions may be used by the MTP 102 to determine life occurrences and for generating resolutions paths. In an example, the MTP expert engine 104 may use the multidimensional context derived from the user transactions handled through the MTP 102 to generate action trigger-events for resolving life occurrences by facilitating user directed mobile actions.

As depicted, the MTP 102 may utilize automated algorithms, learning and knowledge systems, discovery systems, inference engines for enabling intelligent solutions through the expert engine 104 in determining life occurrences and determining available resolution paths. Further, these systems may facilitate in developing a customer-centric or user-centric experience by utilizing user transactions data and recognizing user context through such as rules based systems, fuzzy systems, neural network and the like. These intelligent systems may facilitate an interactive and collaborative communication between the temporal window and the spatial window enabled through the expert engine 104 of the MTP 102.

The expert engine 104 may determine a type of life occurrence of an individual among a set of possible life occurrences based on a multidimensional data set, and may generate a resolution path for resolving aspects of the occurrence via uses of a life occurrence node (e.g. the individual's mobile device). The resolution path may be based on an overall context of the individual that includes the point in time at which the determination is made, data from a mobile transaction platform (MTP) through which the individual conducts mobile transactions, data from a third party source relating to the individual, and location data for the individual at the point in time. The location data and the temporal data may be coordinated through the temporal window and the spatial window by the expert engine 104 for determination of the life occurrence and determination of the available resolution paths.

Figure 23:
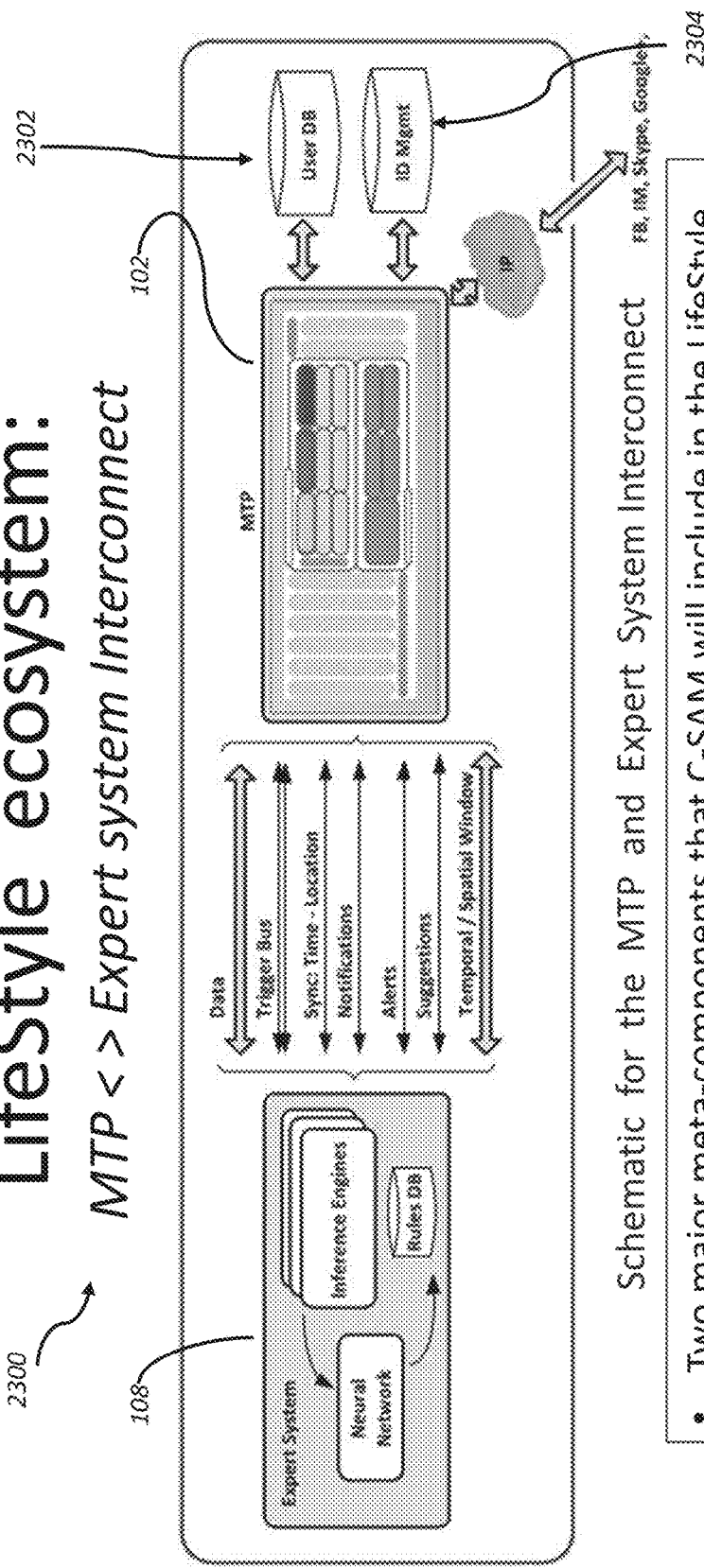
FIG. 23 depicts a flow diagram of MTP to expert engine communications.

With reference to FIG. 23 there is illustrated an interconnection of the expert engine 104 with the MTP 102. The expert engine 108 communicates a variety of types data and performs a range of functions with the MTP 102. Data types include data, notification, alerts, suggestions, time, location, and the like. Functions include trigger bus exchange, synchronization, reconciling temporal/spatial windows for contextual consistency.

With reference to FIG. 23, there is illustrated the exchange of information between the expert engine 108 and the MTP 102 according to an exemplary and non-limiting embodiment. As illustrated, various forms of data are exchanged between the expert engine 104 and the MTP 102 including, but not limited to, trigger bus data, sync data, notifications, alerts, suggestions, temporal data, and the like.

In accordance with the description above, various exemplary and non-limiting embodiments enable an intuitive and seamless user experience wherein applications drive potential transactions. While the system 2300 is a general purpose architecture that may be adapted to any scenario, domain, transaction category or the like, various vertical application spaces are enabled including, not limited to, finance, retail, health care and government services. The system 2300 further enables the incorporation and seamless integration of a plurality of payment channels including, but not limited to, NFC, bar/QR codes, cloud, online and offline payment channels. The expert engine 108 utilizes proactive intelligence in the form of user inputs, host rules, behavioral analytics and the like. As described above, the expert engine 104 incorporates various context drivers including, but not limited to time and location drivers to produce, for example, push notifications/alerts in the form of triggered occurrences.

In accordance with exemplary and non-limiting embodiments, the user experience as realized via, for example, a graphical user interface (GUI) of the lifestyle container 408 might be customized. For example default display of either an alert centric or a notification centric perspective may be customized, whether or not a panel in which an action is presented to the user is opened or merely executed when the user selects the action, and the like.

In an example, the MTP 102 and the expert engine 104 may synchronously communicate and exchange information such as data, triggers, time-location information, notifications, alerts, suggestions, temporal or spatial window-based information and the like. As already discussed above in conjunction with various figures, the expert engine 102 may implement intelligent learning solutions through use of such as fuzzy logic, neural networks, inference engines or systems and the like. The MTP 102 may also associate information related to users such as by maintaining a user database 2302 that may incorporate user transaction related details also. The MTP 102 may be communicatively linked with an ID management system 2304.

Figure 24:
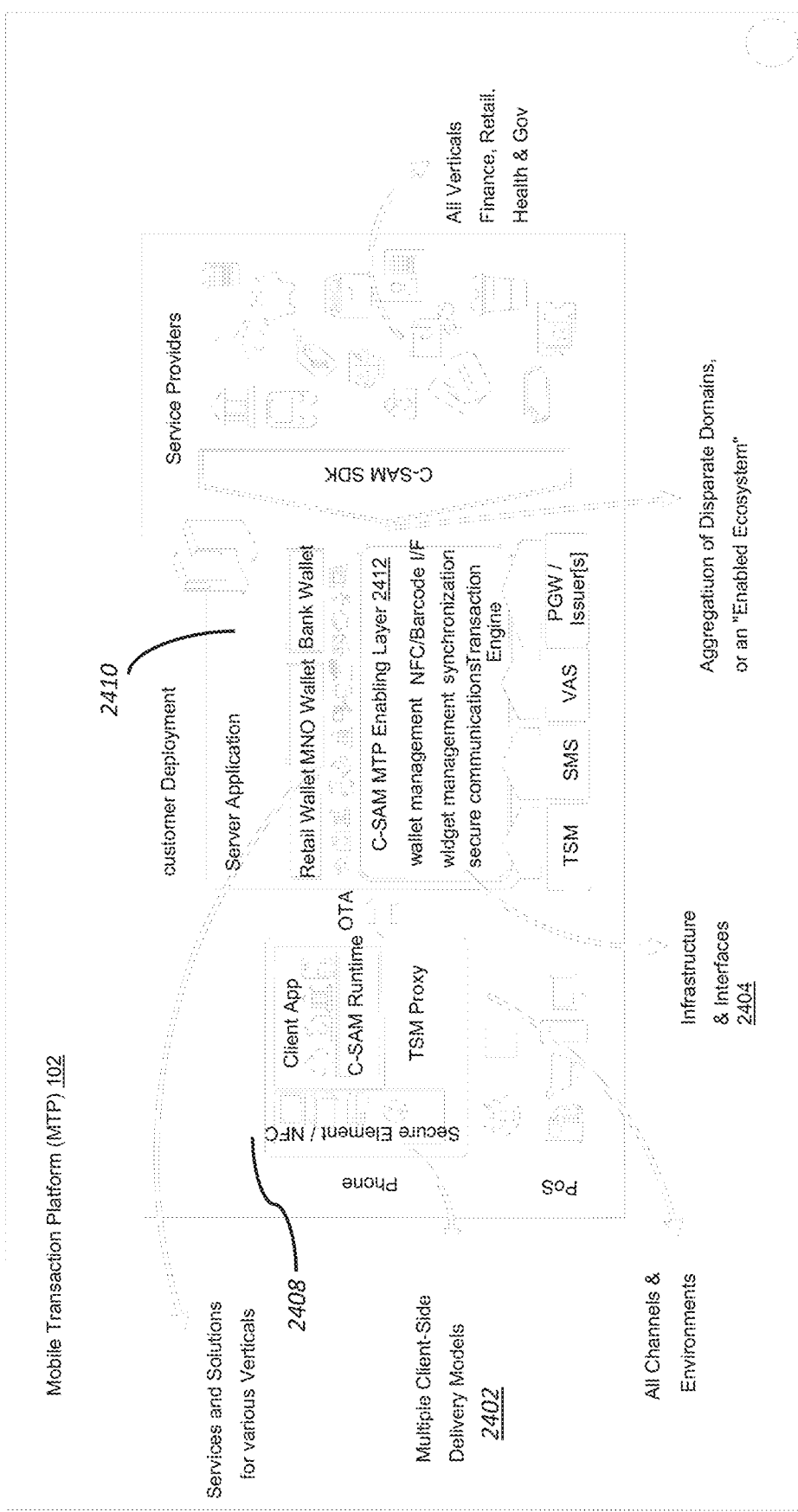
FIG. 24 depicts a block diagram of an embodiment of a MTP for life occurrence determination and servicing.

Referring to FIG. 24, an enhanced mobile transaction platform (MTP) 102 is depicted that provides services and solutions for a variety of environments using multiple client-side delivery models 2402 over all payment and transaction channels and environments. A client app 2406 provided on the phone seamlessly interfaces with a server application 2408 to enable transactions across a range of service providers and point of sale (POS) instruments. The enhanced MTP 102 includes robust infrastructure and interface 2404 to and through the mobile device resources while facilitating an aggregation of disparate domains including retail, finance, health, government, business, and other service providers. The client app 1706 residing on the phone interacts with an MTP enabling layer 2410 to interface with the service providers and point of sale (POS) instruments. The enabling layer 2410 of the MTP 102 may comprise wallet management applications, NFC channels, barcode systems and applications, widget management applications, and secure communication and transaction engine.

Referring to FIG. 25, the methods and systems of mobile lifestyle and life occurrence handling may be based on a set of guiding principles that deliver minimal intrusions on the user while maximizing usability of a mobile-enabled ecosystem for secure personalized transactions. The principles ensure that a user centric experience provides seamless interfacing of applications that drive transactions across verticals, payment channels, and input sources. The guiding principles also ensure that the user's experience is balanced among key aspects such as tokens 2502 (e.g. cards, receipts, coupons, etc.), alerts 2504 (for keeping the user on track), and notifications 2506 that address what a user wants to do rather than what the user has to do. In addition, a mobile lifestyle and life occurrence handling environment based on such guiding principles may include a context that is driven by time and location; provides specific instructions and exceptions (e.g. through push notifications and alerts), and frames the experience in the form of suggestions and recommendations that are closely coupled to life occurrences of or related to the user.

In accordance with the description above, various exemplary and non-limiting embodiments enable an intuitive and seamless user experience wherein applications drive potential transactions. While the system 100 is a general purpose architecture that may be adapted to any scenario, domain, transaction category or the like, various vertical application spaces are enabled including, not limited to, finance, retail, health care and government services. The system 100 further enables the incorporation and seamless integration of a plurality of payment channels including, but not limited to, NFC, bar/QR codes, cloud, online and offline payment channels. The expert engine utilizes proactive intelligence in the form of user inputs, host rules, behavioral analytics and the like. As described above, the expert engine 104 incorporates various context drivers including, but not limited to time and location drivers to produce, for example, push notifications/alerts in the form of triggered occurrences.

Figure 26:
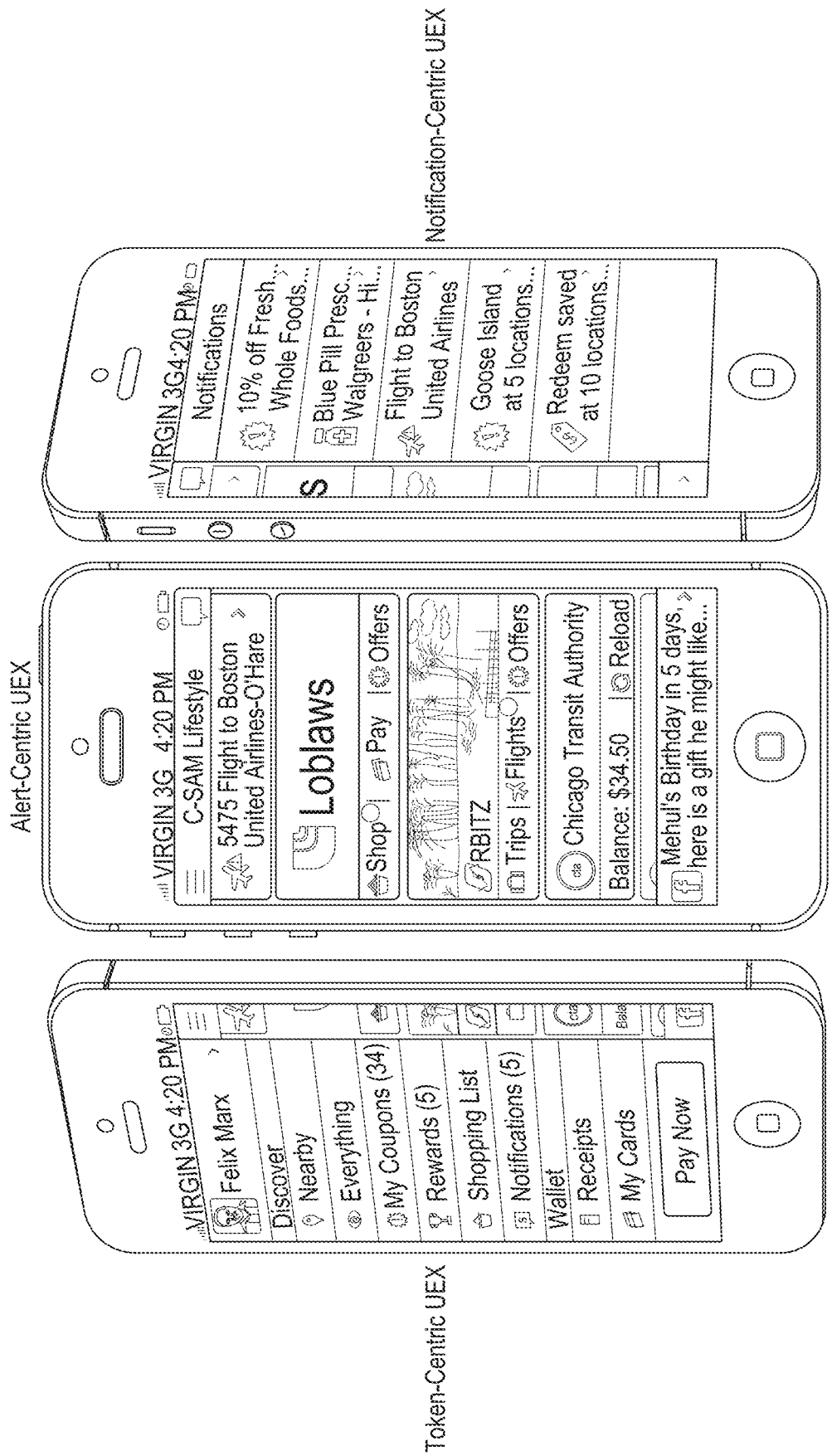
FIG. 26 depicts three views of a life occurrence determination and handling user interface.

The user experience as realized via, for example, a graphical user interface (GUI) of the lifestyle container might be customized. For example default display of either an alert centric or a notification centric perspective may be customized, whether or not a panel in which an action is presented to the user is opened or merely executed when the user selects the action, and the like. With reference to FIG. 26, there is illustrated an exemplary and non-limiting embodiment of a token centric user interface 2600, an alert centric user interface, and a notification centric user interface. A user may shift between these three different modes to view context-generated information in customizable fashion.

Figure 27:
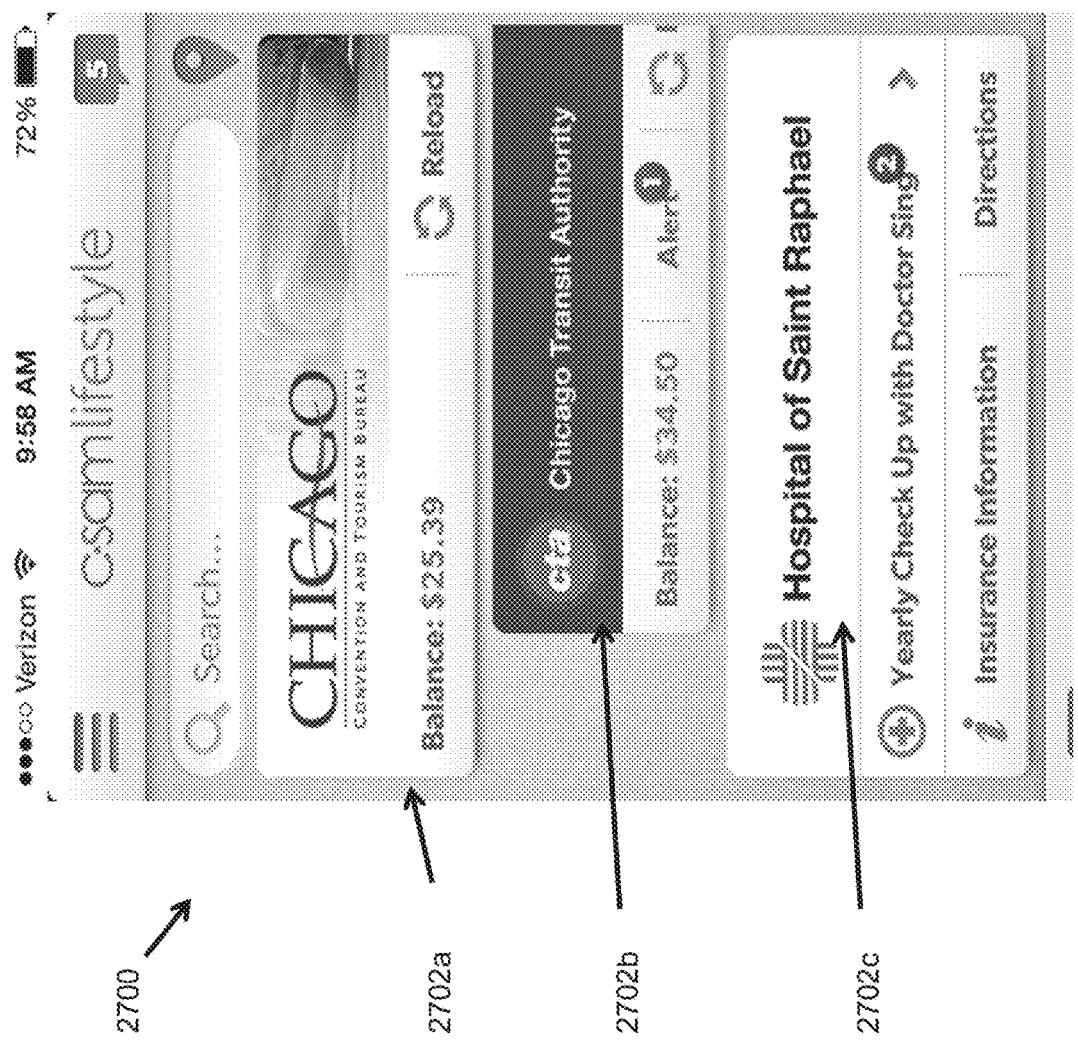
FIGS. 27 through 40 depict various user interfaces for facilitating interactions of a user with the lifestyle system through a life occurrence node, in accordance with various embodiments of the present invention.

FIG. 27 depicts an embodiment of a lifestyle user interface (UI) 2700 that is also referred to herein as an activity feed or screen for facilitating interactions of a user with the life occurrence handling methods and systems described herein. The lifestyle user interface 2700 may be presented on a display of a life occurrence node, such as a mobile phone.

The user interface 2700 comprises a plurality of moving panels 2702 that utilize the portion of the life occurrence node display that is allocated to the activity feed to provide timely, contextual updates and life occurrence-related information to a user. An activity feed may present life occurrences, trigger-events, offers, resolution actions, alerts, and the like related to life occurrences as may be determined by an MTP expert engine as described herein. Any of the plurality of movable panels 2702 may dwell in a position for a while, move to another position, move out of view of the user, and the like based on a range of parameters associated with life occurrences, such as those parameters found in a multi-dimensional database described herein. Panels with content that is considered to be more urgent or important may remain visible in the activity feed for a longer time than other panels. Important or urgent panels may be moved toward the top of the user interface to assist with emphasis for the user. Important or urgent panels may appear more frequently or may reappear sooner in the activity feed than panels with less important content. Panels may also be actionable by a user, such as by the user selecting the panel to reveal additional details, or other content relevant to the life occurrence associated with the panel.

In the illustrated example, the activity screen 2700 displays a moving panel 2702a related to a prepaid account/card for Chicago Convention and Tourism. The moving panel 2702a further shows the account balance amount and Chicago Convention and Tourism bureau branding along with user actionable options to reload. This panel may be presented to the user based on user preferences and/or life occurrence-related multi-dimensional context that impacts when such an account should be presented for reload. In this case, the user may have opted to have the card reload action be presented for user acceptance rather than the MTP automatically executing transactions to effect a reload.

The activity screen 2700 further includes another moving panel 2702b that displays Chicago transit related information such as name of the transit authority, balance amount, a transit-related alert, and the like. In this example of the activity feed user interface 2700, the CTA panel is dynamically moving laterally off of the display. This may occur for a wide range of reasons including, without limitation, that a user has swiped away this panel; the panel may have been presented to the user for longer than a presentation threshold; the alert noted in the panel may have expired; and other such reasons.

Figure 35:
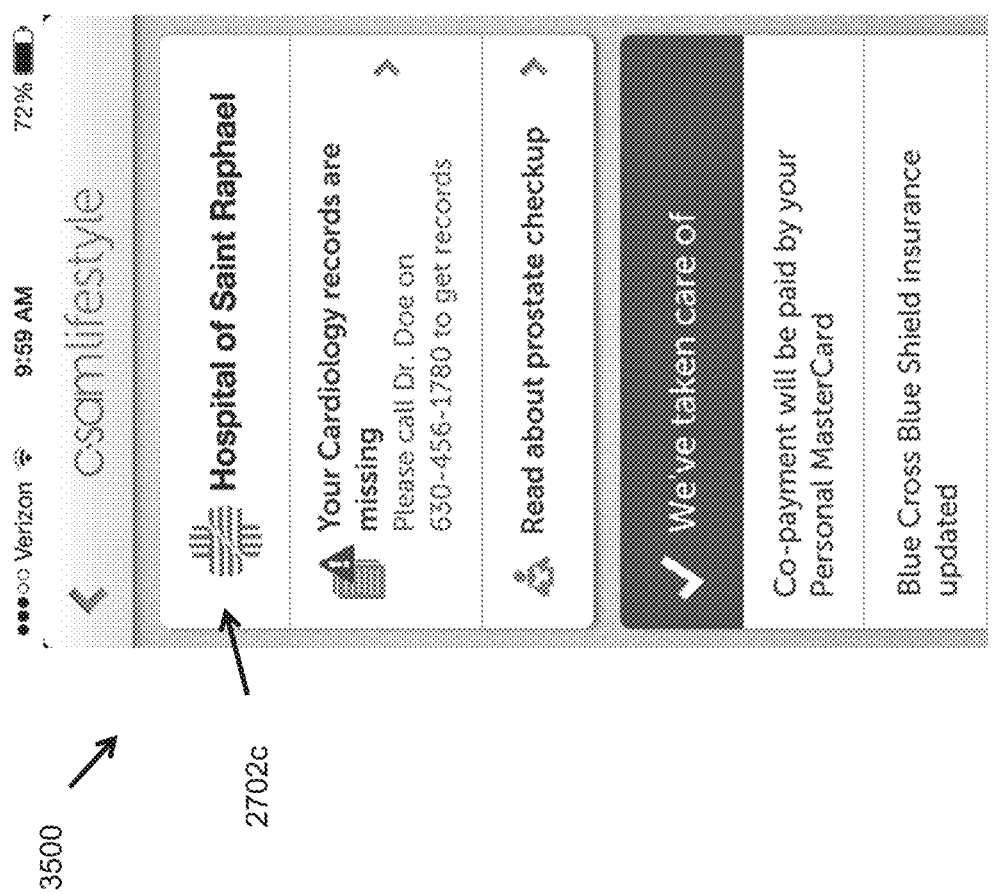
Figure 36:
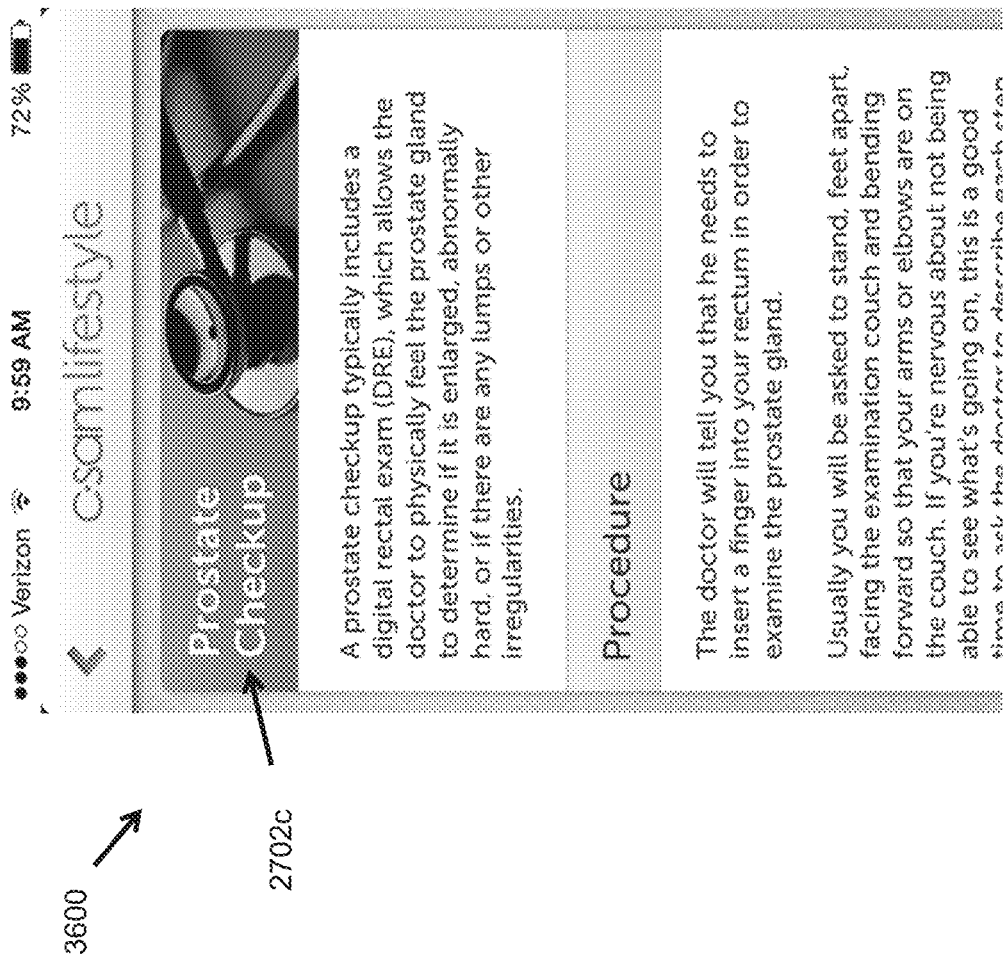

The activity screen 2700 further includes healthcare moving panel 2702c related to a hospital or other healthcare service provider. The healthcare moving panel 2702c displays information about a life occurrence that includes an upcoming appointment of the user with Dr. Sing who is associated with Hospital of Saint Raphael. The healthcare moving panel 2702c may include interactive features that allow the user to address aspects of this life occurrence. Through this panel, the user may retrieve more information about the appointment and associated hospital facilities. The healthcare moving panel may include features for accessing options such as appointment details, insurance information, travel directions to the appointment, and the like. The user may touch or click one of these options to present respective information in the user interface. FIGS. 35 and 36 include examples of these options.

Figure 28:

The moving panels 2702 can be moved relative to one another such as shown in FIG. 28. As depicted in FIG. 28, the healthcare moving panel 2702c has moved up at the top position unlike in the previous where the healthcare moving panel 2702c was placed at the bottom position. Likewise, a new moving panel 2702d related to a prepaid MasterCard has also been presented. In addition, corresponding activity screen 2800 now includes a new third moving panel 2702e related to Loblaws. A comparison of the FIG. 27 user interface 2700 and the FIG. 28 user interface 2800 depicts relative movement of the moving panels 2702 and appearance of new moving panels on a user interface and disappearing of some moving panels from the user interface. Panel movement and dwell time may be based on contextual or multidimensional information or other types of information retrieved by the MTP-Expert Engine from a plurality of data sources.

Figure 29:
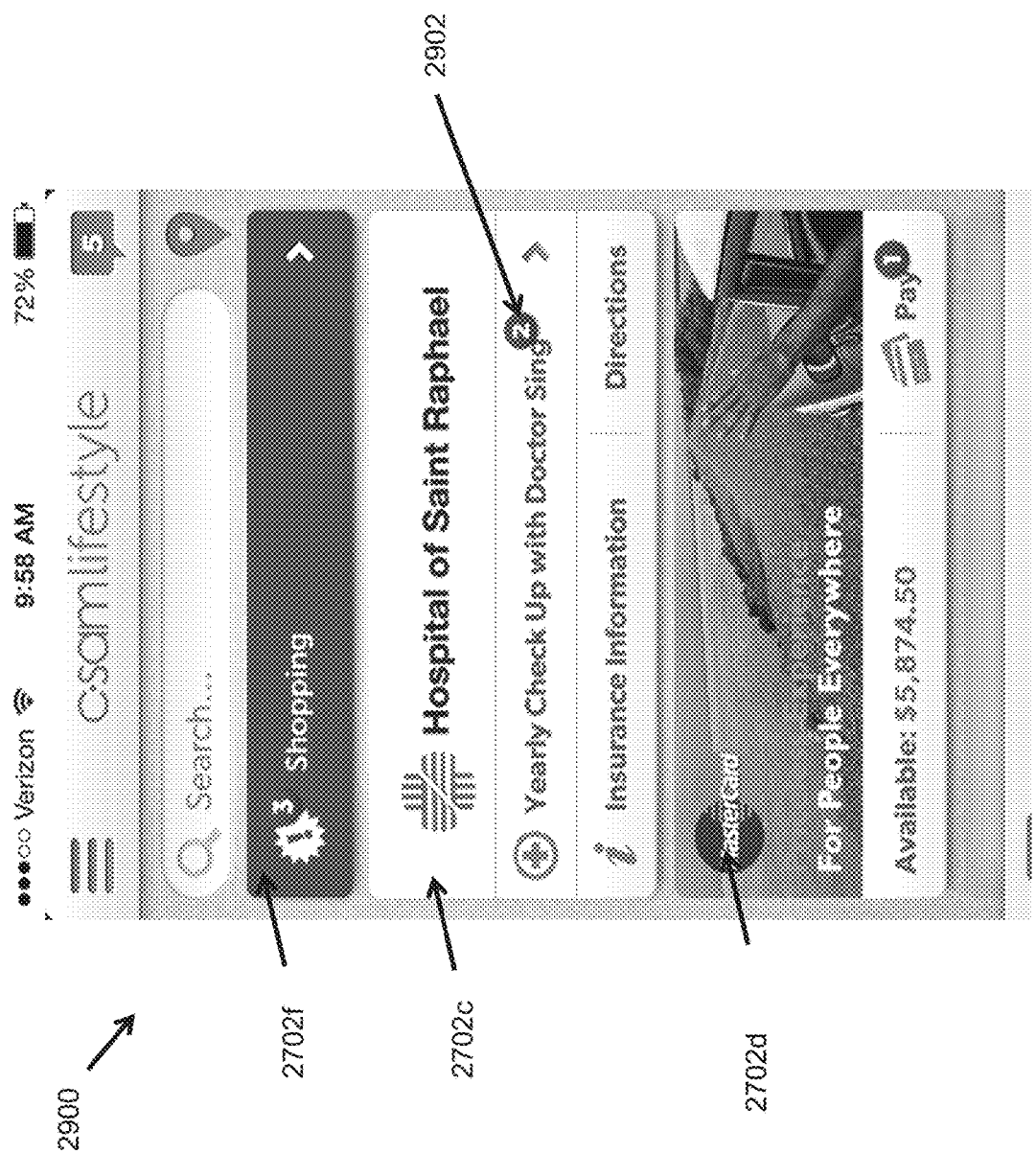

FIG. 29 depicts another user interface 2900 that shows a new moving shopping panel 2702f positioned on top of the activity screen or the 2900 causing other moving panels including the prepaid card moving panel 2702d and the healthcare moving panel 2702c to move down the activity screen 2900. The Loblaws moving panel 2702e no more exists on the user interface 2900 and is moved out. The 2900 may further show alerts 2902 related to various moving panels 2702. Alerts, that may be described elsewhere herein might be associated with a trigger action event of a life occurrence. The platform may configure one or more mobile transactions for executing with the MTP in response to a user taking some action in response to the alerts. The alerts may for example result as a consequence of the MTP-Expert Engine generating available resolution paths and configuring presentations to the user through such alerts for implementing a plurality resolution paths associated with a plurality of life occurrences. For example, as depicted, the shopping moving panel 2702f includes three such alerts that may be of interest to the user. If the user finds these alerts as non-relevant, he may just decline and skip them. Of course, the user is not required to take any action based on presentation of an alert.

Figure 30:
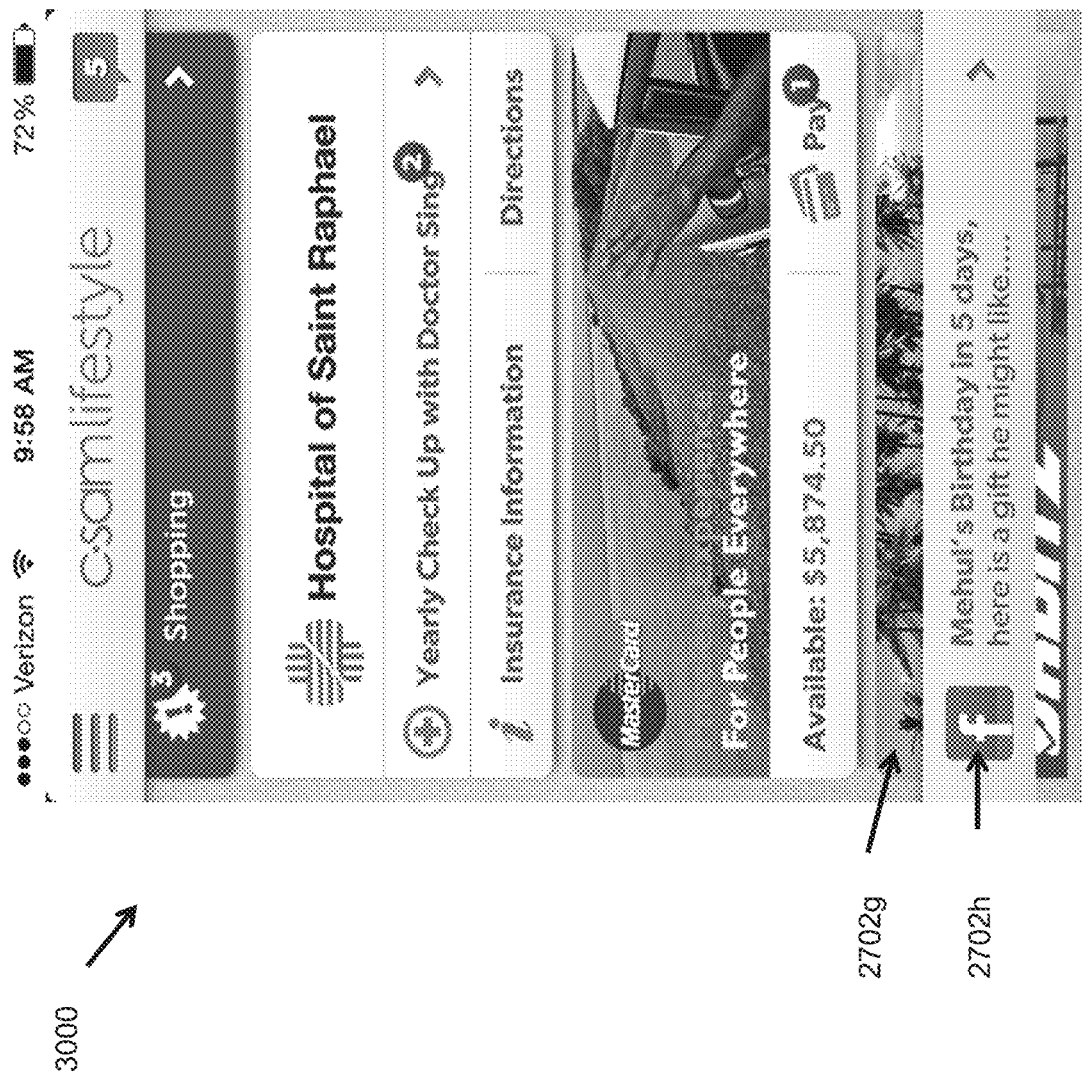

FIG. 30 depicts another user interface 3000 that shows how screen space may be utilized by manipulating locations and sizes of the various moving panels 2702 on the user interface 3000. A new moving panel 2702g related to travel appears on the user interface 3000. Further, another moving panel 2702h that relates to a birthday reminder appears on the 3000 upon the MTP-Expert Engine identifying about an approaching birthday of Mehul from the contextual and multidimensional information associated with the user through previous mobile transactions and other data sources. As the space on the 3000 is limited and no more space is available for more moving panels, therefore, considering the importance and urgency of the moving panel 2702h, it is presented as a banner over the moving panel 2702g overlaying a portion of the moving panel 2702g. In other embodiments, not depicted, however, the user may have an open to resize dimensions of the various moving panels 2702 so as to accommodate more or fewer simultaneously presented moving panels.

Figure 31:
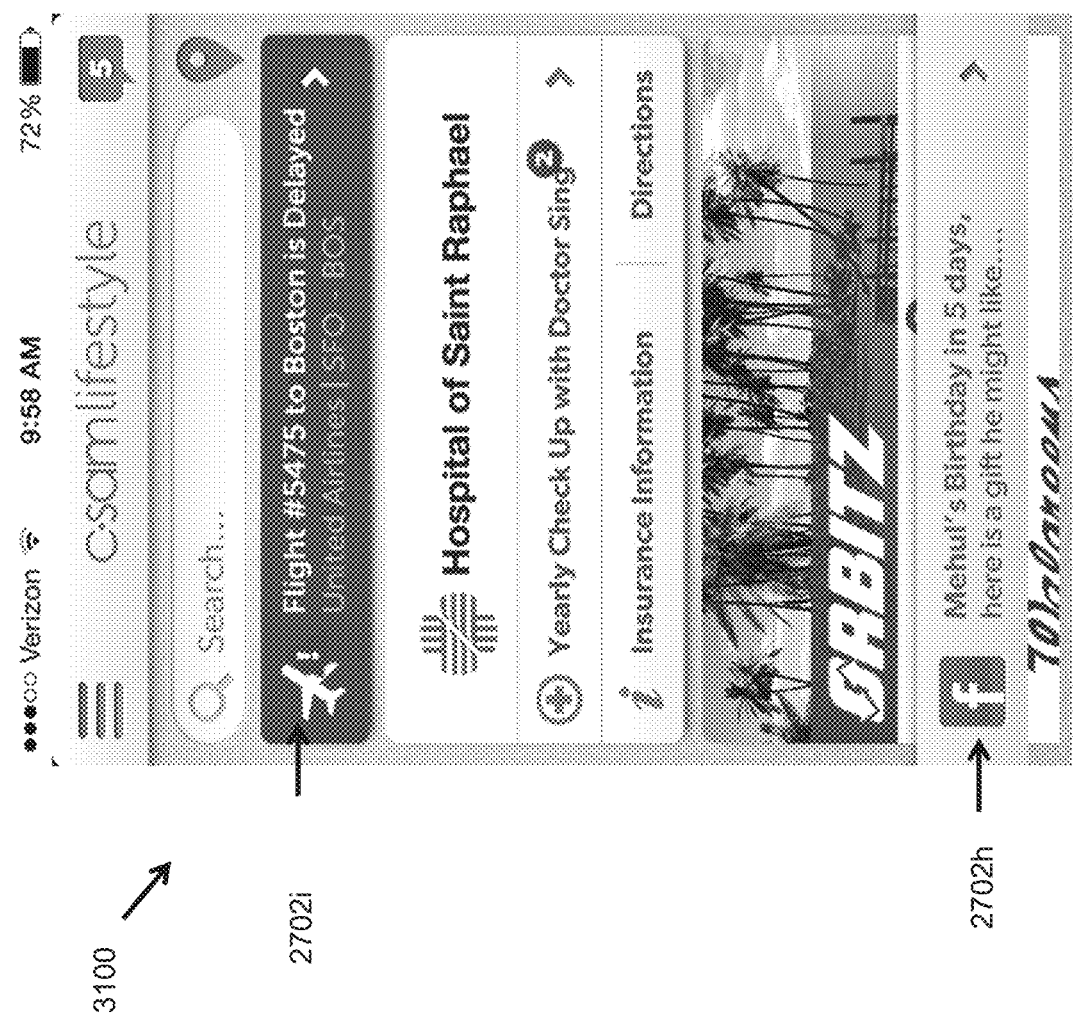

FIG. 31 depicts another exemplary user interface 3100 that comprises a few more examples of moving panels such as including a flight moving panel 2702i positioned on top of the interface 3100. The flight moving panel 2702i alerts the user about a delay in the scheduled flight with options for more details. As discussed in conjunction with various embodiments in this document, the MTP-Expert Engine may be configured to determine an impact on potential life occurrences related to the flight delay. The information used to present such an urgent panel may be derived from user past transactions for air travel, a user calendar of events that are close in time to the originally scheduled arrival time, flight information, and the like. The MTP-Expert Engine may further determine a plurality of available resolution paths associated with the life occurrence of flight delay and present them to the user as depicted in, for example, FIG. 40. For example, the options provided to the user in the flight moving panel 2702i may link the user to information containing various available resolution paths. This may for example include without limitations, alternative flight schedules, arrangement in next earliest flights, hotel stay nearby and the like without limitations. The MTP-Expert Engine may use a plurality of intelligent solutions, capabilities, or algorithms for generating the resolution paths and presenting them on a new panel that is described in association with FIG. 40. the flight moving panel 2702i. These may for example include without limitations, fuzzy logic, neural networks, and defined rules etc. and have been discussed in this document elsewhere.

Figure 33:
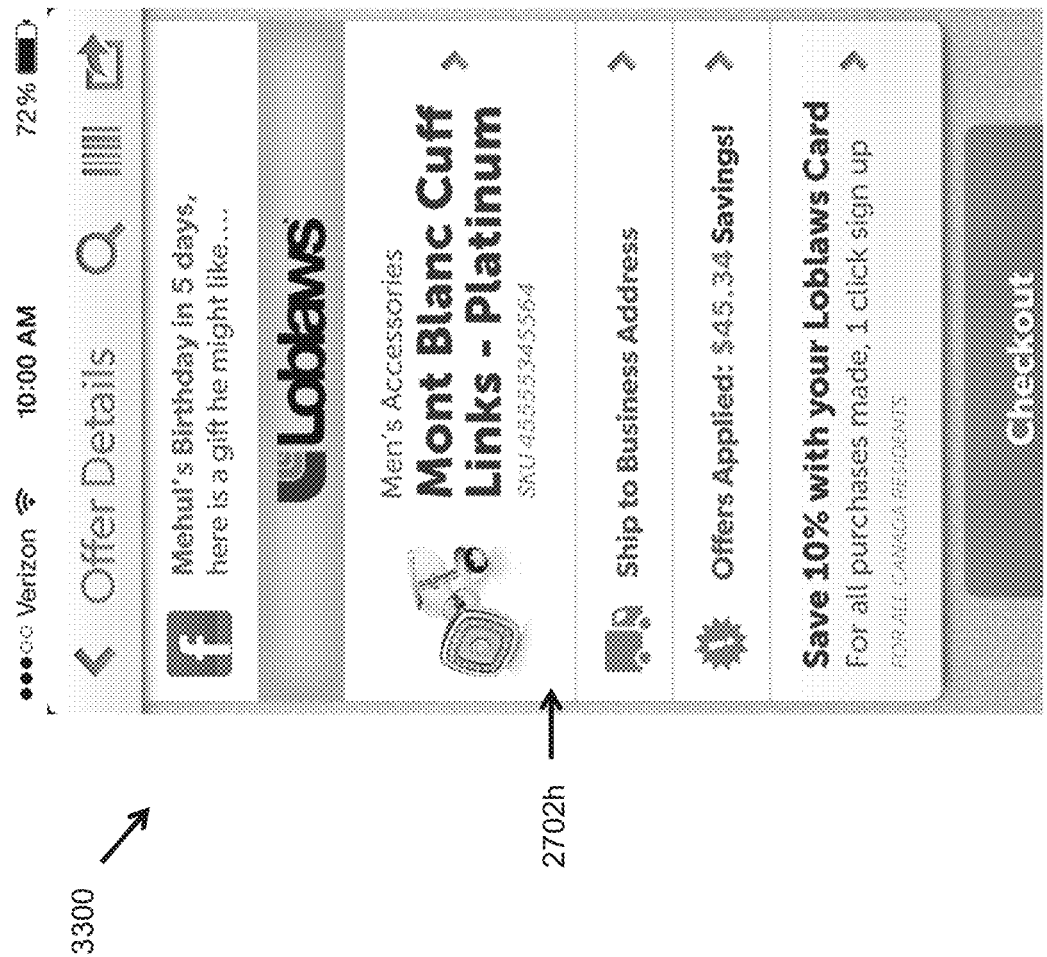
Figure 34:
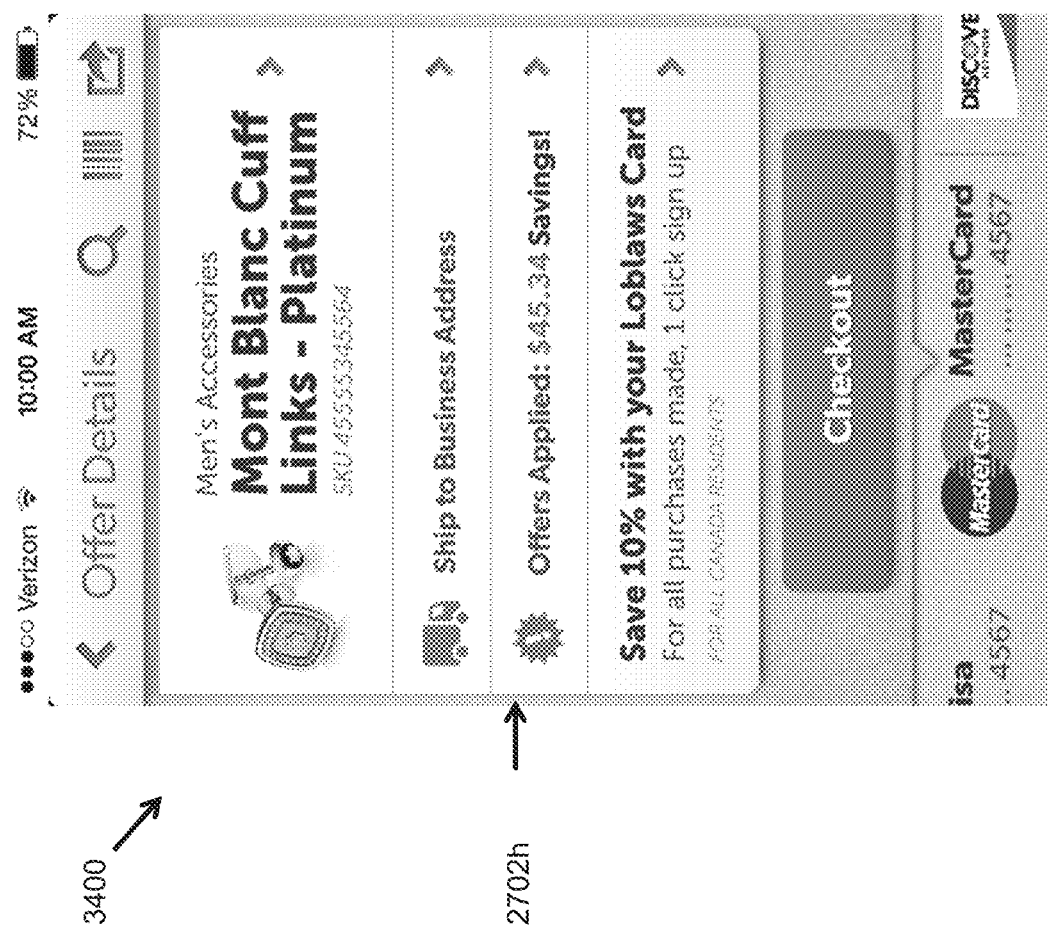

Also, the MTP-Expert Engine may also generate resolution paths for Mehul's birthday and may accordingly present gift solutions when the user selects the moving panel banner 102h. The resolution paths about suggesting a gift that Mehul may like may be determined based on social network profile information of Mehul, available gift solutions for his age group, nearby gift shops' inventory, and the like. The user may click on the moving panel 2702h or activate the associated options in other manners to execute one or more of various available paths associated with the birthday alert. FIGS. 33 and 34 show exemplary detail panels that may be presented in response to a user selecting panel 2702h.

Figure 32:
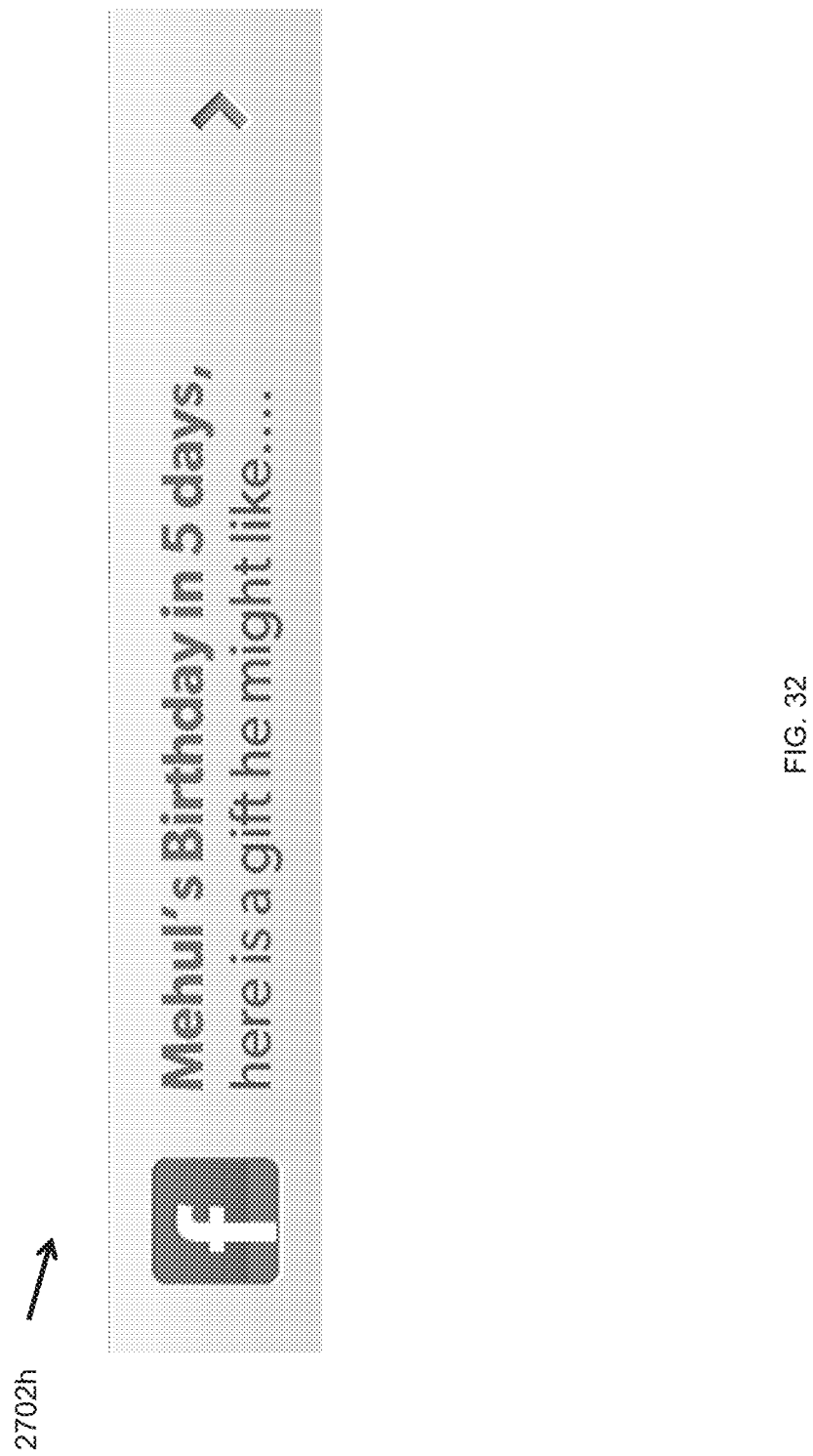

FIG. 32 illustrates an enlarged interface portion or moving panel 2702h depicting the banner for Mehul's birthday which may be presented to the user on a portion of the user interface 3100 or on any other screen based on user preferences. The banner may provide an option to search for more details about what Mehul may like as a birthday gift. For example, FIGS. 33 and 34 depict interfaces 3300 and 3400 that show more details after the user selects the option of viewing more details from the banner or the moving panel 102h.

As shown in FIG. 33, the MTP-Expert Engine may suggest a birthday gift. For example, the MTP-Expert Engine may utilize contextual information and the multidimensional information to recognize that Mehul had purchased a shirt in the recent past and therefore a matching cuff link may be a good option for him as a birthday gift. Therefore, among various other options, the MTP-Expert Engine suggests Mont Blanc Platinum Cuff-Link. The 3300 may also present purchase options along with options for shipping. The MTP-Expert Engine may also identify possible saving schemes (e.g. offers) and report them to the user and update him about total savings through the purchase. FIG. 34 depicts the user interface 3400 showing checkout options to purchase the birthday gift. The user can buy the gift and select a checkout option by using any of his registered credit cards for which options may be displayed to the user and presented.

FIG. 35 depicts an exemplary user interface 35 of details for the user's Dr. Sing appointment shown in healthcare moving panel 2702c. The user interface 35 may be presented to the user when the user selects moving panel 2702c. When the user accesses the option for more details, the user is presented his medical checkup details for example cardiology records of the user in this case. The presented details are determined by the MTP-Expert Engine based on information derived from the multidimensional context, user preferences, user past transactions, and the like. The MTP-Expert Engine may also determine information about the particular appointment with Dr. Sing by accessing a healthcare portal of the user associated with the doctor, the hospital, or both. For example, in the exemplary case depicted in FIG. 35, the MTP-Expert Engine determines that the user needs a prostate checkup and therefore, provides another option for the user to learn more about the prostate checkup procedure as depicted in FIG. 36 that is described below.

In an aspect of the present invention, the MTP-Expert Engine may also show actions that the system has already taken care of based on user preferences, managed on-device settings and the like for automatic life occurrence resolution actions. For example, the user interface 3500 may display that a financial obligation related to the appointment (e.g. a co-pay) will be take care of automatically with the user's prepaid MasterCard. In addition, the MTP Expert engine has automatically arranged for insurance information to be updated (e.g. the user's insurance card details have been transmitted to the insurance carrier).

FIG. 3600 depicts a detailed user interface 3600 for the particular procedure that the user is scheduled for with Dr. Sing in the 'Hospital of Saint Raphael'. This content may be displayed in response to the user selecting the "Read about prostate checkup" option in 3500. The content displayed in 3600 may be derived from various sources including Internet sources. The MTP-expert engine may determine the best sources for such information based on user and other reviews of content presented on various websites, prior user access to medical information, and/or user preferences for such information. In this way, the user may accordingly prepare for the procedure before actually visiting the doctor without having to spend time researching various websites to determine which website content to read.

Figure 37:

FIG. 37 depicts another example of a detailed user interface 3700 that is presented when the user selects the prepaid card moving panel 2702d. The 3700 shows various activities associated with the user MasterCard, such as bill payments and the like. In the illustrated example, the user is shown that current bill is exceptionally high. The MTP-Expert Engine may compare the current bill with those of the historical bills and accordingly interact with the user through the interface 3700 so as to alert him about the high bill and seek his approval for bill payment prior to automatically paying the bill using the MasterCard of the user as is generally done for normal bill payments. The user interface 3700 may also show options to view the bill in detail and also to confirm for payment of the bill through the MasterCard associated with the moving prepaid card panel 2702d. The user may also be provided with an option to just ignore the bill and do nothing. The user interface 3700 may also show the various recent payments that were automatically taken care of by the lifestyle system or the MTP-Expert Engine based on user preferences for automatically taking action. The user is always in control of how bills are paid, including thresholds that require manual authorization, and the like.

Figure 38:
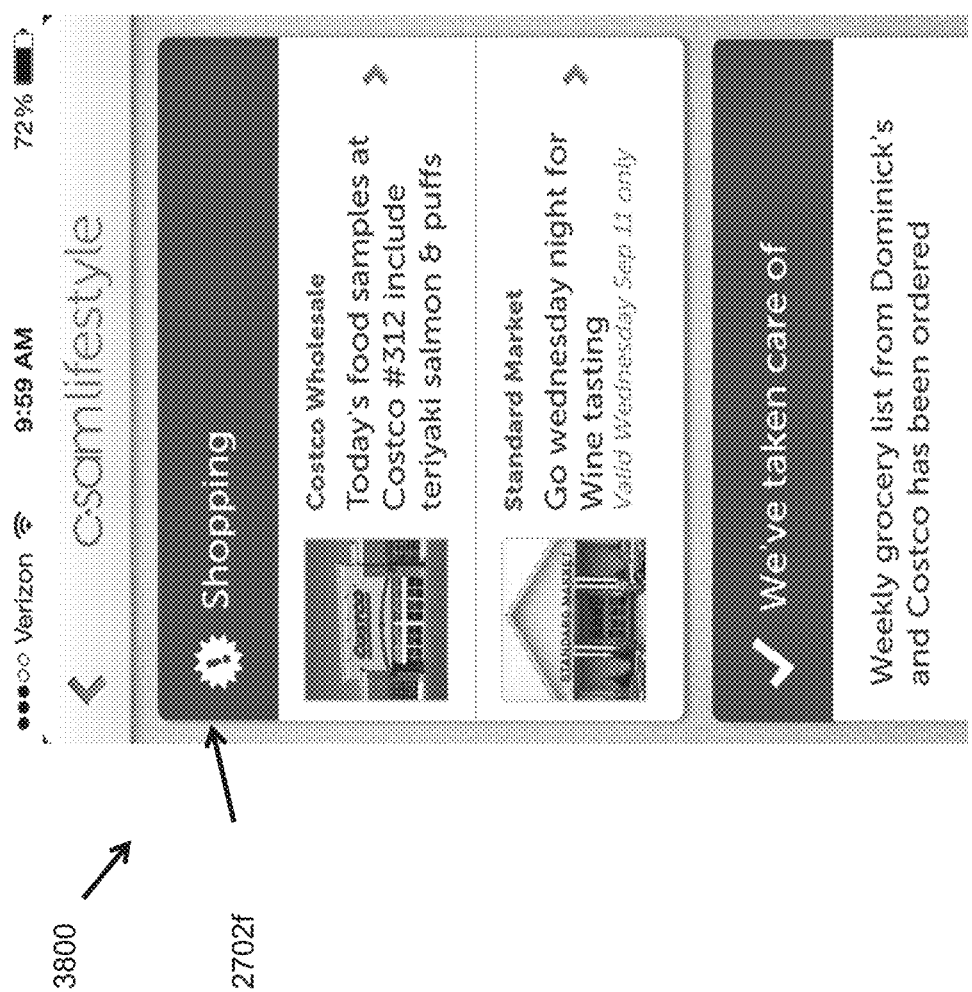
Figure 39:
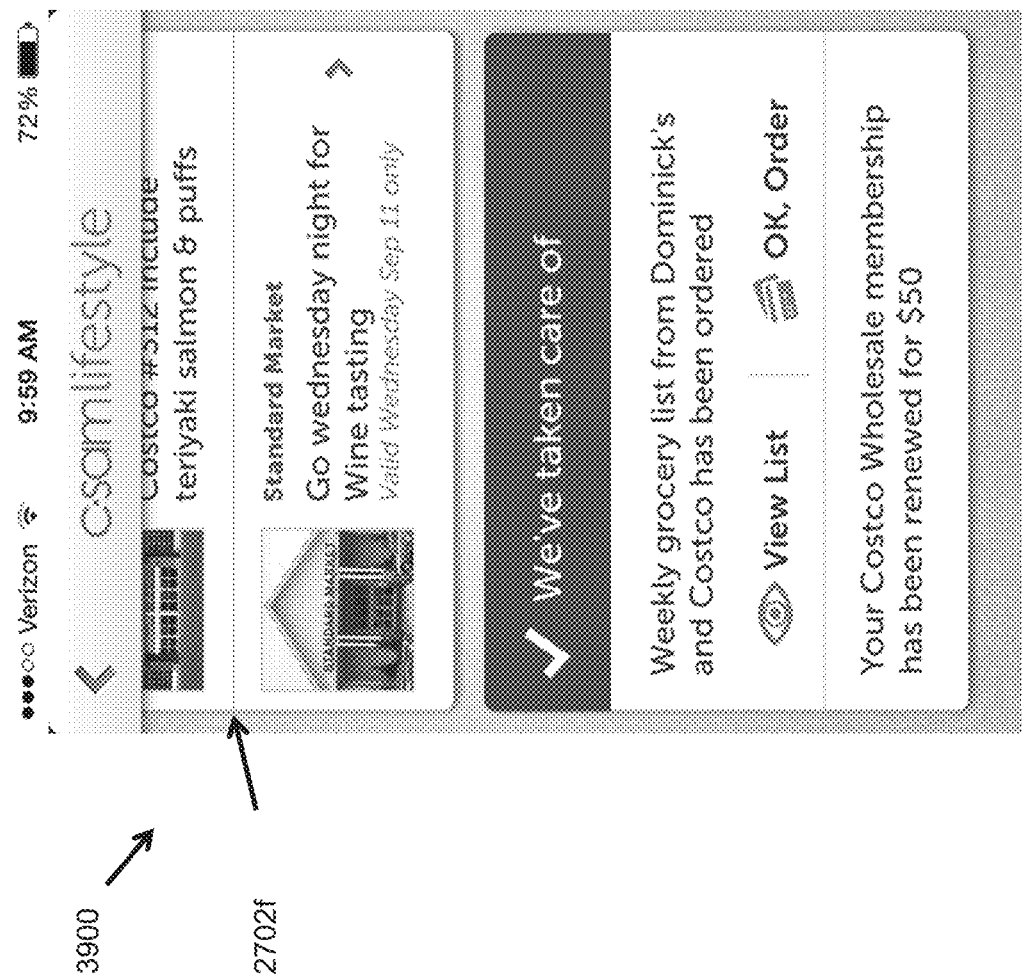

FIG. 38 further depicts another example of a detailed user interface 3800 that is presented when the user selects the shopping moving panel 2702f. The detail shopping 3800 shows shopping highlights including actions that the lifestyle system has taken care of. For example, the lifestyle system determines a plurality of offers that may be related to user life occurrences and accordingly presents these offers to the user through 3800. The user may also scroll the user interface 3800 to view details and actions that the user can take regarding various shopping items that the lifestyle system has performed automatically. For example, such a scrolled user interface 3800 is depicted in 39. The user can view shopping lists or options to make payments for ordered items through this extended scrolled portion of the 39. FIG. 39 provides an example of vertical scrolling of the user interface 39 to accommodate presenting more details to the user.

Figure 40:
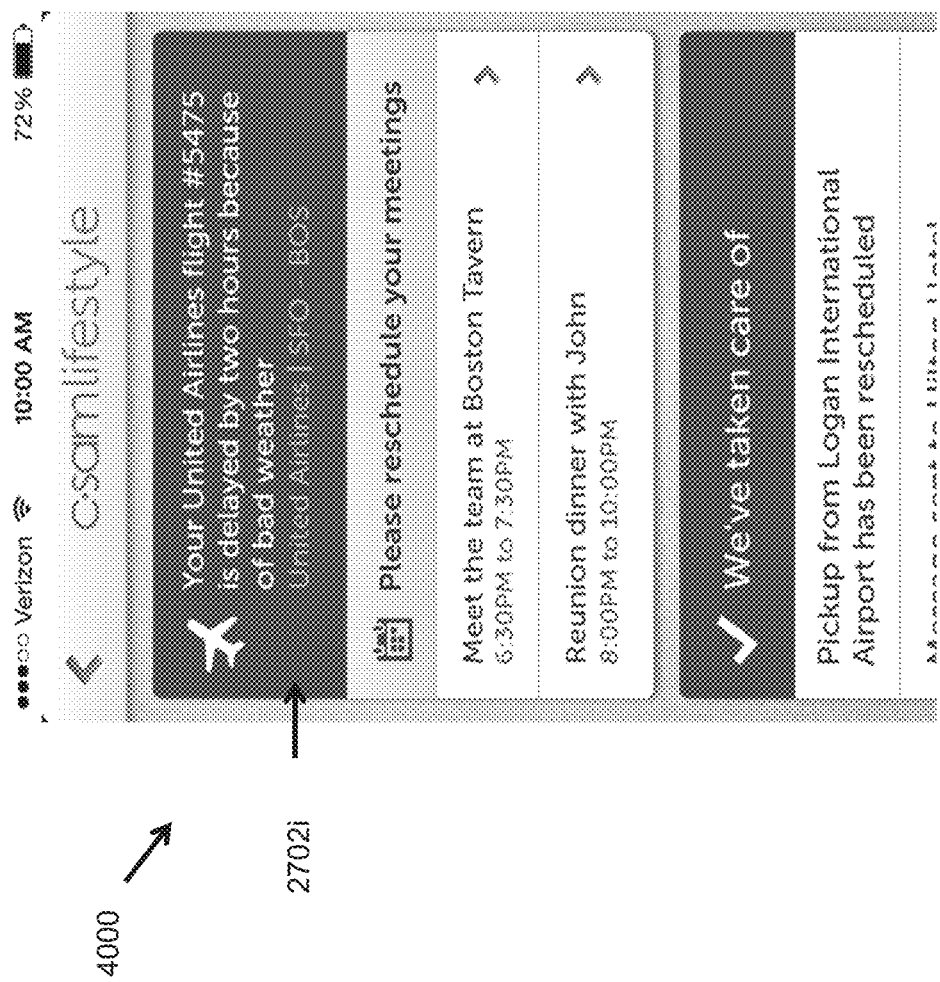

FIG. 40 depicts another example of a detailed user interface 4000 that is presented when the user selects the flight moving panel 2702h. Upon selection of the flight moving panel that shows an air travel alert pertaining to a delay in the flight (see FIG. 29), details regarding flight delays are presented to the user through the detailed screen 4000. The 4000 shows details related to the flight delays and other life occurrences such as meetings and the like that may be impacted by the delayed flight. The lifestyle system may automatically take certain actions based on user preferences such as proposing rescheduling of meetings in accordance with revise flight timings, rescheduling pickup services and the like. Accordingly, various items that can be automatically handled may be presented on user interface 4000. In some cases, the user approval of some aspect of the life occurrence may be needed for the expert engine to provide available resolutions for the life occurrences. For example, as shown in FIG. 40, the user interface presents options for updating the meetings and rescheduling them for a different time and possibly at a time different location. The user can act on any of these options by clicking the respective options presented in this user interface.

Use Cases

The transactions triggers by a life occurrence management platform may be in the form of time-based trigger-events that may be explicit or implicit for example based on user-defined preferences (explicit) or from information derived from ecosystem or from MTP, ES, FB, IM, Skype (implicit) and the like. The trigger-events may in other cases be of the location type such as for transit environments or spatial fences. For example, in case of a transit environment, when a user goes to a station, a trigger-event that says the station that the user normally uses is out of service. A life occurrence management platform may point the user to an alternative mode of transportation (which may be other mode of transport such as station for a bus), to parking for the other mode, to timetables, and the like based on available resolutions assessed by the expert engine of a life occurrence management platform.

In accordance with an exemplary and non-limiting embodiment, the expert engine mines personal data of a mobile device user and compares it to third party data (e.g. airline flight schedule data) and discovers that the user's flight out of Chicago has been delayed until the next day. The expert engine determines that the last time a similar delay occurred at LaGuardia Airport, the user stayed at a particular hotel at the airport. The expert engine sends an alert message to the mobile device of the user indicating the flight delay as well as suggested resolution actions (e.g. making hotel reservations at the particular hotel) that may be confirmed in response to the occurrence. The alert message is displayed on the mobile device via the lifestyle container 106, thereby showing the nature of the occurrence and the suggested resolution including an option for confirming a hotel reservation at the airport and a rental car. Such a display is illustrated at FIG. 4.

By way of example, the expert engine mines personal data of a mobile device user and discovers that the user's brother has a birthday in 5 days. The expert engine determines that the occurrence of the birthday requires a resolution action comprising, at least, purchasing a gift for the brother. The expert engine notices that the user purchased and sent a dress shirt last year in response to that birthday occurrence. The expert engine determines that a complimentary gift for this year is cuff links and locates a pair of platinum Mont Blanc cuff links for sale to which may be applied a 10% discount when purchased via a mobile transaction using a Loblaws gift card. The expert engine sends an alert message to the mobile device enabling the lifestyle container indicating the impending birthday occurrence as well as suggested resolution actions that may be confirmed in response to the occurrence. The alert message is displayed on the mobile device showing the nature of the occurrence, the suggested resolution, a suggested method of shipment and a suggested use of the Loblaw card as illustrated in FIG. 4A. With reference to FIG. 4A there is illustrated an exemplary and non-limiting embodiment of a user interface of a lifestyle container operating on a mobile device, such as a mobile phone. Scrolling to the bottom of the screen, as illustrated in FIG. 4B, there is displayed a suggested form of credit for the mobile transaction. By scrolling horizontally, the user may choose a preferred form of payment for the mobile transaction and complete the resolution actions associated with the occurrence.

In accordance with another exemplary and non-limiting embodiment, a user follows a similar route most weekday mornings from the subway station to his office four blocks away. Most mornings he purchases a Stardollar coffee from the first of four such Stardollar he passes. As the Stardollar are individually franchised, different Stardollar may offer different deals. Using a GPS location signal and a time stamp as spatial and temporal context drivers, the expert engine consolidates the location and time user data with transactional analytic data acquired by the MTP relating to past purchases by the user to create multidimensional context data indicative of the options available to the user. For example, the expert engine may generate and transmit to the MTP a trigger with attendant context-based generated actions that are triggered on the condition that the user has exited the subway and appears to be heading on the usual route to the office. Once the MTP and/or the expert engine and/or the container observe the trigger condition to be met, the user may be informed of the suggested actions.

For example, the user may receive an alert via the lifestyle container that he can purchase a coffee at a Stardollar one block away and on his prospective route at a 10% discount using his Stardollar card. Upon the user accepting the offer, the MTP seamlessly places the order for the coffee in the name of the user and pays for it using the user's Stardollar credit card. As the user passes or prepares to pass the Stardollar at which his coffee is waiting, his location is used to trigger an alert to remind him that his coffee is waiting.

Note that in this example, both location and time serve as context drivers for the generation of the triggers. If, for example, the user was at this same place on a Saturday, this temporal context driver might cause the expert engine to discount the probability that the user would be following his normal weekday route. If, for example, the user was at the same subway stop in the afternoon, the expert engine may use the temporal context driver to determine that the user is heading to lunch. This context driven conclusion may be reinforced by access to a user's Facebook posting that he is looking forward to having lunch with his friend on Saturday. As a result, the expert engine may generate one or more triggers enabling making reservations or calling a taxi for the user. In the above example, the location context driver of a GPS location may likewise drive the context driven trigger creation. For example, if the user exits a different subway stop than usual in the morning, the expert engine may conclude that the user is likely to still want coffee from a Stardollar, may search for a Stardollar near the user and may generate a trigger to alert the user.

In one exemplary and non-limiting embodiment, the expert engine determines from the multidimensional context that a user prefers JavaJeff coffee over Stardollar. In such an instance, the expert engine generates a trigger to alert the user to the possibility of obtaining coffee at JavaJeff that may, for example, be a short distance from a Stardollar in front of which the user is currently standing. The use of location based context drivers can aid in creating the multidimensional context. In the present example, the expert engine may gather that a Stardollar is directly next to or in very close proximity to JavaJeff store when a user chooses to purchase a coffee at JavaJeff. Such an action is a strong indicator that the user prefers JavaJeff coffee over Stardollar coffee. The strength of the indicator varies in inverse proportion to the proximity of the two stores at the time of the user's choice to purchase one brand over another.

Significant changes in purchasing patterns can serve as context drivers. In an example, the expert engine may observe from transaction analytics that a user has begun to purchase certain products, such as diapers, or in certain stores, such as Home Depot. Such changes may be indicative of the user becoming a parent or buying a house, respectively.

The expert engine may generate triggers related to a level of loyalty points. By analyzing transactions, the MTP can ascertain if a user's level of loyalty points is high or low. Such information is more than just knowledge of the mere membership of a user in a loyalty program. Once such information is consolidated into a multidimensional context, the expert engine may generate triggers to propose offers which are especially attractive when the user redeems some of his loyalty points, or where an extra amount of loyalty points can be collected.

The status of a credit card or account may comprise a context driver. For example, if the expert engine determines how 'strained' a certain credit card already is, then, depending on the amount to be paid, it might propose using another card for a transaction. Also, the user might have a preference to pay for expensive goods (or travel-related things) with a specific credit card, because it offers some additional insurance that are beneficial in that situation. The expert engine may automatically select this specific credit card based on the situation to help the user gain the most or most important benefit available.

In addition to time/date being part of a life occurrence descriptor or metadata, one might add an 'urgency+importance' attribute to the life occurrence descriptor. This 'urgency+importance' attribute is likely to be very personal for each user (and its weight for determining its value to the expert engine might change over time). The expert engine can learn these variations in urgency and importance to the user and make appropriate proposals. For example, a certain person just likes to pay all bills and taxes absolutely on time, so the closer the due date of this kind of transaction comes the more prominent a certain element of the screen would become, such as being promoted to the top of an occurrence list, increasing in size or changing in color, or having a nagging UI dialogue. Another person is not so focused on the bills, but more on the relationships, so for her a friend's birthday will be more important as a reminder, because she needs to find the perfect present. Therefore, her friend's birthday occurrence may become more prominent until the event is resolved (e.g. by sending her friend a gift, attending a birthday party, and the like).

The expert engine might determine from the multidimensional context that a user has an upcoming doctor's appointment. In response, an alert may be displayed to a user on via a GUI controlled by the lifestyle container 106. A visual indicia may guide the user to a GPS application that is preprogrammed to direct the user from his current location to a parking lot in proximity to the doctor office for the appointment and, if desired, to the doctor's office. If this is the first time the user has been to this doctor's office, the user may select a visual indicia corresponding to an option to have the user's medical records securely transferred to the doctor's office. Upon exiting the doctor's office, the expert engine may aggregate 3rd party content from the doctor's office to create a trigger for acquiring prescribed medication. The expert engine may identify one or more pharmacies on the user's way home and offer a selection of pharmacies from which the user may choose a desired destination. Once chosen, the MTP may execute the back-end transactions required to place the order for the user's prescription to be picked up at a predetermined time.

While methods and systems of life occurrence management have been disclosed in connection with the preferred embodiments shown and described in detail, various modifications and improvements thereon will become readily apparent to those skilled in the art. Accordingly, the spirit and scope of any claims presented herein is not to be limited by the foregoing examples, but is to be understood in the broadest sense allowable by law.

While the methods and systems of life occurrence management have been described in connection with certain preferred embodiments, other embodiments may be understood by those of ordinary skill in the art and are encompassed herein.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be executed on a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The server may execute the methods, programs or codes as described herein and elsewhere. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be a frequency division multiple access (FDMA) network or a code division multiple access (CDMA) network. The cellular network may include mobile devices, cell sites, base stations, repeaters, antennas, towers, and the like. The cell network may be a GSM, GPRS, 3G, EVDO, mesh, or other type network.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

What is claimed is:

1. A method for configuring an ecosystem enabled life occurrence container operating on an intelligent appliance life occurrence node, the intelligent appliance life occurrence node associated with a user, wherein a server and the intelligent appliance life occurrence node are in communication over a network, the method comprising:
    determining, by the server, a replenishment-type of life occurrence of the user based, at least in part, on a replenishment alert from the intelligent appliance life occurrence node associated with the user and a data set associated with the user, the data set stored on a non-transitory computer readable storage medium of the server, the replenishment alert indicating a need for replenishing material consumed by the intelligent appliance life occurrence node associated with the user;
    generating, by the server, a resolution path that includes a plurality of resolution actions and is adapted to cause a replenishment transaction, the replenishment transaction utilizing the ecosystem enabled life occurrence container operating on the intelligent appliance life occurrence node associated with the user;
    as part of generating the resolution path, replacing, by the server, a first resolution action of the plurality of resolution actions with a second resolution action distinct from the first resolution action, the replacing of the first resolution action based, at least in part, on a combination of an outcome of a predicted resolution path for the user and an assessment of a risk to a third party service provider that is imposed by the predicted resolution path, the third party service provider supporting, at least in part, the predicted resolution path; and
    as part of at least one of the determining and the generating, administering, by the server, at least one rule of a rules engine operating on the server that relates the replenishment-type of life occurrence of the user with the generated resolution path, applying, by the server via the rules engine, the at least one rule to data for the user in the data set.

2. The method of claim 1, wherein the data set is a multidimensional dataset.

3. The method of claim 1, wherein the data for the user in the data set comprises transactional data streamed from a first data source of transactions conducted on behalf of the user by the intelligent appliance life occurrence node associated with the user and life event data gathered through the intelligent appliance life occurrence node associated with the user.

4. The method of claim 1, wherein the data set is derived, at least in part, from one or more user transactions.

5. The method of claim 4, wherein the one or more user transactions are conducted via a mobile transaction platform.

6. The method of claim 4, wherein the one or more user transactions are stored on a third-party source.

7. The method of claim 1, wherein an instance of the replenishment-type of life occurrence has yet to occur.

8. The method of claim 1, wherein an instance of the replenishment-type of life occurrence has already occurred.

9. The method of claim 1, wherein a location of an instance of the replenishment-type of life occurrence is different than a location of the user when generating the resolution path.

10. The method of claim 1, wherein generating the resolution path includes presenting the generated resolution path to the user via a first life occurrence node that is distinct from the intelligent appliance life occurrence node.

11. The method of claim 1, wherein at least one of the resolution actions of the plurality of resolution actions comprises automatically executing a preconfigured mobile transaction between a mobile device-deployed life occurrence container and a server of the third-party service provider.

12. The method of claim 1, wherein the server is in further communication over the network with a mobile device, wherein the replenishment transaction further utilizes a mobile device-deployed life occurrence container operating on the mobile device for user notification and approval of the replenishment transaction, the intelligent appliance life occurrence node associated with the user through the mobile device-deployed life occurrence container.

13. A non-transitory computer readable storage medium having instructions stored therein, the non-transitory computer readable storage medium for configuring an ecosystem enabled life occurrence container operating on an intelligent appliance life occurrence node, the intelligent appliance life occurrence node associated with a user, wherein a server and the intelligent appliance life occurrence node are in communication over a network, the instructions executable by the server to:
  determine a replenishment-type of life occurrence of the user based, at least in part, on a replenishment alert from ft intelligent appliance life occurrence node associated with the user and a data set associated with the user, the data set stored on a non-transitory computer readable storage medium that is accessible by the server, the replenishment alert indicating a need for replenishing material consumed by the intelligent appliance life occurrence node associated with the user;
  generate a resolution path that includes a plurality of resolution actions and is adapted to cause a replenishment transaction, the replenishment transaction utilizing the ecosystem enabled life occurrence container operating on the intelligent appliance life occurrence node associated with the user;
  as part of generating the resolution path, replace a first resolution action of the plurality of resolution actions with a second resolution action distinct from the first resolution action, the replacing of the first resolution action based, at least in part, on a combination of an outcome of a predicted resolution path for the user and an assessment of a risk to a third party service provider that is imposed by the predicted resolution path, the third party service provider supporting, at least in part, the predicted resolution path; and
  as part of at least one of the determining and the generating, administer at least one rule of a rules engine operating on the server that relates the replenishment-type of life occurrence of the user with the generated resolution path, apply, via the rules engine, the at least one rule to data for the user in the data set.

14. The non-transitory computer readable storage medium of claim 13, wherein the data set is a multidimensional dataset.

15. The non-transitory computer readable storage medium of claim 13, wherein data for the user in the data set comprises transactional data streamed from a first data source of transactions conducted on behalf of the user by the life occurrence node associated with the user and life event data gathered through the life occurrence node associated with the user.

16. The non-transitory computer readable storage medium of claim 13, wherein an instance of the life occurrence has yet to occur.

17. The non-transitory computer readable storage medium of claim 13, wherein the instructions to generate the resolution path include instructions to present the generated resolution path to the user via a first life occurrence node that is distinct from the intelligent appliance life occurrence node.

18. The non-transitory computer readable storage medium of claim 13, wherein at least one of the resolution actions of the plurality comprises automatically executing a preconfigured mobile transaction between a life occurrence container and a server of the third-party service provider.

19. The non-transitory computer readable storage medium of claim 13, wherein the server is further in communication over the network with a mobile device, wherein the replenishment transaction further utilizes a mobile device-deployed life occurrence container operating on the mobile device for user notification and approval of the replenishment transaction, the intelligent appliance life occurrence node associated with the user through the mobile device-deployed life occurrence container.

\* \* \* \* \*